US010950091B2

(12) United States Patent
Arnone et al.

(10) Patent No.: US 10,950,091 B2
(45) Date of Patent: *Mar. 16, 2021

(54) BILLIARD COMBINED PROPOSITION WAGERING SYSTEM

(71) Applicant: Gamblit Gaming, LLC, Glendale, CA (US)

(72) Inventors: Miles Arnone, Sherborn, MA (US); Eric Meyerhofer, Pasadena, CA (US); Michael Walker, Santa Clarita, CA (US)

(73) Assignee: Gamblit Gaming, LLC, Monrovia, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/048,893

(22) Filed: Jul. 30, 2018

(65) Prior Publication Data

US 2018/0336763 A1 Nov. 22, 2018

Related U.S. Application Data

(63) Continuation of application No. 14/984,965, filed on Dec. 30, 2015, now Pat. No. 10,037,658.

(Continued)

(51) Int. Cl.

*A63F 13/00* (2014.01)
*G07F 17/32* (2006.01)

(52) U.S. Cl.

CPC .......... *G07F 17/3262* (2013.01); *G07F 17/32* (2013.01); *G07F 17/326* (2013.01);

(Continued)

(58) Field of Classification Search

CPC ... G07F 17/3262; G07F 17/3295; G07F 17/32
See application file for complete search history.

(56) References Cited

U.S. PATENT DOCUMENTS 5,413,357 A 5/1995 Schulze et al.
5,718,429 A 2/1998 Keller (Continued)

FOREIGN PATENT DOCUMENTS

JP 20040097610 A1 5/2004

OTHER PUBLICATIONS

U.S. Appl. No. 14/815,764 Arnone, et al. filed Jul. 31, 2015.

(Continued)

*Primary Examiner* — Omkar A Deodhar
*Assistant Examiner* — Eric M Thomas
(74) *Attorney, Agent, or Firm* — Frank Cire

(57) ABSTRACT

A combined proposition wagering system, including a wireless device constructed to: provide an interactive application display; communicate initialization data; communicate skill outcome; receive wager results; update a wagering user interface; a chance-based controller constructed to: receive incoming credit data; receive wager requests; determine a wager outcome; update one or more credit meters; and communicate updated credit meter data; the process controller operatively connecting the wireless device and the chance-based controller, and constructed to: receive initialization data; determine object values by assigning each outcome to one or more objects associated with the interactive application; communicate wager request; receive wager outcome; determine billiard combined outcome; communicate combined outcome data; receive updated credit meter data; generate and communicate the wagering telemetry data.

20 Claims, 17 Drawing Sheets

Related U.S. Application Data

(60) Provisional application No. 62/099,129, filed on Dec. 31, 2014.

(52) U.S. Cl.
CPC ...... *G07F 17/3223* (2013.01); *G07F 17/3244* (2013.01); *G07F 17/3288* (2013.01); *G07F 17/3295* (2013.01)

(56) References Cited

U.S. PATENT DOCUMENTS 5,785,592 A 7/1998 Jacobsen
5,853,324 A 12/1998 Kami et al.
5,963,745 A 10/1999 Collins et al.
6,050,895 A 4/2000 Luciano
6,165,071 A 12/2000 Weiss
6,227,974 B1 5/2001 Eilat
6,267,669 B1 7/2001 Luciano
6,276,689 B1 8/2001 Brown
6,302,791 B1 10/2001 Frohm et al.
6,685,563 B1 2/2004 Meekins et al.
6,712,693 B1 3/2004 Hettinger
6,761,632 B2 7/2004 Bansemer et al.
6,761,633 B2 7/2004 Riendeau
6,764,397 B1 7/2004 Robb
6,811,482 B2 11/2004 Letovsky
6,942,568 B2 9/2005 Baerlocher
7,056,210 B2 6/2006 Bansemer
7,118,105 B2 10/2006 Benevento
7,294,058 B1 11/2007 Slomiany
7,326,115 B2 2/2008 Baerlocher
7,361,091 B2 4/2008 Letovsky
7,517,282 B1 4/2009 Pryor
7,575,517 B2 8/2009 Parham et al.
7,682,239 B2 3/2010 Friedman et al.
7,720,733 B2 5/2010 Jung
7,753,770 B2 7/2010 Walker et al.
7,753,790 B2 7/2010 Nguyen
7,766,742 B2 8/2010 Bennett et al.
7,775,885 B2 8/2010 Van Luchene
7,798,896 B2 9/2010 Katz
7,828,657 B2 11/2010 Booth
7,917,371 B2 3/2011 Jung et al.
7,931,531 B2 4/2011 Oberberger
7,938,727 B1 5/2011 Konkle
7,950,993 B2 5/2011 Oberberger
7,967,674 B2 6/2011 Baerlocher
7,980,948 B2 7/2011 Rowe
7,996,264 B2 8/2011 Kusumoto et al.
8,012,023 B2 9/2011 Gates
8,047,908 B2 11/2011 Walker
8,047,915 B2 11/2011 Lyle
8,060,829 B2 11/2011 Jung et al.
8,075,383 B2 12/2011 Friedman et al.
8,087,999 B2 1/2012 Oberberger
8,113,938 B2 2/2012 Friedman et al.
8,118,654 B1 2/2012 Nicolas
8,128,487 B2 3/2012 Hamilton et al.
8,135,648 B2 3/2012 Oram
8,137,193 B1 3/2012 Kelly et al.
8,142,272 B2 3/2012 Walker
8,157,653 B2 4/2012 Buhr
8,167,695 B2 5/2012 Rowe
8,167,699 B2 5/2012 Inamura
8,177,628 B2 5/2012 Manning
8,182,338 B2 5/2012 Thomas
8,182,339 B2 5/2012 Anderson
8,187,068 B2 5/2012 Slomiany
8,206,210 B2 6/2012 Walker
8,241,136 B2 8/2012 Bennett
8,308,544 B2 11/2012 Friedman
8,430,735 B2 4/2013 Oberberger
8,475,266 B2 7/2013 Amone
8,480,470 B2 7/2013 Napolitano et al.
8,485,893 B2 7/2013 Rowe
8,622,809 B1 1/2014 Arora et al.
8,864,564 B2 10/2014 Oberberger
8,998,694 B2 4/2015 Rowe
9,070,257 B1 6/2015 Scalise
9,092,946 B2 7/2015 Rowe
9,111,412 B2 8/2015 Rowe
9,454,873 B2 9/2016 Rowe
2001/0004609 A1 6/2001 Walker et al.
2001/0019965 A1 9/2001 Ochi
2002/0022509 A1 2/2002 Nicastro et al.
2002/0090990 A1 7/2002 Joshi et al.
2002/0175471 A1 11/2002 Faith
2003/0060286 A1 3/2003 Walker et al.
2003/0119576 A1 6/2003 McClintic et al.
2003/0139214 A1 7/2003 Wolf et al.
2003/0171149 A1 9/2003 Rothschild
2003/0204565 A1 10/2003 Guo et al.
2003/0211879 A1 11/2003 Englman
2004/0092313 A1 5/2004 Saito et al.
2004/0102238 A1 5/2004 Taylor
2004/0121839 A1 6/2004 Webb
2004/0225387 A1 11/2004 Smith
2005/0003878 A1 1/2005 Updike
2005/0096124 A1 5/2005 Stronach
2005/0116411 A1 6/2005 Herrmann et al.
2005/0192087 A1 9/2005 Friedman et al.
2005/0233791 A1 10/2005 Kane
2005/0233806 A1 10/2005 Kane et al.
2005/0239538 A1 10/2005 Dixon
2005/0269778 A1 12/2005 Samberg
2005/0288101 A1 12/2005 Lockton et al.
2006/0003823 A1 1/2006 Zhang
2006/0003830 A1 1/2006 Walker et al.
2006/0035696 A1 2/2006 Walker
2006/0040735 A1 2/2006 Baerlocher
2006/0068913 A1 3/2006 Walker et al.
2006/0084499 A1 4/2006 Moshal
2006/0084505 A1 4/2006 Yoseloff
2006/0135250 A1 6/2006 Rossides
2006/0154710 A1 7/2006 Serafat
2006/0166729 A1 7/2006 Saffari et al.
2006/0189371 A1 8/2006 Walker et al.
2006/0223611 A1 10/2006 Baerlocher
2006/0234791 A1 10/2006 Nguyen et al.
2006/0240890 A1 10/2006 Walker
2006/0246403 A1 11/2006 Monpouet et al.
2006/0258433 A1 11/2006 Finocchio et al.
2007/0026924 A1 2/2007 Taylor
2007/0026956 A1 2/2007 Pearson
2007/0035548 A1 2/2007 Jung et al.
2007/0038559 A1 2/2007 Jung et al.
2007/0064074 A1 3/2007 Silverbrook et al.
2007/0087799 A1 4/2007 Van Luchene
2007/0090597 A1 4/2007 Shallow
2007/0093299 A1 4/2007 Bergeron
2007/0099696 A1 5/2007 Nguyen et al.
2007/0117641 A1 5/2007 Walker et al.
2007/0129149 A1 6/2007 Walker
2007/0142108 A1 6/2007 Linard
2007/0156509 A1 7/2007 Jung et al.
2007/0167212 A1 7/2007 Nguyen
2007/0167239 A1 7/2007 O'Rourke
2007/0173311 A1 7/2007 Morrow et al.
2007/0191104 A1 8/2007 Van Luchene
2007/0202941 A1 8/2007 Miltenberger
2007/0203828 A1 8/2007 Jung et al.
2007/0207847 A1 9/2007 Thomas
2007/0259717 A1 11/2007 Mattice
2007/0293306 A1 12/2007 Nee et al.
2008/0004107 A1 1/2008 Nguyen et al.
2008/0014835 A1 1/2008 Weston et al.
2008/0015004 A1 1/2008 Gatto et al.
2008/0064488 A1 3/2008 Oh
2008/0070659 A1 3/2008 Naicker
2008/0070690 A1 3/2008 Van Luchene
2008/0070702 A1 3/2008 Kaminkow
2008/0096665 A1 4/2008 Cohen
2008/0108406 A1 5/2008 Oberberger

(56) References Cited

U.S. PATENT DOCUMENTS

| | | | |
|---|---|---|---|
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0233697 | A1 | 9/2009 | Bennett |
| 2009/0239610 | A1 | 9/2009 | Olive |
| 2009/0247272 | A1 | 10/2009 | Abe |
| 2009/0270164 | A1 | 10/2009 | Seelig |
| 2009/0275393 | A1 | 11/2009 | Kisenwether |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0285869 | A1 | 11/2010 | Walker |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0070945 | A1 | 3/2011 | Walker |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0276985 | A1 | 11/2012 | Bennett |
| 2012/0302311 | A1 | 11/2012 | Luciano |
| 2012/0322545 | A1 | 12/2012 | Arnone et al. |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Leandro et al. |
| 2013/0273986 | A1 | 10/2013 | Arnone |
| 2014/0087801 | A1 | 3/2014 | Nicely et al. |
| 2014/0087808 | A1 | 3/2014 | Leandro et al. |
| 2014/0087809 | A1 | 3/2014 | Leupp et al. |
| 2014/0357350 | A1 | 12/2014 | Weingardt et al. |
| 2016/0189487 | A1* | 6/2016 | Arnone ............... G07F 17/3288 463/25 |
| 2016/0253867 | A1* | 9/2016 | Arnone ............... G07F 17/3227 463/7 |
| 2017/0148271 | A1 | 5/2017 | Graboyes Goldman et al. |

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.

(56) References Cited

OTHER PUBLICATIONS

U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14.222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 14/799,481 Arnone, et al. filed Jul. 14, 2015.
U.S. Appl. No. 15/362,214 Arnone, et al. filed Nov. 28, 2016.
U.S. Appl. No. 15/920,390 Arnone, et al. filed Mar. 13, 2018.
U.S. Appl. No. 15/922,816 Arnone, et al. filed Mar. 15, 2018.
U.S. Appl. No. 15/922,905 Arnone, et al. filed Mar. 15, 2018.
U.S. Appl. No. 15/925,268 Arnone, et al. filed Mar. 19, 2018.
U.S. Appl. No. 15/925,751 Arnone, et al. filed Mar. 19, 2018.
U.S. Appl. No. 15/933,319 Arnone, et al. filed Mar. 22, 2018.
U.S. Appl. No. 15/935,956 Arnone, et al. filed Mar. 26, 2018.
U.S. Appl. No. 15/943,207 Arnone, et al. filed Apr. 2, 2018.
U.S. Appl. No. 15/948,607 Arnone, et al. filed Apr. 9, 2018.
U.S. Appl. No. 15/949,812 Arnone, et al. filed Apr. 10, 2018.
U.S. Appl. No. 15/951,155 Arnone, et al. filed Apr. 11, 2018.
U.S. Appl. No. 15/954,094 Arnone, et al. filed Apr. 16, 2018.
U.S. Appl. No. 15/954,136 Arnone, et al. filed Apr. 16, 2018.
U.S. Appl. No. 15/961,375 Arnone, et al. filed Apr. 24, 2018.
U.S. Appl. No. 15/961,382 Arnone, et al. filed Apr. 24, 2018.
U.S. Appl. No. 15/966,590 Arnone, et al. filed Apr. 30, 2018.
U.S. Appl. No. 15/968,723 Arnone, et al. filed May 1, 2018.
U.S. Appl. No. 15/971,288 Arnone, et al. filed May 4, 2018.
U.S. Appl. No. 15/978,087 Arnone, et al. filed May 11, 2018.
U.S. Appl. No. 15/979,391 Arnone, et al. filed May 14, 2018.
U.S. Appl. No. 15/984,168 Arnone, et al. filed May 18, 2018.
U.S. Appl. No. 15/991,576 Arnone, et al. filed May 29, 2018.
U.S. Appl. No. 15/991,594 Arnone, et al. filed May 29, 2018.
U.S. Appl. No. 15/996,906 Arnone, et al. filed Jun. 4, 2018.
U.S. Appl. No. 16/005,017 Arnone, et al. filed Jun. 11, 2018.
U.S. Appl. No. 16/005,108 Arnone, et al. filed Jun. 11, 2018.
U.S. Appl. No. 16/011,110 Arnone, et al. filed Jun. 18, 2018.

(56) References Cited

OTHER PUBLICATIONS

U.S. Appl. No. 16/011,116 Arnone, et al. filed Jun. 18, 2018.
U.S. Appl. No. 16/017,976 Arnone, et al. filed Jun. 25, 2018.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.
U.S. Appl. No. 15/489,343 Arnone, et al. filed Apr. 17, 2017.
U.S. Appl. No. 15/491,617 Arnone, et al. filed Apr. 19, 2017.
U.S. Appl. No. 15/583,295 Arnone, et al. filed May 1, 2017, 2017.
U.S. Appl. No. 15/589,780 Arnone, et al. filed May 8, 2017.
U.S. Appl. No. 15/597,123 Arnone, et al. filed May 16, 2017.
U.S. Appl. No. 15/597,812 Arnone, et al. filed May 17, 2017.
U.S. Appl. No. 15/599,590 Arnone, et al. filed May 19, 2017.
U.S. Appl. No. 15/605,688 Arnone, et al. filed May 25, 2017.
U.S. Appl. No. 15/605,705 Arnone, et al. filed May 25, 2017.
U.S. Appl. No. 15/626,754 Arnone, et al. filed Jun. 19, 2017.
U.S. Appl. No. 15/631,762 Arnone, et al. filed Jun. 23, 2017.
U.S. Appl. No. 15/632,478 Arnone, et al. filed Jun. 26, 2017.
U.S. Appl. No. 15/632,479 Arnone, et al. filed Jun. 26, 2017.
U.S. Appl. No. 15/632,943 Arnone, et al. filed Jun. 26, 2017.
U.S. Appl. No. 15/632,950 Arnone, et al. filed Jun. 26, 2017.
U.S. Appl. No. 15/641,119 Arnone, et al. filed Jul. 3, 2017.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.

(56) References Cited

OTHER PUBLICATIONS

U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 15/651,934 Arnone, et al. filed Jul. 17, 2017.
U.S. Appl. No. 15/657,826 Arnone, et al. filed Jul. 24, 2017.
U.S. Appl. No. 15/657,835 Arnone, et al. filed Jul. 24, 2017.
U.S. Appl. No. 15/664,535 Arnone, et al. filed Jul. 31, 2017.
U.S. Appl. No. 15/667,168 Arnone, et al. filed Aug. 2, 2017.
U.S. Appl. No. 15/267,511 Rowe, filed Sep. 16, 2016.
U.S. Appl. No. 15/681,966 Arnone, et al. filed Aug. 21, 2017.
U.S. Appl. No. 15/681,970 Arnone, et al. filed Aug. 21, 2017.
U.S. Appl. No. 15/681,978 Arnone, et al. filed Aug. 21, 2017.
U.S. Appl. No. 15/687,922 Arnone, et al. filed Aug. 28, 2017.
U.S. Appl. No. 15/687,927 Arnone, et al. filed Aug. 28, 2017.
U.S. Appl. No. 15/694,520 Arnone, et al. filed Sep. 1, 2017.
U.S. Appl. No. 15/694,738 Arnone, et al. filed Sep. 1, 2017.
U.S. Appl. No. 15/713,595 Arnone, et al. filed Sep. 22, 2017.
U.S. Appl. No. 15/715,144 Arnone, et al. filed Sep. 25, 2017.
U.S. Appl. No. 15/716,317 Arnone, et al. filed Sep. 26, 2017.
U.S. Appl. No. 15/716,318 Arnone, et al. filed Sep. 26, 2017.
U.S. Appl. No. 15/728,096 Arnone, et al. filed Oct. 9, 2017.
U.S. Appl. No. 15/784,961 Arnone, et al. filed Oct. 16, 2017.
U.S. Appl. No. 15/790,482 Arnone, et al. filed Oct. 23, 2017.
U.S. Appl. No. 15/794,712 Arnone, et al. filed Oct. 26, 2017.
U.S. Appl. No. 15/797,571 Arnone, et al. filed Oct. 30, 2017.
U.S. Appl. No. 15/804,413 Arnone, et al. filed Nov. 6, 2017.
U.S. Appl. No. 15/811,412 Arnone, et al. filed Nov. 13, 2017.
U.S. Appl. No. 15/811,419 Arnone, et al. filed Nov. 13, 2017.
U.S. Appl. No. 15/815,629 Arnone, et al. filed Nov. 16, 2017.
U.S. Appl. No. 15/822,908 Arnone, et al. filed Nov. 27, 2017.
U.S. Appl. No. 15/822,912 Arnone, et al. filed Nov. 27, 2017.
U.S. Appl. No. 15/830,614 Arnone, et al. filed Dec. 4, 2017.
U.S. Appl. No. 15/834,006 Arnone, et al. filed Dec. 6, 2017.
U.S. Appl. No. 15/837,795 Arnone, et al. filed Dec. 11, 2017.
U.S. Appl. No. 15/845,433 Arnone, et al. filed Dec. 18, 2017.
U.S. Appl. No. 15/858,817 Arnone, et al. filed Dec. 29, 2017.
U.S. Appl. No. 15/858,826 Arnone, et al. filed Dec. 29, 2017.
U.S. Appl. No. 15/862,329 Arnone, et al. filed Jan. 4, 2018.
U.S. Appl. No. 15/864,737 Arnone, et al. filed Jan. 8, 2018.
U.S. Appl. No. 15/882,328 Arnone, et al. filed Jan. 29, 2018.
U.S. Appl. No. 15/882,333 Arnone, et al. filed Jan. 29, 2018.
U.S. Appl. No. 15/882,428 Arnone, et al. filed Jan. 29, 2018.
U.S. Appl. No. 15/882,447 Arnone, et al. filed Jan. 29, 2018.
U.S. Appl. No. 15/882,850 Arnone, et al. filed Jan. 29, 2018.
U.S. Appl. No. 15/882,902 Arnone, et al. filed Jan. 29, 2018.
U.S. Appl. No. 15/888,512 Arnone, et al. filed Feb. 5, 2018.
U.S. Appl. No. 15/894,398 Arnone, et al. filed Feb. 12, 2018.
U.S. Appl. No. 15/912,019 Arnone, et al. filed Mar. 5, 2018.
U.S. Appl. No. 15/912,026 Arnone, et al. filed Mar. 5, 2018.
U.S. Appl. No. 15/912,529 Arnone, et al. filed Mar. 5, 2018.
U.S. Appl. No. 15/920,374 Arnone, et al. filed Mar. 13, 2018.
U.S. Appl. No. 15/920,380 Arnone, et al. filed Mar. 13, 2018.
U.S. Appl. No. 15/920,388 Arnone, et al. filed Mar. 13, 2018.

* cited by examiner

FIG. 8
Interactive Controller 906
Process Controller 904
Chance-Based Controller 902
Credit Processing System 903
Detect User Interactions 907
Credit Input 909
Credit 905
Application Telemetry 908
Chance Outcome Request 912
Determine Chance Outcome 913
Chance Outcome 914
Determine Skill Proposition 915
Skill Proposition 916
Present Skill Proposition 918
Detect User Interactions 920
Determine Skill Outcome 922
Skill Outcome 924
Determine Combined Outcome 926
Combined Outcome 928
Update Credit Meters 930
Updated Credit Meters 932
Generate Wagering Telemetry 934
Wagering Telemetry 936
Update Wagering User Interface 938
Credit 940
Credit Output 942

1204

1202

1206

BILLIARD COMBINED PROPOSITION WAGERING SYSTEM

CROSS REFERENCE TO RELATED APPLICATIONS

This application is a continuation of U.S. patent application Ser. No. 14/984,965, filed Dec. 30, 2015, which claims the benefit of U.S. Provisional Patent Application No. 62/099,129, filed Dec. 31, 2014, the disclosure of which is incorporated by reference herein in its entirety.

FIELD OF THE INVENTION

Embodiments of the present invention are generally related to communications within data processing systems. More particularly, the present invention relates to the communication and processing of wagering data.

BACKGROUND

The gaming industry has traditionally developed electronic gaming machines (EGMs) that implement simple wagers. However, more complicated wagering processes need communication and processing systems that are better suited for implementing these more complicated wagering processes. Various aspects of embodiments of the present invention meet such a need.

SUMMARY OF THE INVENTION

Systems and methods in accordance with embodiments of the invention provide a communication and data processing system constructed for a billiard combined proposition wagering system.

In an embodiment of the invention, a combined wagering proposition includes one or more skill propositions and one or more chance propositions. In some embodiments, one or more skill outcomes of the one or more skill propositions are used to allocate one or more chance outcomes of the one or more chance propositions to determine a combined wagering outcome for the combined wagering proposition. In other such embodiments, one or more chance outcomes of the one or more chance propositions are used to allocate one or more skill outcomes of the one or more skill propositions to determine a combined wagering outcome for the combined wagering proposition.

In an embodiment of the invention, a process controller operates as an interface between an interactive controller that determines skill outcomes and a chance-based controller that determines chance outcomes. By virtue of this feature, the chance-based controller is isolated from the interactive controller allowing the interactive controller to operate in an unregulated environment will allowing the chance-based controller to operate in a regulated environment, thus providing for more efficient management of the operations of such a system.

In another embodiment of the invention, a single chance-based controller may provide services to two or more interactive controllers and/or two or more process controllers, thus allowing a billiard combined proposition wagering system to operate more efficiently over a large range of scaling.

In another embodiment of the invention, multiple types of interactive controllers using different operating systems may be interfaced to a single type of process controller and/or chance-based controller without requiring customization of the process controller and/or the chance-based controller, thus improving the efficiency of the process controller and or the chance-based controller by reducing complexity associated with maintaining separate process controllers and/or chance-based controllers for each type of interactive controller.

In another embodiment of the invention, an interactive controller may be provided as a user device under control of a user while maintaining the chance-based controller in an environment under the control of a regulated operator of wagering equipment, thus providing for a more economical system as the regulated operator need not expend capital to purchase interactive controllers.

In another embodiment of the invention, data communicated between the controllers may be encrypted to increase security of the billiard combined proposition wagering system.

In another embodiment of the invention, a process controller isolates chance proposition logic and skill proposition logic as unregulated logic from a regulated chance-based controller, thus allowing errors in the skill proposition logic and/or chance proposition logic to be corrected, new skill proposition logic and/or chance proposition logic to be used, or modifications to be made to the skill proposition logic and/or chance proposition logic without a need for time-consuming regulatory approval.

In another embodiment of the invention, an interactive application may require extensive processing resources from an interactive controller leaving few processing resources for the functions performed by a process controller and/or a chance-based controller. By virtue of an architecture of some embodiments of the invention, processing loads may be distributed across multiple devices such that operations of the interactive controller may be dedicated to the interactive application and the processes of the process controller and/or chance-based controller are not burdened by the requirements of the interactive application.

In another embodiment of the invention, a billiard combined proposition wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like. In many such embodiments, one or more components of a billiard combined proposition wagering system are distributed in close proximity to each other and communicate using a local area network and/or a communication bus. In several embodiments, an interactive controller and a process controller of a billiard combined proposition wagering system are in a common location and communicate with an external chance-based controller. In some embodiments, a process controller and a chance-based controller of a billiard combined proposition wagering system are in a common location and communicate with an external interactive controller. In many embodiments, an interactive controller, a process controller, and a chance-based controller of a billiard combined proposition wagering system are located in a common location. In some embodiments, a session/management controller is located in a common location with a process controller and/or a chance-based controller. In various embodiments, these multiple devices can be constructed from or configured using a single device or a plurality of devices such that a billiard combined proposition wagering system is executed as a system in a virtualized space such as, but not limited to, where a chance-based controller and a process controller are large scale centralized servers in the cloud operatively connected to widely distributed interactive controllers via a wide area network such as the Internet or a local area network. In such embodiments, the components of a billiard combined proposition wagering system may communicate using a networking protocol or other type of device-to-device communications protocol.

In another embodiment of the invention, a centralized chance-based controller is operatively connected to, and communicates with, one or more process controllers using a communication link. The centralized chance-based controller can generate chance outcomes for wagers in accordance with one or more chance-based propositions. The centralized chance-based controller can determine a number of simultaneous or pseudo-simultaneous chance outcomes in accordance with a variety of chance-based propositions that one or more distributed billiard combined proposition wagering systems can use.

In another embodiment of the invention, a centralized process controller is operatively connected to one or more interactive controllers and one or more chance-based controllers using a communication link. The centralized process controller can perform the functionality of a process controller across various billiard combined proposition wagering systems.

In another embodiment of the invention, an interactive application server provides a host for managing head-to-head play operating over a network of interactive controllers connected to the interactive application server using a communication link. The interactive application server provides an environment where users can compete directly with one another and interact with other users.

An embodiment includes an interactive controller constructed to: provide an interactive application display associated with an interactive application provided by the interactive controller; communicate, to a process controller, initialization data; communicate, to the process controller, skill outcome data; receive, from the process controller, wagering telemetry data; and update a wagering user interface based on the wagering telemetry data; a chance-based controller constructed to: receive, from a credit processing system, incoming credit data; receive, from the process controller, chance outcome request data; determine a chance outcome for a chance-based proposition based on the chance outcome request data; communicate, to the process controller, chance outcome data; receive, from the process controller, combined outcome data; update one or more credit meters based on the combined outcome data; and communicate, to the process controller, updated credit meter data; and the process controller operatively connecting the interactive controller and the chance-based controller, the process controller constructed to: receive, from the interactive controller, the initialization data; responsive to receiving the initialization data, communicate, to the chance-based controller, the chance outcome request data; receive, from the chance-based controller, the chance outcome data, wherein the chance outcome data comprises one or more outcomes; determine object values by assigning each outcome to one or more objects associated with the interactive application; receive, from the interactive controller, the skill outcome data; update the object values based on the skill outcome data; determine a billiard combined outcome based on the skill outcome data and the chance outcome data; communicate, to the chance-based controller, combined outcome data; receive, from the chance-based controller, the updated credit meter data; generate wagering telemetry data based on the combined outcome data and the updated credit meter data; and communicate, to the interactive controller, the wagering telemetry data.

In a further embodiment, the interactive controller and the process controller are constructed from the same device, and the process controller is operatively connected to the chance-based controller using a communication link.

In a further embodiment, the chance-based controller and the process controller are constructed from the same device, and the process controller is operatively connected to the interactive controller using a communication link.

In a further embodiment, the system comprises: an enclosure constructed to mount: a user input device operatively connected to the interactive controller; a user output device operatively connected to the interactive controller; a credit input device operatively connected to the chance-based controller; and a credit output device operatively connected to the chance-based controller.

In a further embodiment, the chance-based controller is further constructed to: communicate with the credit input device to receive a credit input; credit a credit meter with credits based on the incoming credit data; resolve a chance-based proposition based on a communication received from the process controller; update the credit meter based on a chance outcome of the wager; and communicate with the credit output device to generate a credit output based on credits transferred off of the credit meter.

In a further embodiment, the interactive application is a billiards interactive application and the one or more objects are billiard balls.

In a further embodiment, the skill outcome data reflects a user putting a billiard ball in a pocket, and wherein the object value associated with the pocketed ball is credited to the user.

In a further embodiment, the skill outcome reflects a scratch, and wherein the object value associated with the scratched ball is reassigned to one or more other billiard balls.

An embodiment includes an interactive controller constructed to: provide an interactive application display associated with an interactive application provided by the interactive controller; communicate, to a process controller, initialization data; communicate, to the process controller, skill outcome data; receive, from the process controller, wagering telemetry data; and update a wagering user interface based on the wagering telemetry data; and the process controller operatively connecting the interactive controller and a chance-based controller, the process controller constructed to: receive, from the interactive controller, the initialization data; responsive to receiving the initialization data, communicate, to the chance-based controller, chance outcome request data; receive, from the chance-based controller, chance outcome data, wherein the chance outcome data comprises one or more outcomes; determine object values by assigning each outcome to one or more objects associated with the interactive application; receive, from the interactive controller, the skill outcome data; update the object values based on the skill outcome data; determine a billiard combined outcome based on the skill outcome data and the chance outcome data; communicate, to the chance-based controller, combined outcome data; receive, from the chance-based controller, updated credit meter data; generate wagering telemetry data based on the combined outcome data and the updated credit meter data; and communicate, to the interactive controller, the wagering telemetry data.

An embodiment includes a chance-based controller constructed to: receive, from a credit processing system, incoming credit data; receive, from a process controller, chance outcome request data; determine a chance outcome for a chance-based proposition based on the chance outcome request data; communicate, to the process controller, chance outcome data; receive, from the process controller, combined outcome data; update one or more credit meters based on the combined outcome data; and communicate, to the process controller, updated credit meter data; and the process controller operatively connecting an interactive controller and the chance-based controller, the process controller constructed to: receive, from the interactive controller, initialization data; responsive to receiving the initialization data, communicate, to the chance-based controller, the chance outcome request data; receive, from the chance-based controller, the chance outcome data, wherein the chance outcome data comprises one or more outcomes; determine object values by assigning each outcome to one or more objects associated with an interactive application provided by the interactive controller; receive, from the interactive controller, skill outcome data; update the object values based on the skill outcome data; determine a billiard combined outcome based on the skill outcome data and the chance outcome data; communicate, to the chance-based controller, combined outcome data; receive, from the chance-based controller, the updated credit meter data; generate wagering telemetry data based on the combined outcome data and the updated credit meter data; and communicate, to the interactive controller, the wagering telemetry data.

DETAILED DESCRIPTION

Figure 1:
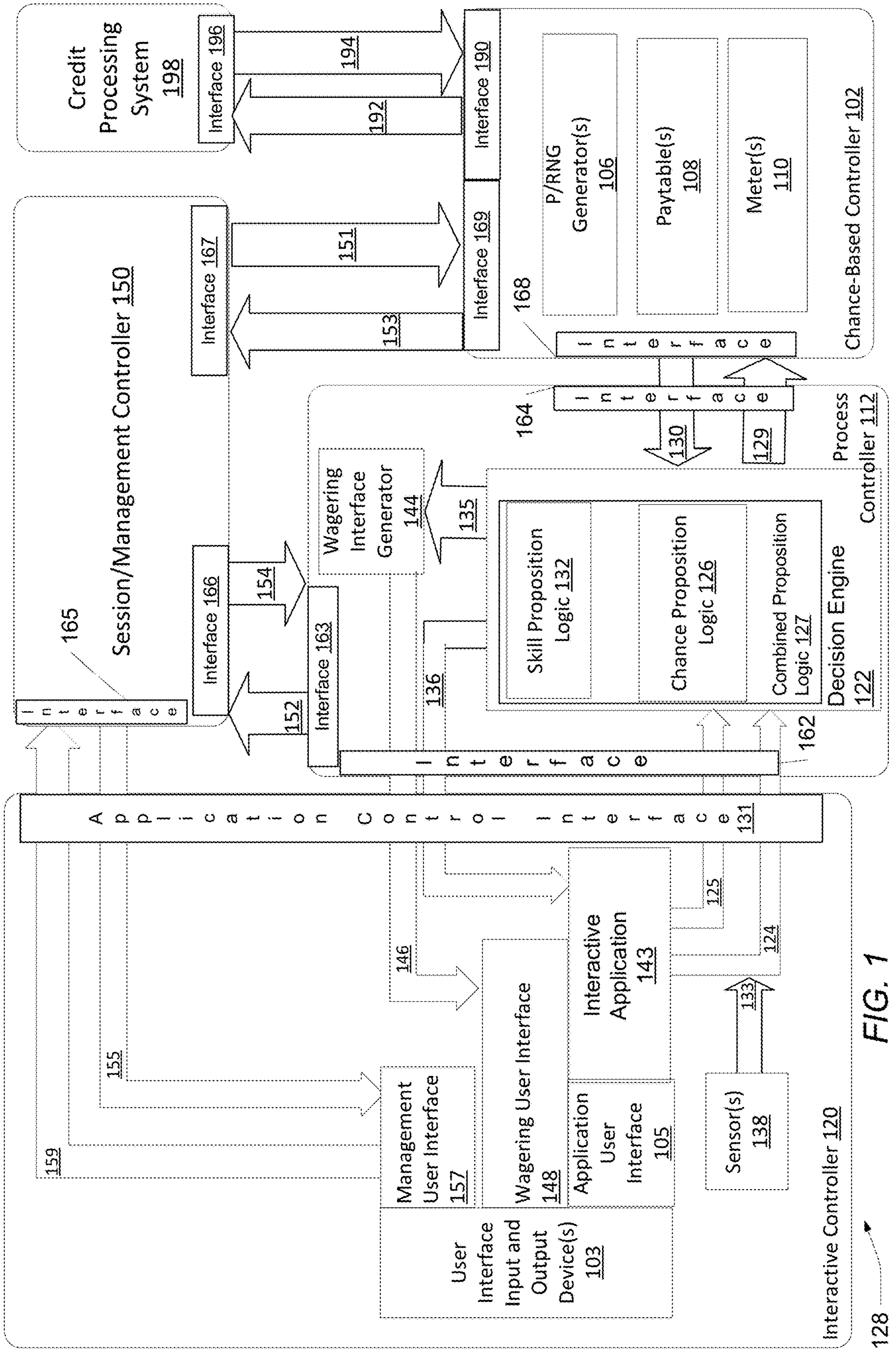
FIG. 1 is a diagram of a structure of a billiard combined proposition wagering system in accordance with various embodiments of the invention.

A billiard combined proposition wagering system allows for the management of a combined wagering proposition having one or more skill propositions combined with one or more chance propositions. In some embodiments of a billiard combined proposition wagering system, an interactive application executed by an interactive controller provides skill proposition components of the billiard combined proposition wagering system. The interactive controller is operatively connected to a process controller that manages and configures the interactive controller and the interactive application, and determines how chance outcomes determined by a chance-based controller should be combined with skill outcomes determined by the interactive application. The process controller is further operatively connected to a chance-based controller that provides the chance outcomes for chance-based propositions.

In some embodiments, the interactive controller also provides a wagering user interface that is used to receive commands and display data for a combined wagering process and combined wagering outcome determined from a chance outcome and a skill outcome in accordance with a combined wagering proposition. The content of the wagering user interface is controlled by the process controller and includes content provided by the chance-based controller and the interactive controller.

In various embodiments, an interactive controller provides a management user interface used to manage a user profile.

Many different types of interactive applications may be utilized with the billiard combined proposition wagering system. In some embodiments, the interactive application reacts to the physical activity of a user. In these embodiments, the interactive application senses user interactions with the interactive application through one or more sensors that monitor the user's physical activities. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors.

In some embodiments, the interactive application implements a skill-based game and interacts with the user by sensing skillful interactions with an interactive display generated by the interactive application.

In some embodiments, the interactive application is a tool used to achieve some useful goal.

In many embodiments, the interactive application generates various types of interactive elements in an interactive application environment. In some embodiments, these interactive elements are interactive application resources utilized within the interactive application environment to provide an interactive experience for a user. Chance outcomes of credits or interactive elements are determined in accordance with a chance-based proposition and initiation of automatic resolution of the chance-based proposition is achieved by interaction with one or more of the interactive elements of the interactive application. Chance outcomes of chance-based propositions of credits or interactive elements can cause consumption, loss or accrual of respective credits and/or interactive elements.

In accordance with some embodiments, chance outcomes of chance-based propositions events can influence interactive elements in the interactive application environment such as, but not limited to, automatically providing one or more new interactive elements, automatically restoring one or more consumed interactive elements, automatically causing the loss of one or more interactive elements, and automatic restoration or placement of one or more fixed interactive elements.

In various embodiments, the chance outcomes may be determined using one or more types of credits.

In some embodiments, credits can be one or more credits that are purchased using, and redeemed in, a real world currency having a real world value.

In many embodiments, credits can be one or more credits in a virtual currency. Virtual currency is an alternate currency that can be acquired, purchased or transferred by or to a user, but does not necessarily directly correlate to a real world currency. In many such embodiments, credits in a virtual currency are allowed to be purchased using a real world currency but are prevented from being redeemed in a real world currency having a real world value.

In several embodiments, interaction with the interactive elements of the interactive application, application credits can be optionally consumed and/or accrued within the interactive application as a result of interaction with the interactive elements. Application credits can be in the form of, but not limited to, application environment credits, experience points, and points generally.

In various embodiments, application credits are awarded on the basis of skillful interactions with the interactive elements of a skill-based interactive application. The skill-based interactive application can have one or more scoring criteria, embedded within a process controller and/or an interactive controller that provides the skill-based interactive application, that can be used to determine user performance against one or more goals of the skill-based interactive application in accordance with a skill proposition.

In many embodiments, application credits can be used to purchase in-application items, including but not limited to, application interactive elements that have particular properties, power ups for existing items, and other item enhancements.

In some embodiments, application credits may be used to earn entrance into a sweepstakes drawing, to earn entrance in a tournament with prizes, to score in the tournament, and/or to participate and/or score in any other game event.

In several embodiments, application credits can be stored on a user-tracking card or in a network-based user tracking system where the application credits are attributed to a specific user.

In many embodiments, a chance-based proposition includes utilization of application credits for a chance outcome of a randomly generated payout of interactive application credits, interactive elements, and/or interactive application objects in accordance with the chance-based proposition.

In a number of embodiments, a chance-based proposition utilizing an amount of credits results in a chance outcome of a payout of application credits, interactive elements, and/or interactive application objects that have a credit value if cashed out.

In some embodiments, such as when an interactive application is a skill-based interactive application, interactive application objects include in-application objects that may be utilized to enhance interactions with the skill-based interactive application. Such objects include, but are not limited to, power-ups, enhanced in-application items, and the like. In some embodiments, the interactive application objects include objects that are detrimental to interactions with the skill-based interactive application such as, but not limited to, obstructions in the skill-based interactive application space, a temporary handicap, an enhanced opponent, and the like.

In some embodiments, interactive elements in an interactive application include, but are not limited to, enabling interactive elements (EIE) that are interactive application environment resources utilized during interaction with an interactive application and whose utilization automatically initiates resolution of a chance-based proposition. In some embodiments, interactive elements in an interactive application include, but are not limited to, a reserve enabling interactive element (REIE), that is an interactive element that is automatically converted into one or more enabling interactive elements upon occurrence of a release event during an interactive session of an interactive application. In yet another embodiment, interactive elements in an interactive application include, but are not limited to, an actionable interactive element (AIE) that is an interactive element that is acted upon during a session of the interactive application to automatically initiate resolution of a chance-based proposition and may or may not be restorable during normal interaction with the interactive application. In yet another embodiment, interactive elements in an interactive application include a common enabling interactive element (CEIE) that is an interactive element that the interactive application shares between two or more users and causes a wagering event to be automatically determined in accordance with a combined proposition when interacted with by one or more of the two or more users during a session. In some embodiments, a user can utilize interactive elements during interactions with a controlled entity (CE) provided by an interactive application to a user.

In accordance with some embodiments of a billiard combined proposition wagering system, the initiation of resolution of a chance-based proposition can be dependent upon an interactive application environment variable such as, but not limited to, a required object (RO), a required environmental condition (REC), or a controlled entity characteristic (CEC). A RO is a specific interactive application object in an interactive application acted upon for an AE to be completed. A non-limiting example of an RO is a specific key needed to open a door. An REC is an interactive application state present within an interactive application for an AE to be completed. A non-limiting example of an REC is daylight whose presence enables a character to walk through woods. A CEC is a status of a controlled entity (CE) within an interactive application for an AE to be completed. A non-limiting example of a CEC is requirement that a CE have full health points before entering battle. Although various interactive application resources such as, but not limited to, the types of interactive application interactive elements as discussed herein may be used to automatically initiate resolution of a chance-based proposition in accordance with a chance-based proposition, one skilled in the art will recognize that any interactive application resource can be utilized in a billiard combined proposition wagering system to automatically initiate resolution of a chance-based proposition.

In several embodiments, a billiard combined proposition wagering system can utilize a process controller to continuously monitor use of the interactive application executed by an interactive controller in order to detect a wagering event and automatically initiate resolution of a combination proposition based on the wagering event.

In several embodiments, a wagering event occurrence can be determined by a process controller from one or more application environment variables within an interactive application environment that are used to initiate resolution of a combination proposition. Application environment variables can include, but are not limited to, passage of a period of time during billiard combined proposition wagering system interactive application use, a result from a billiard combined proposition wagering system interactive application session (such as, but not limited to, achieving a goal or a particular score), consumption of an interactive element, or an interaction that achieves a combination of interactive elements to be associated with a user profile.

In numerous embodiments, an interactive application instruction is an instruction by a process controller to an interactive controller and/or an interactive application of the interactive controller to modify a state of an interactive application or modify one or more interactive application resources or interactive elements. In some embodiments, the interactive application commands may be automatically generated by the process controller using one or more of a chance outcome and/or application environment variables. An interactive application instruction can be used by a process controller control many processes of an interactive application, such as, but not limited to, an causing an addition of a period of time available for a current interactive application session for the interactive application, an addition of a period of time available for a future billiard combined proposition wagering system interactive application session or any other modification to the interactive application interactive elements that can be utilized during an interactive application session. In some embodiments, an interactive application instruction can be used by the process controller to modify a type of an interactive element.

In several embodiments, a process controller of a billiard combined proposition wagering system may provide for a communications interface for asynchronous communications between a chance-based controller and an interactive application provided by an interactive controller, by operatively connecting the interactive controller, and thus the interactive controller's interactive application, with the chance-based controller.

In some embodiments, asynchronous communications provided for by a billiard combined proposition wagering system may reduce an amount of idle waiting time by an interactive controller of the billiard combined proposition wagering system, thus increasing an amount of processing resources that the interactive controller may provide to an interactive application or other processes of the interactive controller. In many embodiments, asynchronous communications provided for by a billiard combined proposition wagering system reduces an amount of idle waiting time by a chance-based controller, thus increasing an amount of processing resources that the chance-based controller may provide to determining chance outcomes, and other processes provided by the chance-based controller.

In some embodiments, a chance-based controller of a billiard combined proposition wagering system may be operatively connected to a plurality of interactive controllers through one or more process controllers and the asynchronous communications provided for by the one or more process controllers allows the chance-based controller to operate more efficiently by providing chance outcomes to a larger number of interactive controllers than would be achievable without the one or more process controllers of the billiard combined proposition wagering system.

In some embodiments, a billiard combined proposition wagering system including a process controller operatively connected to a chance-based controller and operatively connected to an interactive controller may provide for simplified communication protocols for communications of the interactive controller as the interactive controller may communicate interactions with an interactive application provided by the interactive controller to the process controller without regard to a nature of a chance-based proposition to be combined proposition with processes of the interactive application.

In various embodiments, a billiard combined proposition wagering system including a process controller operatively connected to a chance-based controller and operatively connected to an interactive controller may provide for simplified communication protocols for communications of the chance-based controller as the chance-based controller may receive requests and communicate chance outcomes without regard to a nature of an interactive application provided by the interactive controller.

In some embodiments, a billiard combined proposition wagering system including a process controller operatively connecting a chance-based controller to an interactive controller may provide for reduced processing requirement for the interactive controller by offloading the execution of a random number generator from the interactive controller to the chance-based controller. In various such embodiments, additional processing resources may be made available to graphics processing or other processing intensive operations by the interactive controller because of the offloaded random number processing.

In various embodiments, a billiard combined proposition wagering system including a process controller operatively connecting a chance-based controller to an interactive controller provides for operation of the interactive controller in an unsecure location or manner, while providing for operation of the chance-based controller in a secure location or manner.

In some embodiments, a billiard combined proposition wagering system including a process controller operatively connecting a chance-based controller to an interactive controller allows the combined proposition wagering system to have regulated components coupled to unregulated components in a heterogeneous regulated environment. For example, in several such embodiments, the interactive controller may be a device that is not regulated by a wagering regulatory agency whereas the chance-based controller is regulated by the wagering regulatory agency. A process controller of a billiard combined proposition wagering system may provide for isolation of the processing of the interactive controller from the processing of the chance-based controller. In such a heterogeneous regulatory environment, the process controller may or may not be itself a regulated by the wagering regulatory authority. In addition, components of an interactive application executed by the interactive controller may be either regulated or unregulated by the wagering regulatory agency.

Billiard Wagering Combined Proposition Systems

FIG. 1 is a diagram of a structure of a billiard combined proposition wagering system in accordance with various embodiments of the invention. The billiard combined proposition wagering system 128 includes an interactive controller 120, a process controller 112, and a chance-based controller 102. The interactive controller 120 is operatively connected to, and communicates with, the process controller 112. The process controller 112 is also operatively connected to, and communicates with, the chance-based controller 102.

In some embodiments, a billiard combined proposition wagering system includes a session/management controller 150 operatively connected to one or more other components of the billiard combined proposition wagering system.

In many embodiments, a billiard combined proposition wagering system includes a credit processing system 198 operatively connected to one or more other components of the billiard combined proposition wagering system.

In various embodiments, the chance-based controller 102 includes one or more interfaces, such as interfaces 168, 169 and 190, that operatively connect the chance-based controller 102 to one or more session management servers, such as session/management controller 150, to one or more process controllers, such as process controller 112, and/or to a credit processing system 198, by their respective interfaces.

In some embodiments, one or more of the chance-based controller interfaces implement a chance-based controller interprocess communication protocol so that the chance-based controller 102 and one or more process controllers, one or more credit processing systems and/or one or more session/management controllers may be implemented on the same device. In operation, the chance-based controller interfaces provide application programming interfaces or the like that are used by the chance-based controller to communicate outgoing data and receive incoming data by passing parameter data to another process or application running on the same device.

In some embodiments, one or more of the chance-based controller interfaces implement a chance-based controller communication protocol employing an interdevice communication protocol so that the chance-based controller may be implemented on a device separate from one or more process controllers, one or more credit processing systems and/or one or more session/management controllers. The interdevice protocol may utilize a wired communication bus or wireless connection as a physical layer.

In various embodiments, one or more of the chance-based controller interfaces implement a chance-based controller communication protocol employing a networking protocol so that the chance-based controller may be operatively connected to one or more session/management controllers, one or more credit processing systems and/or one or more process controllers by a network. The networking protocol may utilize a wired communication bus or wireless connection as a physical layer. In many such embodiments, the networking protocol operates over a computer network and/or a telephone network or the like. During operation, the one or more chance-based controller interfaces communicate outgoing data to an external device or server by encoding the data into a signal and transmitting the signal to the external device or server. The one or more chance-based controller interfaces receive incoming data from an external device or server by receiving a signal transmitted by the external device or server and decoding the signal to obtain the incoming data.

In several embodiments, the chance-based controller 102 is a controller for providing one or more chance-based propositions provided by the billiard combined proposition wagering system 128 and automatically determines chance outcomes in accordance with the chance-based propositions as instructed by the process controller 112. Types of value utilized in a chance-based proposition can be one or more of several different types. Types of value of a chance-based proposition can include, but are not limited to, a chance-based proposition of an amount of credits corresponding to a real currency or a virtual currency, a chance-based proposition of an amount of application credits earned through interaction with an interactive application, a chance-based proposition of an amount of interactive elements of an interactive application, and a chance-based proposition of an amount of objects used in an interactive application. A chance outcome determined for a chance-based proposition can increase or decrease an amount of the type of value used in the chance-based proposition, such as, but not limited to, increasing or decreasing an amount of credits for a chance-based proposition of credits. In various embodiments, a chance outcome determined for a chance-based proposition can increase or decrease an amount of a type of value that is different than a type of value of the chance-based proposition, such as, but not limited to, increasing an amount of an object of an interactive application for a chance-based proposition of credits.

In many embodiments, the chance-based controller 102 includes one or more random number generators (RNGs) 106 for generating random results, one or more paytables 108 for determining a chance outcome from the random results, and one or more credit meters 110 for storing data about amounts of stored, wagered and won credits.

In several embodiments, the chance-based controller 102 is operatively connected to the credit processing system 198 via interface 190. The chance-based controller 102 communicates with the credit processing system 198 to receive incoming credit data 194 from the credit processing system 198. The chance-based controller 102 uses the incoming credit data 194 to transfer credits into the billiard combined proposition wagering system and onto the one or more credit meters 110. The chance-based controller 102 communicates outgoing credit data 192 to the credit processing system 198 to transfer credits off of the one or more credit meters 110 and out of the billiard combined proposition wagering system.

In many embodiments, the credit processing system 198 includes one or more credit input devices for generating incoming credit data 192 from a credit input. Credit inputs can include, but are not limited to, credit items used to transfer credits. The incoming credit data 194 are communicated to the chance-based controller 102. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, ticket-in-ticket-out (TITO) tickets, rewritable cards, or the like; and bill validator and/or coin validators that receive and validate paper and/or coin currency or tokens.

In various embodiments, the credit processing system 198 includes one or more credit output devices for generating a credit output based on outgoing credit data 192 communicated from the chance-based controller. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing system 198 are operatively connected to, and communicate with, a TITO controller or the like to determine incoming credit data 194 representing amounts of credits to be transferred into the billiard combined proposition wagering system and to determine outgoing credit data 192 representing amounts of credits to be transferred out of the billiard combined proposition wagering system. In operation, the credit processing system 198 communicate with a connected credit input device, such as a bill validator/ticket scanner, used to scan a credit input in the form of a TITO ticket having indicia of credit account data of a credit account of the TITO controller. The credit processing system 198 communicates the credit account data to the TITO controller. The TITO controller uses the credit account data to determine an amount of credits to transfer to the credit processing system 198, and thus to the chance-based controller 102 of the billiard combined proposition wagering system 128. The TITO controller communicates the amount of credits to the credit processing system 198. The credit processing system 198 communicates the amount of credits as incoming credit data 194 to the chance-based controller 102 and the chance-based controller 102 credits one or more credit meters with the amount of credits so that the credits can be used when a user makes wagers using the billiard combined proposition wagering system 128.

In many embodiments, the credit processing system 198 includes a bill validator/ticket scanner as one of the one or more credit input devices. The credit processing system 198 communicates with the bill validator/ticket scanner to scan currency used as a credit input to determine an amount of credits as incoming credit data 194 to transfer credit to one or more credit meters 110 associated with one or more users. The chance-based controller 102 credits the one or more credit meters 110 with the amount of credits so that the credits can be used when a user makes wagers using the billiard combined proposition wagering system 128.

In some embodiments, the credit processing system 198 can use a TITO controller along with a ticket or voucher printer as one of the one or more credit output devices to generate a TITO ticket as a credit output for a user. In operation, the credit processing system 198 communicates, as outgoing credit data 192, data of an amount of credits to be credited to a credit account on the TITO controller. The TITO controller receives the amount of credits and creates the credit account and credits the credit account with the amount of credits. The TITO controller generates credit account data for the credit account and communicates the credit account data to the credit processing system 198. The credit processing system 198 uses the ticket or voucher printer to print indicia of the credit account data onto a TITO ticket as a credit output.

In various embodiments, the credit processing system 198 provides an interface to an electronic payment management system (not shown) such an electronic wallet or the like. The electronic payment system provides credit account data that is used for generating incoming credit data 194 as a credit input and outgoing credit data 192 as a credit output.

In several embodiments, during operation, the chance-based controller 102 communicates with the credit processing system 198 to receive incoming credit data 194 from the credit processing system 198 and adds credits onto the one or more credit meters 110 at least partially on the basis of the incoming credit data 194. The one or more RNGs 106 execute processes that generate random results. The chance-based controller uses the one or more paytables 108 to map the random results to a chance outcome. The chance-based controller 102 adds credits to, or deducts credits from, the one or more credit meters 110 based in part on the chance outcome. For example, in some embodiments, the chance-based controller 102 adds an amount of credits to the one or more credit meters 110 when the chance outcome indicates a win and deducts an amount of credits from the one or more credit meters 110 when the chance outcome indicates a loss or a partial win. At an end of a wagering session, the chance-based controller 102 transfers credits off of the one or more credit meters 110 and out of the billiard combined proposition wagering system by communicating outgoing credit data 192 to the credit processing system 198.

In various embodiments, the chance-based controller 102 includes one or more paytables 108. The one or more paytables 108 are used to implement one or more chance-based propositions in conjunction with one or more random outputs of the one or more RNGs 106.

In many embodiments, the chance-based controller 102 generates random numbers by continuously generating pseudo random numbers using a pseudo random number generator. A most current pseudo random number is stored in a buffer thus constantly refreshing the buffer. In many embodiments, the buffer is refreshed at a rate exceeding 100 times per second. When the chance-based controller receives a request for a chance outcome, the chance-based controller retrieves the stored most current pseudo random number from the buffer. As timing between requests for a chance outcome is not deterministic, the resulting output from the buffer is a random number. The random number is used along with a paytable that the chance-based controller selects from the one or more paytables 108. The selected paytable includes a mapping of values in a range of values of the random number to specified multipliers to be applied to an amount of credits to determine an amount of credits to be added to one or more credit meters associated with the chance-based proposition. A multiplier is selected from the paytable based on the random number and the selected multiplier is used along with an amount of credits to determine a chance outcome as an amount of credits.

In various embodiments, a chance outcome can include, but is not limited to, an amount of credits, application credits, and/or interactive elements or objects won as a function of the billiard combined proposition wagering system use and a type and amount of credits, application credits and/or interactive application objects wagered. A multiplier taken from the one or more paytables 108 is applied to the amount of credits, application credits and/or interactive application objects wagered and the resultant outcome is a chance outcome for a chance-based proposition.

In some embodiments, a range of the value of the random number is mapped to one or more symbols representing one or more random elements of a traditional chance-based proposition, and the mapped to one or more symbols are used in conjunction with a paytable selected from the one or more paytables 108. In one such embodiment, a random number is mapped to a virtual card of a deck of virtual cards. In another such embodiment, the random number is mapped to a virtual face of a virtual die. In yet another such embodiment, the random number is mapped to symbol of a virtual reel strip on a virtual reel slot machine. In yet another such embodiment, the random number is mapped to a pocket of a virtual roulette wheel. In some embodiments, two or more random numbers are mapped to appropriate symbols to represent a completed chance-based proposition. In one such embodiment, two or more random numbers are mapped to faces of two or more virtual dice to simulate a random outcome generated by throwing two or more dice. In another such embodiment, multiple random numbers are mapped to virtual cards from a virtual deck of cards without replacement. In yet another such embodiment, two or more random numbers are mapped to two or more virtual reel strips to create stop positions for a virtual multi-reel slot machine.

In some embodiments, a chance-based controller resolves a chance proposition by executing chance proposition determination commands that define processes of a chance-based proposition where the chance proposition determination commands are formatted in a scripting language. In operation, a decision engine of a process controller generates the chance proposition determination commands in the form of a script written in the scripting language. The script includes the chance proposition determination commands that describe how the chance-based controller is to resolve the chance-based proposition. The completed script is encoded as chance proposition determination command data and communicated to the chance-based controller by the process controller. The chance-based controller receives the chance proposition determination command data and parses the script encoded in the chance proposition determination command data and executes the commands included in the script to resolve the chance-based proposition to determine a chance outcome.

In some embodiments, a chance-based controller resolves a chance-based proposition by executing chance proposition determination commands that define processes of the wagering user interface. In operation, a decision engine of a process controller generates the chance proposition determination commands and encodes the chance proposition determination commands into chance proposition determination command data that are communicated to the chance-based controller by the process controller. The chance-based controller receives the chance proposition determination command data and executes the commands encoded in the chance proposition determination command data to resolve the chance-based proposition.

In various embodiments, the interactive controller 120 executes an interactive application 143 and provides one or more user interface input and output devices 103 so that a user can interact with the interactive application 143. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The interactive controller 120 provides for user interactions with the interactive application 143 by executing the interactive application 143 that generates an application interface 105 that utilizes the user interface input devices 103 to detect user interactions with the interactive controller and generates an interactive user interface that is presented to the user utilizing the user interface output devices.

In some embodiments, one or more components an interactive controller are housed in an enclosure such as a housing, cabinet, casing or the like. The enclosure further includes one or more user accessible openings or surfaces that constructed to mount the user interface input devices and/or the user interface output devices 103.

The interactive controller 120 is operatively connected to, and communicates with, the process controller 112. The interactive controller communicates application telemetry data 124 and skill outcome data 125 to the process controller 112 and receives skill proposition data, application instruction data and resource data 136 from the process controller 112. Via the communication of the skill proposition data, application instruction data, and/or resource data 136, the process controller 112 can control the operation of the interactive controller 120 by communicating control parameters to the interactive application 143 during the interactive application's execution by the interactive controller 120.

In some embodiments, during execution of the interactive application 143 by the interactive controller 120, the interactive controller 120 communicates, as application telemetry data 124, user interactions with the application user interface 105 of the interactive application to the process controller 112. The application telemetry data 124 includes, but is not limited to, utilization of the interactive elements in the interactive application 143.

In some embodiments, the interactive application 143 is a skill-based interactive application. In such embodiments, execution of the skill-based interactive application 143 by the interactive controller 120 is based on a user's skillful interaction with the skill-based interactive application, such as, but not limited to, the user's utilization of the interactive elements of the skill-based interactive application during the user's skillful interaction with the skill-based interactive application. In such an embodiment, the process controller 112 communicates with the interactive controller 120 in order to allow the coupling of the skill-based interactive application to chance outcomes determined in accordance with a chance-based proposition of the chance-based controller 102. In some embodiments, the skill-based interactive application determines skill outcomes 125 based on a skill proposition and a user's skillful interactions with the skill-based interactive application. The skill outcomes 125 are communicated to the process controller 112.

In some embodiments, the interactive controller 120 includes one or more sensors 138 that sense various aspects of the physical environment of the interactive controller 120. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data 133 is communicated by the interactive controller to the process controller 112 as part of the application telemetry data 124. The process controller 112 receives the sensor telemetry data 133 and uses the sensor telemetry data to make chance-based proposition decisions.

In many embodiments, the interactive controller 120 includes a wagering user interface 148 used to display wagering data, via one or more of the user interface input and output devices 103, to one or more users.

In various embodiments, an application control interface 131 resident in the interactive controller 120 provides an interface between the interactive controller 120 and the process controller 112.

In some embodiments, the application control interface 131 implements an interactive controller to process controller communication protocol employing an interprocess communication protocol so that the interactive controller and the process controller may be implemented on the same device. In operation, the application control interface 131 provides application programming interfaces that are used by the interactive processing application 143 of the interactive controller 120 to communicate outgoing data and receive incoming data by passing parameter data to another process or application.

In some embodiments, the application control interface 131 implements an interactive controller to process controller communication protocol employing an interdevice communication protocol so that the interactive controller and the process controller may be implemented on different devices. The interdevice protocol may utilize a wired communication bus or wireless connection as a physical layer.

In various embodiments, the application control interface 131 implements an interactive controller to process controller communication protocol employing a networking protocol so that the interactive controller and the process controller may be implemented on different devices connected by a network. The networking protocol may utilize a wired communication bus or wireless connection as a physical layer. In many such embodiments, the network includes a cellular telephone network or the like and the interactive controller is a mobile device such as a smartphone or other device capable of using the telephone network. During operation, the application control interface 131 communicates outgoing data to an external device by encoding the data into a signal and transmitting the signal to an external device. The application control interface receives incoming data from an external device by receiving a signal transmitted by the external device and decoding the signal to obtain the incoming data.

In various embodiments, the process controller 112 includes one or more interfaces, 162, 163 and 164, that operatively connect the process controller 112 to one or more interactive controllers, such as interactive controller 120, to one or more session management servers, such as session/management controller 150, and/or to one or more chance-based controllers, such as chance-based controller 102, respectively.

In some embodiments, one or more of the process controller interfaces implement a process controller to device or server communication protocol employing an interprocess communication protocol so that the process controller and one or more of an interactive controller, a chance-based controller, and/or a session/management controller may be implemented on the same device. In operation, the process controller interfaces provide application programming interfaces or the like that are used by the process controller to communicate outgoing data and receive incoming data by passing parameter data to another process or application running on the same device.

In some embodiments, one or more of the process controller interfaces implement a process controller communication protocol employing an interdevice communication protocol so that the process controller may be implemented on a device separate from the one or more interactive controllers, the one or more session/management controllers and/or the one or more chance-based controllers. The interdevice protocol may utilize a wired communication bus or wireless connection as a physical layer. In various embodiments, one or more of the process controller interfaces implement a process controller communication protocol employing a networking protocol so that the process controller may be operatively connected to the one or more interactive controllers, the one or more session/management controllers, and/or the one or more chance-based controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more process controller interfaces communicate outgoing data to an external device or server by encoding the data into a signal and transmitting the signal to the external device or server. The one or more process controller interfaces receive incoming data from an external device or server by receiving a signal transmitted by the external device or server and decoding the signal to obtain the incoming data.

In many embodiments, process controller 112 provides an interface between the interactive application 143 provided by the interactive controller 120 and a chance-based proposition provided by the chance-based controller 102.

The process controller 112 includes a rule-based decision engine 122 that receives telemetry data, such as application telemetry data 124, skill outcome data 125, and sensor telemetry data 133, from the interactive controller 120. The rule-based decision engine 122 has combined wager logic 127 including skill proposition logic 132 and chance proposition logic 126. The decision engine 122 uses the telemetry data, along with chance proposition logic 126 to generate chance proposition determination commands 129 that are used by the process controller 112 to command the chance-based controller 102 to resolve a chance-based proposition. The chance proposition determination command data is communicated by the process controller 112 to the chance-based controller 102. The chance-based controller 102 receives the chance proposition determination command data 129 and automatically resolves a chance-based proposition to determine a chance outcome in accordance with the chance proposition determination command data 129.

In an embodiment, the application telemetry data 124 used by the decision engine 122 encodes data about the operation of the interactive application 143 executed by the interactive controller 120.

In some embodiments, the application telemetry data 124 encodes interactions of a user, such as a user's interaction with an interactive element of the interactive application 143.

In many embodiments, the application telemetry data 124 includes a state of the interactive application 143, such as values of variables that change as the interactive application 143 executes.

In several embodiments, the decision engine 122 includes one or more rules as part of chance proposition logic 126 used by the decision engine 122 to determine when a chance-based proposition should be automatically resolved. Each rule includes one or more variable values constituting a pattern that is to be matched by the process controller 112 using the decision engine 122 to one or more variable values encoded in the application telemetry data 124. Each rule also includes one or more actions that are to be taken if the pattern is matched. Actions can include automatically generating chance proposition determination command data 129 and communicating the chance proposition determination command data 129 to the chance-based controller 102, thus commanding the chance-based controller to automatically resolve a chance-based proposition as described herein. During operation, the decision engine 122 receives application telemetry data 124 from the interactive controller 124 via interface 160. The decision engine 122 performs a matching process of matching the variable values encoded in the application telemetry data 124 to one or more variable patterns of one or more rules. If a match between the variable values and a pattern of a rule is determined, then the process controller 112 performs the action of the matched rule.

In some embodiments, the application telemetry data 124 includes, but is not limited to, application environment variables that indicate a state of the interactive application 143, interactive controller data indicating a state of the interactive controller 120, and interactions with the interactive application 143 during execution of the interactive application 143 by the interactive controller 120. The chance proposition determination command data 129 may include, but are not limited to, an amount and type of the chance-based proposition, a request for resolution of the chance-based proposition, and a selection of a paytable to be used when resolving the chance-based proposition.

In some embodiments, the process controller 112 receives chance outcome data 130 from the chance-based controller 102. The decision engine 122 uses the chance outcome data 130, in conjunction with the telemetry data 124 and skill proposition logic 132, to automatically generate skill proposition data, interactive application instruction data, and/or resource data 136 that the process controller 112 communicates to the interactive controller 120 via interfaces 160 and 131.

In an embodiment, the chance outcome data 130 used by a decision engine encodes data about the resolution of a chance-based proposition resolved by the chance-based controller 102. In some embodiments, the chance outcome data 130 encodes values of variables including an amount of credits wagered, an amount of credits won and values of credits stored in the one or more meters 110 of the chance-based controller. In many embodiments, the chance outcome data includes a state of the chance-based controller 102, such as values of variables that change as the chance-based controller 102 resolves chance-based propositions. The decision engine 122 includes one or more rules as part of skill proposition logic 132 used by the decision engine 122 to automatically generate the skill proposition data, interactive application instruction data, and/or resource data 136 that is then communicated to the interactive controller 120. Each rule includes one or more variable values constituting a pattern that is to be matched to one or more variable values encoded in the chance outcome data 130. Each rule also includes one or more actions that are to be automatically taken by the process controller 112 if the pattern is matched. Actions can include automatically generating skill proposition data, interactive application instruction data, and/or resource data 136 and using the skill proposition data, interactive application instruction data, and/or resource data 136 to control the interactive controller 120 to affect execution of the interactive application 143 as described herein. During operation, the process controller 112 receives the chance outcome data 130 from the chance-based controller 102 via interface 162. The process controller 112 uses the decision engine 122 to match the variable values encoded in the chance outcome data to one or more patterns of one or more rules of the skill proposition logic 132. If a match between the variable values and a pattern of a rule is found, then the process controller automatically performs the action of the matched rule. In some embodiments, the process controller 112 uses the application telemetry data 124 received from the interactive controller 120 in conjunction with the chance outcome data 130 to generate the interactive application instruction and resource data 136.

The interactive controller receives the skill proposition data, interactive application command data, and resource data 136 and automatically uses the skill proposition data, interactive application instruction data, and/or resource data 136 to configure and command the processes of the interactive application 143.

In some embodiments, the interactive application 143 operates utilizing a scripting language. The interactive application 143 parses scripts written in the scripting language and executes commands encoded in the scripts and sets variable values as defined in the scripts. In operation of such embodiments, the process controller 112 automatically generates skill proposition data, interactive application instruction data, and/or resource data 136 in the form of scripts written in the scripting language that are communicated to the interactive controller 120 during execution of the interactive application 143. The interactive controller 120 receives the scripts and passes them to the interactive application 143. The interactive application 143 receives the scripts, parses the scripts and automatically executes the commands and sets the variable values as encoded in the scripts.

In many embodiments, the interactive application 143 automatically performs processes as instructed by commands communicated from the process controller 112. The commands command the interactive application 143 to perform specified operations such as executing specified commands and/or setting the values of variables utilized by the interactive application 143. In operation of such embodiments, the process controller 112 automatically generates commands that are encoded into the skill proposition data, interactive application instruction data, and/or resource data 136 that are communicated to the interactive controller 120. The interactive controller 120 passes the skill proposition data, interactive application instruction data, and/or resource data 136 to the interactive application 143. The interactive application parses the skill proposition data, interactive application instruction data, and/or resource data and automatically performs operations in accordance with the commands encoded in the skill proposition data, interactive application instruction data, and/or resource data 136.

In many embodiments, the process controller 112 includes a pseudo random or random result generator used to generate random results that are used by the decision engine 122 to generate portions of the skill proposition data, interactive application instruction data, and/or resource data 136.

The interactive application 143 uses the skill proposition data, interactive application instruction data, and/or resource data 136 to generate a skill proposition presented to the user as an application user interface 105 using one or more output devices of the user interface and output device(s) 103. The user skillfully interacts with the application user interface 105 using one or more of input devices of the user interface input and output devices 103. The interactive application 143 determines a skill outcome based on the skillful interactions of the player and communicates data of the determined skill outcome 125 to the process controller 112. In some embodiments, the interactive application 143 also communicates application telemetry data 124 encoding the user's interactions with the interactive application 143.

In various embodiments, the process controller 112 uses the rule-based decision engine 122 to automatically determine an amount of application credits to award based at least in part on the skill outcome data 125 and interactions with the interactive application 143 of the billiard combined proposition wagering system as determined by the process controller 112 from the application telemetry data 124. In some embodiments, the process controller 112 may also use the chance outcome data 130 to determine the amount of application credits that should be awarded. In numerous embodiments, the interactive application 143 is a skill-based interactive application and the application credits is awarded for skillful interaction with the interactive application.

In various embodiments, the process controller 112 uses the decision engine 122 along with combined proposition logic 127 to determine a combined wagering outcome 135 that is communicated to the wagering interface generator 144. The combined wagering outcome is determined on the basis of the skill outcome data 125 received from the interactive controller 120 and the chance outcome data 130 received from the chance-based controller 102.

The process controller 1112 uses the wagering user interface generator 144 to automatically generate wagering telemetry data 146 on the basis of the combined wagering outcome 135. The wagering telemetry data 146 is used by the process controller 112 to command the interactive controller 120 to automatically generate a wagering user interface 148 describing a state of wagered credit accumulation and loss for the billiard combined proposition wagering system.

In some embodiments, the wagering telemetry data 146 may include, but is not limited to, amounts of application credits and interactive elements earned, lost or accumulated through interaction with interactive application, and credits, application credits and interactive elements amounts won, lost or accumulated.

In some embodiments, the skill proposition data, interactive application instruction data, and/or resource data 136 are communicated to the wagering user interface generator 144 and used as a partial basis for generation of the wagering telemetry data 146 communicated to the interactive controller 120.

In various embodiments, the wagering user interface generator 144 also receives chance outcome data 130 that is used as a partial basis for generation of the wagering telemetry data 146 communicated to the interactive controller 120. In some embodiments, the chance outcome data 130 also includes data about one or more states of a chance-based proposition as resolved by the chance-based controller 102. In various such embodiments, the wagering user interface generator 144 generates a wagering process display and/or wagering state display using the one or more states of the chance-based proposition. The wagering process display and/or wagering state display is included in the wagering telemetry data 146 that is communicated to the interactive controller 120. The wagering process display and/or wagering state display is automatically displayed by the interactive controller 120 using the wagering user interface 148. In other such embodiments, the one or more states of the chance-based proposition are communicated to the interactive controller 120 and the interactive controller 120 is instructed to automatically generate the wagering process display and/or wagering state display of the wagering user interface 148 using the one or more states of the chance-based proposition for display.

In some embodiments, the chance outcome data 130 includes game state data about resolution of the chance-based proposition, including but not limited to a final state, intermediate state and/or beginning state of the chance-based proposition. For example, in a chance-based proposition that is based on slot machine math, the final state of the chance-based proposition may be reel positions, in a chance-based proposition that is based on roulette wheel math, the final state may be a pocket where a ball may have come to rest, in a chance-based proposition that is a based on card math, the beginning, intermediate and final states may represent a sequence of cards being drawn from a deck of cards, etc.

In some embodiments, the interactive controller 120 generates a wagering user interface by executing commands that define processes of the wagering user interface where the commands are formatted in a scripting language. In operation, a wagering user interface generator of a process controller generates commands in the form of a script written in the scripting language. The script includes commands that describe how the interactive controller is to display combined wagering outcome data. The completed script is encoded as wagering telemetry data and communicated to the interactive controller by the process controller. The interactive controller receives the wagering telemetry data and parses the script encoded in the wagering telemetry data and executes the commands included in the script to generate the wagering user interface.

In many embodiments, an interactive controller generates a wagering user interface based on a document written in a document markup language that includes commands that define processes of the wagering user interface. In operation, a wagering user interface generator of a process controller generates a document composed in the document markup language. The document includes commands that describe how the interactive controller is to display combined wagering outcome data. The completed document is encoded as wagering telemetry data and communicated to the interactive controller by the process controller. The interactive controller receives the wagering telemetry data and parses the document encoded in the wagering telemetry data and executes the commands encoded into the document to generate the wagering user interface.

In some embodiments, an interactive controller generates a wagering user interface by executing commands that define processes of the wagering user interface. In operation, a wagering user interface generator of a process controller generates the commands and encodes the commands into wagering telemetry data that is communicated to the interactive controller by the process controller. The interactive controller receives the wagering telemetry data and executes the commands encoded in the wagering telemetry data to generate the wagering user interface.

In various embodiments, an interactive controller includes a data store of graphic and audio display resources that the interactive controller uses to generate a wagering user interface as described herein.

In many embodiments, a process controller communicates graphic and audio display resources as part of wagering telemetry data to an interactive controller. The interactive controller uses the graphic and audio display resources to generate a wagering user interface as described herein.

When a user interacts with the wagering user interface 148, wagering user interface telemetry data is generated by the wagering user interface 148 and communicated by the interactive controller 120 to the process controller 112 using interfaces 131 and 160.

The process controller 112 can further operatively connect to the chance-based controller 102 to determine an amount of credit or interactive elements available and other wagering metrics of a chance-based proposition. Thus, the process controller 112 may affect an amount of credits in play for participation in the a chance-based proposition provided by the chance-based controller 102 in some embodiments. The process controller 112 may additionally include various audit logs and activity meters. In some embodiments, the process controller 112 can also couple to a centralized session and/or management controller 150 for exchanging various data related to the user and the activities of the user during game play of a billiard combined proposition wagering system.

In many embodiments, one or more users can be engaged in using the interactive application 143 executed by the interactive controller 120. In various embodiments, a billiard combined proposition wagering system can include an interactive application 143 that provides a skill-based interactive application that includes head-to-head play between a single user and a computing device, between two or more users against one another, or multiple users playing against a computer device and/or each other. In some embodiments, the interactive application 143 can be a skill-based interactive application where the user is not skillfully playing against the computer or any other user such as skill-based interactive applications where the user is effectively skillfully playing against himself or herself.

In some embodiments, the operation of the process controller 112 does not affect the provision of a chance-based proposition by the chance-based controller 102 except for user choice parameters that are allowable in accordance with the chance-based proposition.

In various embodiments, chance outcome data 130 communicated from the chance-based controller 102 can also be used to convey a status operation of the chance-based controller 102.

In a number of embodiments, communication of the chance proposition determination commands 129 between the chance-based controller 102 and the process controller 112 can further be used to communicate various wagering control factors that the chance-based controller 102 uses as input. Examples of wagering control factors include, but are not limited to, an amount of credits, application credits, interactive elements, or objects consumed per wagering event, and/or the user's election to enter a jackpot round.

In some embodiments, the process controller 112 utilizes the wagering user interface 148 to communicate certain interactive application data to the user, including but not limited to, club points, user status, control of the selection of choices, and messages which a user can find useful in order to adjust the interactive application experience or understand the wagering status of the user in accordance with the chance-based proposition in the chance-based controller 102.

In some embodiments, the process controller 112 utilizes the wagering user interface 148 to communicate aspects of a chance-based proposition to the user including, but not limited to, odds of certain chance outcomes, amount of credits, application credits, interactive elements, or objects in play, and amounts of credits, application credits, interactive elements, or objects available.

In a number of embodiments, the chance-based controller 102 can accept chance-based proposition factors from the process controller 112, including, but not limited to, modifications in the amount of credits, application credits, interactive elements, or objects wagered on each individual wagering event, a number of chance-based propositions per minute the chance-based controller 102 can resolve, entrance into a bonus round, and other factors. An example of a varying a wager amount that the user can choose can include, but is not limited to, using a more difficult interactive application level associated with an amount of a wager. These factors can increase or decrease an amount wagered per individual combination proposition in the same manner that a standard slot machine user can decide to wager more or less credits for each pull of the handle. In several embodiments, the chance-based controller 102 can communicate a number of factors back and forth to the process controller 112, via an interface, such that an increase/decrease in a wagered amount can be related to the change in user profile of the user in the interactive application. In this manner, a user can control a wager amount per wagering event in accordance with the combined proposition with the change mapping to a parameter or component that is applicable to the interactive application experience.

In some embodiments, a session/management controller 150 is used to regulate a billiard combined proposition wagering system session.

In various embodiments, the session/management controller 150 includes one or more interfaces, 165, 166 and 167 that operatively connect the session/management controller 150 to one or more interactive controllers, such as interactive controller 120, to one or more process controllers, such as process controller 112, and/or to one or more chance-based controllers, such as chance-based controller 102, through their respective interfaces.

In some embodiments, one or more of the session/management controller interfaces implement a session/management controller to device or server communication protocol employing an interprocess communication protocol so that the session/management controller and one or more of an interactive controller, a chance-based controller, and/or a process controller may be implemented on the same device. In operation, the session/management controller interfaces provide application programming interfaces or the like that are used by the session/management controller to communicate outgoing data and receive incoming data by passing parameter data to another process or application running on the same device.

In some embodiments, one or more of the session/management controller interfaces implement a session/management controller communication protocol employing an interdevice communication protocol so that the session/management controller may be implemented on a device separate from the one or more interactive controllers, the one or more process controllers and/or the one or more chance-based controllers. The interdevice protocol may utilize a wired communication bus or wireless connection as a physical layer. In various embodiments, one or more of the session/management controller interfaces implement a session/management controller communication protocol employing a networking protocol so that the process session/management controller may be operatively connected to the one or more interactive controllers, the one or more process controllers, and/or the one or more chance-based controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more session/management controller interfaces communicate outgoing data to an external device or server by encoding the data into a signal and transmitting the signal to the external device or server. The one or more session/management controller interfaces receive incoming data from an external device or server by receiving a signal transmitted by the external device or server and decoding the signal to obtain the incoming data.

In various embodiments, the process controller 112 communicates outgoing session data 152 to the session/management controller. The session data 152 may include, but is not limited to, user, interactive controller, process controller and chance-based controller data from the process controller 112. The session/management controller 150 uses the user, interactive controller, process controller and chance-based controller data to regulate a billiard combined proposition wagering system session.

In some embodiments, the session/management controller 150 may also assert control of a billiard combined proposition wagering system session by communicating session control data 154 to the process controller. Such control may include, but is not limited to, commanding the process controller 112 to end a billiard combined proposition wagering system session, initiating wagering in a billiard combined proposition wagering system session, ending wagering in a billiard combined proposition wagering system session but not ending a user's use of the interactive application portion of the billiard combined proposition wagering system, and changing from real credit wagering in a billiard combined proposition wagering system to virtual credit wagering, or vice versa.

In many embodiments, the session/management controller 150 manages user profiles for a plurality of users. The session/management controller 150 stores and manages data about users in order to provide authentication and authorization of users of the billiard combined proposition wagering system 128. In some embodiments, the session/management controller 150 also manages geolocation information to ensure that the billiard combined proposition wagering system 128 is only used by users in jurisdictions were wagering is approved. In various embodiments, the session/management controller 150 stores application credits that are associated with the user's use of the interactive application of the billiard combined proposition wagering system 128.

In some embodiments, the session/management controller 150 communicates user and session management data 155 to the user using a management user interface 157 of the interactive controller. The user 140 interacts with the management user interface 157 and the management user interface generates management telemetry data 159 that is communicated to the session/management controller 150.

In some embodiments, the chance-based controller 102 communicates wagering session data 153 to the session/management controller 150. In various embodiments, the session/management controller communicates wagering session control data 151 to the chance-based controller 102.

In some embodiments, a process controller operates as an interface between an interactive controller and a chance-based controller. By virtue of this construction, the chance-based controller is isolated from the interactive controller allowing the interactive controller to operate in an unregulated environment will allowing the chance-based controller to operate in a regulated environment.

In some embodiments, a single chance-based controller may provide services to two or more interactive controllers and/or two or more process controllers, thus allowing a billiard combined proposition wagering system to operate over a large range of scaling.

In various embodiments, multiple types of interactive controllers using different operating systems may be interfaced to a single type of process controller and/or chance-based controller without requiring customization of the process controller and/or the chance-based controller.

In many embodiments, an interactive controller may be provided as a user device under control of a user while maintaining the chance-based controller in an environment under the control of a regulated operator of wagering equipment.

In several embodiments, data communicated between the controllers may be encrypted to increase security of the billiard combined proposition wagering system.

In some embodiments, a process controller isolates chance proposition logic and skill proposition logic as unregulated logic from a regulated chance-based controller, thus allowing errors in the skill proposition logic and/or chance proposition logic to be corrected, new skill proposition logic and/or chance proposition logic to be used, or modifications to be made to the skill proposition logic and/or chance proposition logic without a need for regulatory approval.

In various embodiments, an interactive application may require extensive processing resources from an interactive controller leaving few processing resources for the functions performed by a process controller and/or a chance-based controller. By virtue of the architecture described herein, processing loads may be distributed across multiple devices such that operations of the interactive controller may be dedicated to the interactive application and the processes of the process controller and/or chance-based controller are not burdened by the requirements of the interactive application.

In many embodiments, a billiard combined proposition wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like.

In some embodiments, one or more components of a billiard combined proposition wagering system are distributed in close proximity to each other and communicate using a local area network and/or a communication bus. In several embodiments, an interactive controller and a process controller of a billiard combined proposition wagering system are in a common location and communicate with an external chance-based controller. In some embodiments, a process controller and a chance-based controller of a billiard combined proposition wagering system are in a common location and communicate with an external interactive controller. In many embodiments, an interactive controller, a process controller, and a chance-based controller of a billiard combined proposition wagering system are located in a common location. In some embodiments, a session/management controller is located in a common location with a process controller and/or a chance-based controller.

In various embodiments, these multiple devices can be constructed from or configured using a single device or a plurality of devices such that a billiard combined proposition wagering system is executed as a system in a virtualized space such as, but not limited to, where a chance-based controller and a process controller are large scale centralized servers in the cloud operatively connected to widely distributed interactive controllers via a wide area network such as the Internet or a local area network. In such embodiments, the components of a billiard combined proposition wagering system may communicate using a networking protocol or other type of device-to-device communications protocol.

In some embodiments, a billiard combined proposition wagering system is deployed over a local area network or a wide area network in an interactive configuration. An interactive configuration of a billiard combined proposition wagering system includes an interactive controller operatively connected by a network to a process controller and a chance-based controller.

In some embodiments, a billiard combined proposition wagering system is deployed over a local area network or a wide area network in a mobile configuration. A mobile configuration of a billiard combined proposition wagering system is useful for deployment over wireless communication network, such as a wireless local area network or a wireless telecommunications network. A mobile configuration of a billiard combined proposition wagering system 194 includes an interactive controller operatively connected by a wireless network to a process controller and a chance-based controller.

In many embodiments, a centralized chance-based controller is operatively connected to, and communicates with, one or more process controllers using a communication link. The centralized chance-based controller can generate chance outcomes for wagers in accordance with one or more chance-based propositions. The centralized chance-based controller can resolve a number of simultaneous or pseudo-simultaneous chance-based propositions in order to generate chance outcomes for a variety of chance-based propositions that one or more distributed billiard combined proposition wagering systems can use.

In several embodiments, a centralized process controller is operatively connected to one or more interactive controllers and one or more chance-based controllers using a communication link. The centralized process controller can perform the functionality of a process controller across various billiard combined proposition wagering systems.

In numerous embodiments, an interactive application server provides a host for managing head-to-head play operating over a network of interactive controllers connected to the interactive application server using a communication link. The interactive application server provides an environment where users can compete directly with one another and interact with other users.

Figure 2A:
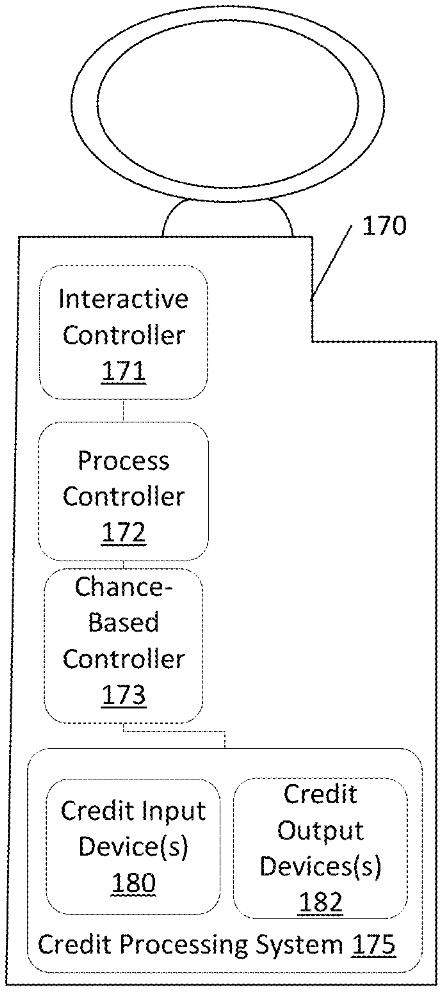
FIG. 2A is a diagram of a land-based configuration of a billiard combined proposition wagering system in accordance with various embodiments of the invention.

FIG. 2A is a diagram of a land-based configuration of a billiard combined proposition wagering system in accordance with various embodiments of the invention. Land-based configurations of a billiard combined proposition wagering system include, but are not limited to, electronic gaming machines such as slot machines, electronic table games and the like. A land-based configuration of a billiard combined proposition wagering system 170 includes an interactive controller 171, a process controller 172 and a chance-based controller 173 contained in an enclosure such as a housing, cabinet, casing or the like. The enclosure may further include one or more user accessible openings or surfaces that may be used to mount one or more user accessible user input devices, one or more user accessible user output devices, and one or more user accessible credit processing systems or credit processing devices. The interactive controller communicates with the user input devices to detect user interactions with the billiard combined proposition wagering system and commands and controls the user output devices to provide a user interface to one or more users of the billiard combined proposition wagering system as described herein. The chance-based controller communicates with the user credit processing systems or user credit processing devices to transfer credits into and out of the billiard combined proposition wagering system as described herein.

In many embodiments, the process controller 172 is operatively connected to an external session/management controller (not shown). The session/management controller may provide session control for a wagering session or may provide services for management of a player account for the storage of player points, application credits and the like.

In various embodiments, the chance-based controller 173 is operatively connected to a credit processing system 175. In many embodiments, the credit processing system 175 includes one or more credit input devices 180 for generating incoming credit data from a credit input. Credit inputs can include, but are not limited to, credit items used to transfer credits. The incoming credit data are communicated to the chance-based controller 173. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing system 175 includes one or more credit output devices 182 for generating a credit output based on outgoing credit data communicated from the chance-based controller 173. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the chance-based controller 173 and/or the credit processing system 175 is operatively connected to, and communicates with, a TITO controller (not shown) or the like to determine incoming credit data representing amounts of credits to be transferred into the billiard combined proposition wagering system 170 and to determine outgoing credit data representing amounts of credits to be transferred out of the billiard combined proposition wagering system 170. In operation, the credit processing system 175 communicates with one of the one or more connected credit input devices 180, such as a bill validator/ticket scanner, used to scan a credit input in the form of a TITO ticket having indicia of credit account data of a credit account of the TITO controller. The credit processing system 175 communicates the credit account data to the TITO controller. The TITO controller uses the credit account data to determine an amount of credits to transfer to the credit processing system 175, and thus to the chance-based controller 173 of the billiard combined proposition wagering system 128. The TITO controller communicates the amount of credits to the credit processing system 175. The credit processing system 175 communicates the amount of credits as incoming credit data to the chance-based controller 173 and the chance-based controller 173 credits one or more credit meters with the amount of credits so that the credits can be used when a user makes wagers using the billiard combined proposition wagering system 170.

In many embodiments, the credit processing system 175 includes a bill validator/ticket scanner as one of the one or more credit input devices 180. The credit processing system 175 communicates with the bill validator/ticket scanner to scan currency used as a credit input to determine an amount of credits as incoming credit data to transfer credit to one or more credit meters associated with one or more users. The chance-based controller 173 credits the one or more credit meters with the amount of credits so that the credits can be used when a user makes wagers using the billiard combined proposition wagering system 170.

In some embodiments, the credit processing system 175 can use a TITO controller along with a ticket or voucher printer as one of the one or more credit output devices 182 to generate a TITO ticket as a credit output for a user. In operation, the credit processing system 175 communicates, as outgoing credit data, data of an amount of credits to be credited to a credit account on the TITO controller. The TITO controller receives the amount of credits and creates the credit account and credits the credit account with the amount of credits. The TITO controller generates credit account data for the credit account and communicates the credit account data to the credit processing system 175. The credit processing system 175 uses the ticket or voucher printer to print indicia of the credit account data onto a TITO ticket as a credit output.

In various embodiments, the credit processing system provides an interface to an electronic payment management system (not shown) such an electronic wallet or the like. The electronic payment system provides credit account data that is used for generating incoming credit data as a credit input and outgoing credit data as a credit output.

In some embodiments, the chance-based controller 173 is further operatively connected to a central determination controller (not shown). In operation, when the chance-based controller 173 needs to determine a chance outcome, the chance-based controller 173 communicates a request to the central determination controller for the chance outcome. The central determination controller receives the chance outcome request and generates a chance outcome in response to the chance outcome request. The central determination controller communicates data of the chance outcome to the chance-based controller 173. The chance-based controller 173 receives the data of the chance outcome and utilizes the chance outcome as described herein. In some embodiments, the chance outcome is drawn from a pool of pre-determined chance outcomes. In some embodiments, the chance outcome is a random result that is utilized by the chance-based controller along with paytables to determine a chance outcome as described herein.

In various embodiments, the chance-based controller 173 may be operatively connected to a progressive controller along (not shown) with one or more other chance-based controllers of one or more other billiard combined proposition wagering systems. The progressive controller provides services for the collection and provision of credits used by the chance-based controller 173 to provide chance outcomes that have a progressive or pooling component.

FIGS. 2B, 2C, 2D, and 2E are illustrations of interactive controllers of a billiard combined proposition wagering system in accordance with various embodiments of the invention. An interactive controller, such as interactive controller 120 of FIG. 1, may be constructed from or configured using one or more processing devices that perform the operations of the interactive controller. An interactive controller in a billiard combined proposition wagering system may be constructed from or configured using any processing device having sufficient processing and communication capabilities that may be that perform the processes of an interactive controller in accordance with various embodiments of the invention. In some embodiments, the construction or configuration of the interactive controller may be achieved through the use of an application control interface, such as application control interface 131 of FIG. 1, and/or through the use of an interactive application, such as interactive application 143 of FIG. 1.

Figure 2B:
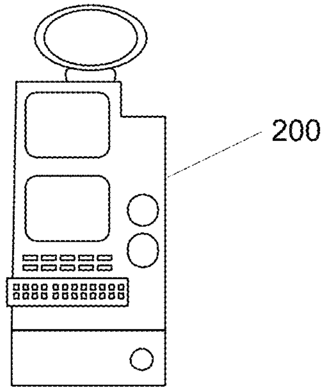
FIGS. 2B, 2C, 2D, and 2E are illustrations of interactive controllers of a billiard combined proposition wagering system in accordance with various embodiments of the invention.

In some embodiments, an interactive controller may be constructed from or configured using an electronic gaming machine 200 as shown in FIG. 2B. The electronic gaming machine 200 may be physically located in various types of gaming establishments.

Figure 2C:
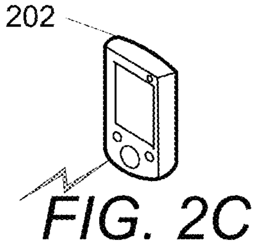

In many embodiments, an interactive controller may be constructed from or configured using a portable device 202 as shown in FIG. 2C. The portable device 202 is a device that may wirelessly connect to a network. Examples of portable devices include, but are not limited to, a tablet computer, a personal digital assistant, and a smartphone.

Figure 2D:
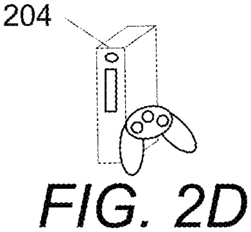

In some embodiments, an interactive controller may be constructed from or configured using a gaming console 204 as shown in FIG. 2D.

Figure 2E:
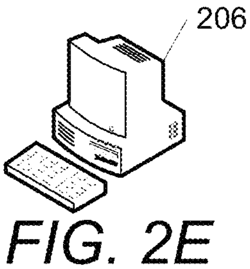

In various embodiments, an interactive controller may be constructed from or configured using a personal computer 206 as shown in FIG. 2E.

In some embodiments, a device, such as the devices of FIGS. 2B, 2C, 2D, and 2E, may be used to construct a complete billiard combined proposition wagering system and may be operatively connected using a communication link to a session and/or management controller, such as session and/or management controller 150 of FIG. 1.

Figure 3A:
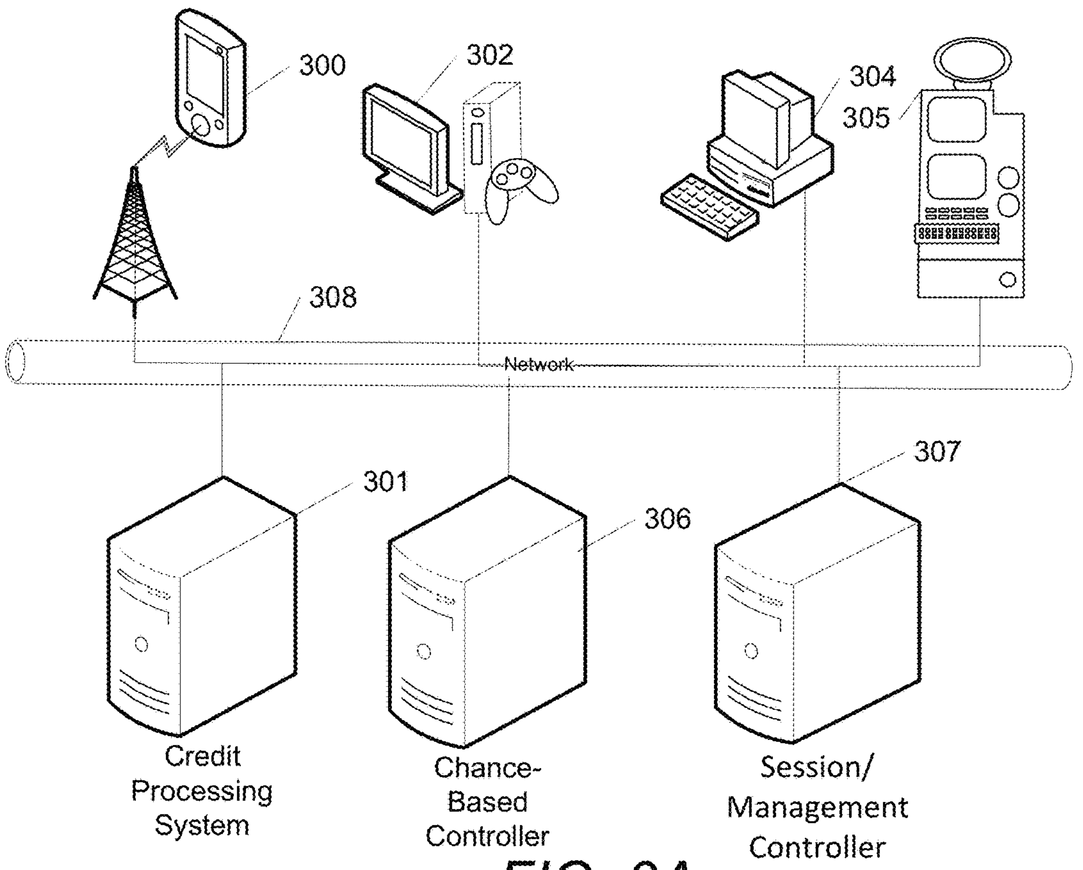
FIGS. 3A, 3B and 3C are diagrams of distributed billiard combined proposition wagering systems in accordance with various embodiments of the invention.
Figure 3B:
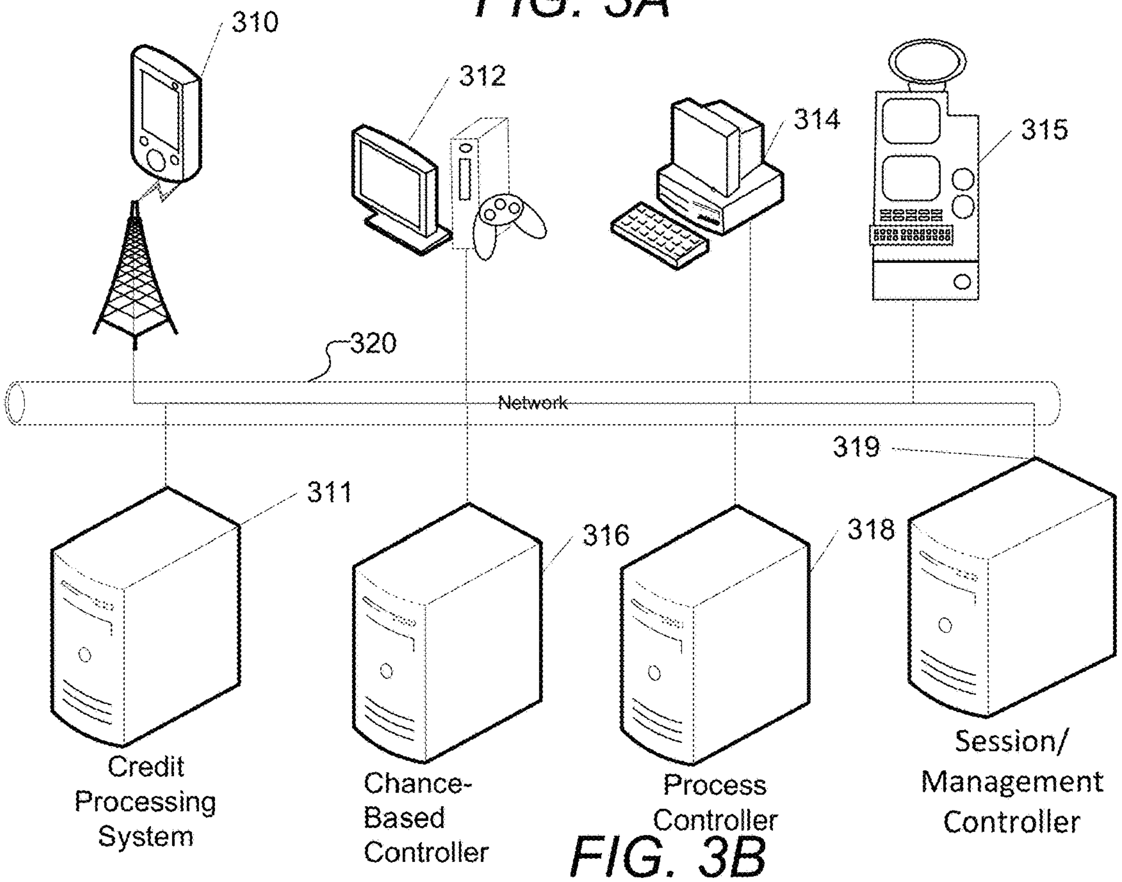
Figure 3C:
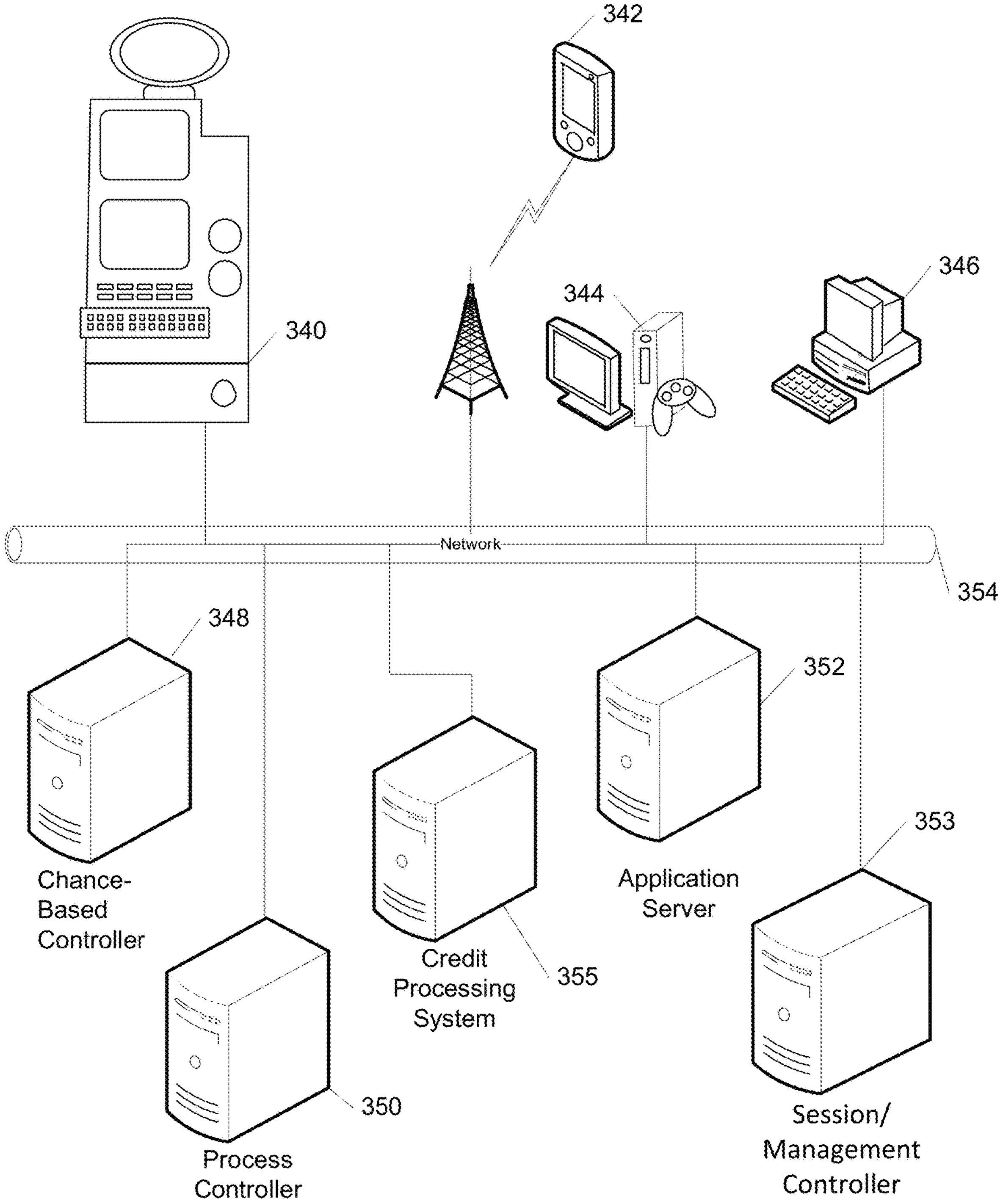

Some billiard combined proposition wagering systems in accordance with many embodiments of the invention can be distributed across a plurality of devices in various configurations. FIGS. 3A, 3B and 3C are diagrams of distributed billiard combined proposition wagering systems in accordance with various embodiments of the invention. Turning now to FIG. 3A, one or more interactive controllers of a distributed billiard combined proposition wagering system, such as but not limited to, a mobile or wireless device 300, a gaming console 302, a personal computer 304, and an electronic gaming machine 305, are operatively connected with a chance-based controller 306 of a distributed billiard combined proposition wagering system using a communication link 308. Communication link 308 is a communications link that allows processing systems to communicate with each other and to share data. Examples of the communication link 308 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of an interactive controller and a process controller as described herein are executed on the individual interactive controllers 300, 302, 304 and 305 while one or more processes of a chance-based controller as described herein can be executed by the chance-based controller 306.

In many embodiments, a distributed billiard combined proposition wagering system and may be operatively connected using a communication link to a session and/or management controller 307, that performs the processes of a session and/or management controller as described herein.

In several embodiments, a distributed billiard combined proposition wagering system and may be operatively connected using a communication link to credit processing system 306, that performs the processes of one or more credit processing systems as described herein.

A distributed billiard combined proposition wagering system in accordance with another embodiment of the invention is illustrated in FIG. 3B. As illustrated, one or more interactive controllers of a distributed billiard combined proposition wagering system, such as but not limited to, a mobile or wireless device 310, a gaming console 312, a personal computer 314, and an electronic gaming machine 315, are operatively connected with a chance-based controller 316 and a process controller 318 over a communication link 320. Communication link 320 is a communication link that allows processing systems to communicate and share data. Examples of the communication link 320 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, the processes of an interactive controller as described herein are executed on the individual interactive controllers 310, 312, 314 and 315. One or more processes of a chance-based controller as described herein are executed by the chance-based controller 316, and one or more processes of a process controller as described herein are executed by the process controller 318.

In many embodiments, a distributed billiard combined proposition wagering system and may be operatively connected using a communication link to a session and/or management controller 319, that performs the processes of a session and/or management controller as described herein.

In several embodiments, a distributed billiard combined proposition wagering system and may be operatively connected using a communication link to credit processing system 311, that performs the processes of one or more credit processing systems as described herein.

A distributed billiard combined proposition wagering systems in accordance with still another embodiment of the invention is illustrated in FIG. 3C. As illustrated, one or more interactive controllers of a distributed billiard combined proposition wagering system, such as but not limited to, a mobile device 342, a gaming console 344, a personal computer 346, and an electronic gaming machine 340 are operatively connected with a chance-based controller 348 and a process controller 350, and an interactive application server 352 using a communication link 354. Communication link 354 is a communications link that allows processing systems to communicate and to share data. Examples of the communication link 354 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of a display and user interface of an interactive controller as described herein are executed on the individual interactive controllers 340, 342, 344 and 346. One or more processes of a chance-based controller as described herein can be executed by the chance-based controller 348. One or more processes of a process controller as described herein can be executed by the process controller server 350 and one or more processes of an interactive controller excluding the display and user interfaces can be executed by the interactive application server 352.

In many embodiments, a distributed billiard combined proposition wagering system and may be operatively connected using a communication link to a session and/or management controller 353, that performs the processes of a session and/or management controller as described herein.

In several embodiments, a distributed billiard combined proposition wagering system and may be operatively connected using a communication link to credit processing system 355, that performs the processes of one or more credit processing systems as described herein.

In other embodiments, a number of other peripheral systems, such as a user management system, a gaming establishment management system, a regulatory system, and/or hosting servers are also operatively connected with the billiard combined proposition wagering systems using a communication link. Also, other servers can reside outside the bounds of a network within a firewall of the operator to provide additional services for network connected billiard combined proposition wagering systems.

Although various distributed billiard combined proposition wagering systems are described herein, billiard combined proposition wagering systems can be distributed in any configuration as appropriate to the specification of a specific application in accordance with embodiments of the invention. In some embodiments, components of a distributed billiard combined proposition wagering system, such as a process controller, chance-based controller, interactive controller, or other servers that perform services for a process controller, chance-based controller and/or interactive controller, can be distributed in different configurations for a specific distributed billiard combined proposition wagering system application.

Figure 4A:
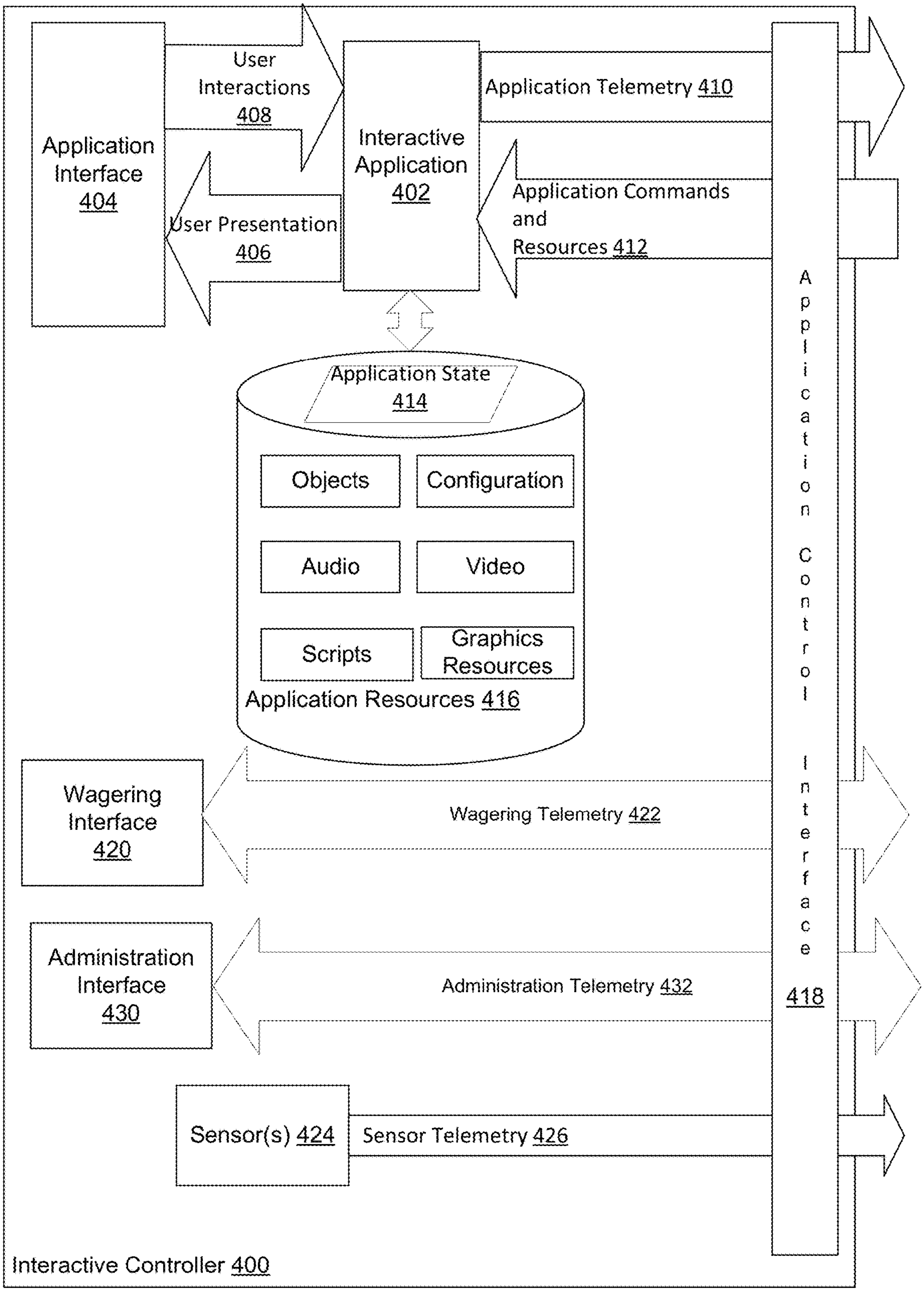
FIGS. 4A and 4B are diagrams of a structure of an interactive controller of a billiard combined proposition wagering system in accordance with various embodiments of the invention.
Figure 4B:
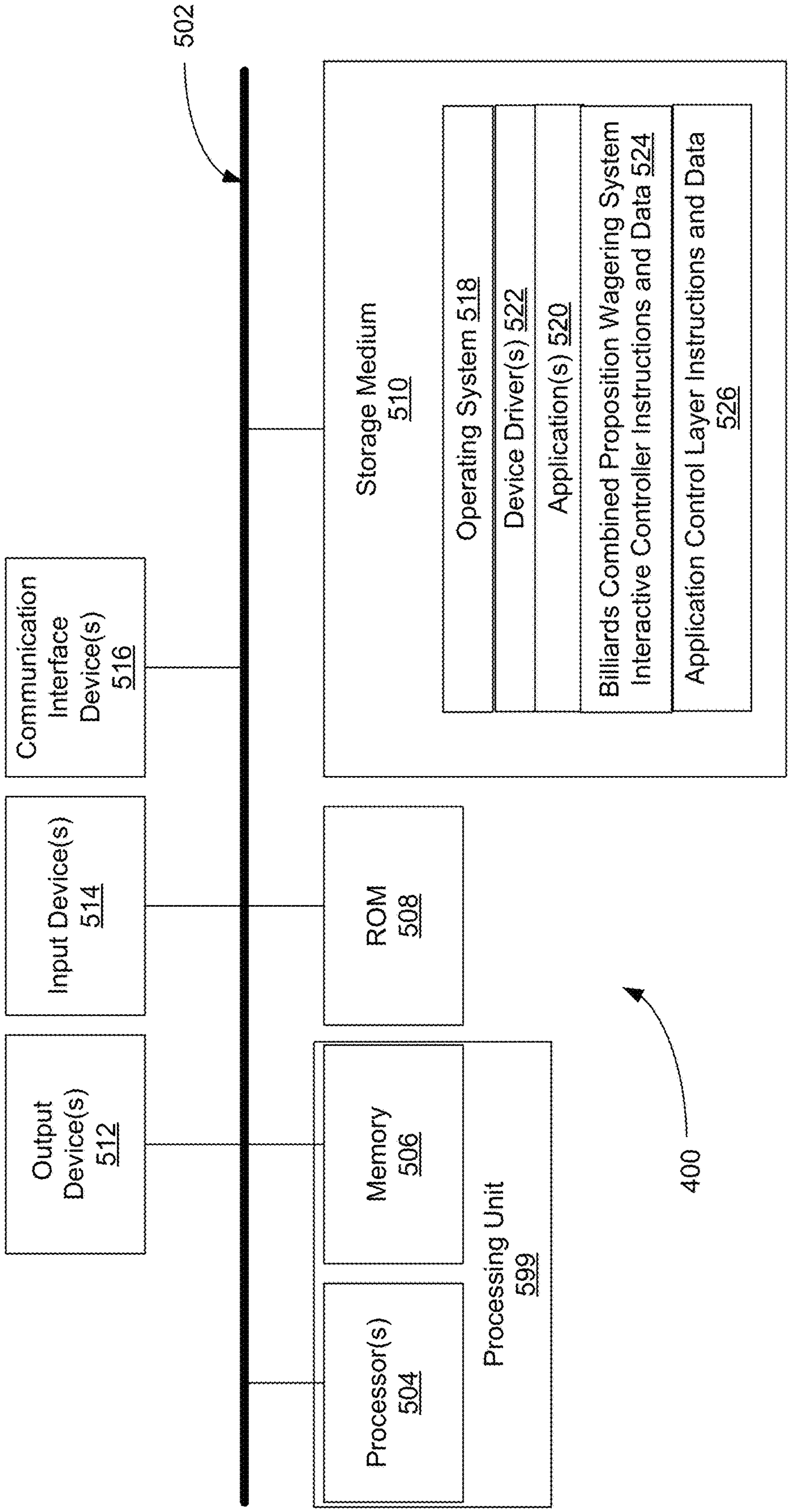

FIGS. 4A and 4B are diagrams of a structure of an interactive controller of a billiard combined proposition wagering system in accordance with various embodiments of the invention. An interactive controller may be constructed from or configured using one or more processing devices that perform the operations of the interactive controller. In many embodiments, an interactive controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 4A, an interactive controller 400, suitable for use as interactive controller 120 of FIG. 1, provides an execution environment for an interactive application 402 of a billiard combined proposition wagering system. In several embodiments, an interactive controller 400 of a billiard combined proposition wagering system provides an interactive application 402 that generates an application interface 404 for interaction with by a user. The interactive application 402 generates a user presentation 406 that is presented to the user through the application interface 404. The user presentation 406 may include audio features, visual features or tactile features, or any combination of these features. In various embodiments, the application interface 404 utilizes one or more user interface input and output devices so that a user can interact with the user presentation. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The user's interactions 408 are included by the interactive application 402 in application telemetry data 410 that is communicated by interactive controller 400 to various other components of a billiard combined proposition wagering system as described herein. The interactive application 402 receives application commands and resources 412 communicated from various other components of a billiard combined proposition wagering system as described herein. In some embodiments, the application telemetry data 410 includes a skill outcome for a skill proposition presented to the user by the interactive application 402.

In some embodiments, various components of the interactive application 402 can read data from an application state 414 in order to provide one or more features of the interactive application. In various embodiments, components of the interactive application 402 can include, but are not limited to: a physics engine; a rules engine; an audio engine; a graphics engine and the like. The physics engine is used to simulate physical interactions between virtual objects in the interactive application 402. The rules engine implements the rules of the interactive application and a random number generator that may be used for influencing or determining certain variables and/or outcomes to provide a randomizing influence on the operations of the interactive application. The graphics engine is used to generate a visual representation of the interactive application state to the user. The audio engine is used to generate an audio representation of the interactive application state to the user.

During operation, the interactive application reads and writes application resources 416 stored on a data store of the interactive controller host. The application resources 416 may include objects having graphics and/or control logic used to provide application environment objects of the interactive application. In various embodiments, the resources may also include, but are not limited to, video files that are used to generate a portion of the user presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the user presentation 406 for the user that is presented to the user using the user interface 404. The user perceives the user presentation and provides user interactions 408 using the user input devices. The corresponding user interactions are received as user actions or inputs by various components of the interactive application 402. The interactive application 402 translates the user actions into interactions with the virtual objects of the application environment stored in the application state 414. Components of the interactive application use the user interactions with the virtual objects of the interactive application and the interactive application state 414 to update the application state 414 and update the user presentation 406 presented to the user. The process loops continuously while the user interacts with the interactive application of the billiard combined proposition wagering system.

The interactive controller 400 provides one or more interfaces 418 between the interactive controller 400 and other components of a billiard combined proposition wagering system, such as, but not limited to, a process controller and a session/management controller. The interactive controller 400 and the other billiard combined proposition wagering system components communicate with each other using the interfaces. The interface may be used to pass various types of data, and to communicate and receive messages, status data, commands and the like. In certain embodiments, the interactive controller 400 and a process controller communicate application commands and environment resources 412 and application telemetry data 410. In some embodiments, the communications include requests by the process controller that the interactive controller 400 update the application state 414 using data provided by the process controller.

In many embodiments, a communications between a process controller and the interactive controller 400 includes a request that the interactive controller 400 update one or more resources 416 using data provided by the process controller. In a number of embodiments, the interactive controller 400 provides all or a portion of the application state to the process controller. In some embodiments, the interactive controller 400 may also provide data about one or more of the application resources 416 to the process controller. In some embodiments, the communication includes user interactions that the interactive controller 400 communicates to the process controller. The user interactions may be low level user interactions with the user interface 404, such as manipulation of a user input device, or may be high level interactions with game objects as determined by the interactive application. The user interactions may also include resultant actions such as modifications to the application state 414 or game resources 416 resulting from the user's interactions taken in the billiard combined proposition wagering system interactive application. In some embodiments, user interactions include, but are not limited to, actions taken by entities such as non-user characters (NPC) of the interactive application that act on behalf of or under the control of the user.

In various embodiments, the application commands and resources 412 include skill proposition application commands and/or resources used by the interactive application to generate a presentation of a skill proposition presented to a user and to determine a skill outcome based on the user's skillful interaction with the presentation of the skill proposition.

In some embodiments, the interactive controller 400 includes a wagering user interface 420 used to provide billiard combined proposition wagering system telemetry data 422 to and from the user. The billiard combined proposition wagering system telemetry data 422 from the billiard combined proposition wagering system include, but are not limited to, data used by the user to configure credit, application credit and interactive element wagers, and data about the chance-based proposition credits, application credits and interactive element wagers such as, but not limited to, credit, application credit and interactive element balances and credit, application credit and interactive element amounts wagered.

In some embodiments, the interactive controller 400 includes an administration interface 430 used to provide billiard combined proposition wagering system administration telemetry data 432 to and from the user.

In some embodiments, the interactive controller includes one or more sensors 424. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data 426 to one or more components of the billiard combined proposition wagering system.

Referring now to FIG. 4B, interactive controller 400 includes a bus 502 that provides an interface for one or more processors 504, random access memory (RAM) 506, read only memory (ROM) 508, machine-readable storage medium 510, one or more user output devices 512, one or more user input devices 514, and one or more communication interface devices 516.

The one or more processors 504 may take many forms, such as, but not limited to: a central processing unit (CPU); a multi-processor unit (MPU); an ARM processor; a controller; a programmable logic device; or the like.

In the example embodiment, the one or more processors 504 and the random access memory (RAM) 506 form an interactive controller processing unit 599. In some embodiments, the interactive controller processing unit includes one or more processors operatively connected to one or more of a RAM, ROM, and machine-readable storage medium; the one or more processors of the interactive controller processing unit receive instructions stored by the one or more of a RAM, ROM, and machine-readable storage medium via a bus; and the one or more processors execute the received instructions. In some embodiments, the interactive controller processing unit is an ASIC (Application-Specific Integrated Circuit). In some embodiments, the interactive controller processing unit is a SoC (System-on-Chip).

Examples of output devices 512 include, but are not limited to, display screens; light panels; and/or lighted displays. In accordance with particular embodiments, the one or more processors 504 are operatively connected to audio output devices such as, but not limited to: speakers; and/or sound amplifiers. In accordance with many of these embodiments, the one or more processors 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a user when the user interacts with the interactive controller; physiological sensors that monitor the physiology of the user; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in a billiard combined proposition wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and billiard combined proposition wagering system interactive controller instructions and data 524 for use by the one or more processors 504 to provide the features of an interactive controller as described herein. In some embodiments, the machine-executable instructions further include application control interface/application control interface instructions and data 526 for use by the one or more processors 504 to provide the features of an application control interface/application control interface as described herein.

In various embodiments, the machine-readable storage medium 510 is one of a (or a combination of two or more of) a hard drive, a flash drive, a DVD, a CD, a flash storage, a solid state drive, a ROM, an EIEPROM, and the like.

In operation, the machine-executable instructions are loaded into memory 506 from the machine-readable storage medium 510, the ROM 508 or any other storage location. The respective machine-executable instructions are accessed by the one or more processors 504 via the bus 502, and then executed by the one or more processors 504. Data used by the one or more processors 504 are also stored in memory 506, and the one or more processors 504 access such data during execution of the machine-executable instructions. Execution of the machine-executable instructions causes the one or more processors 504 to control the interactive controller 400 to provide the features of a billiard combined proposition wagering system interactive controller as described herein Although the interactive controller is described herein as being constructed from or configured using one or more processors and instructions stored and executed by hardware components, the interactive controller can be constructed from or configured using only hardware components in accordance with other embodiments. In addition, although the storage medium 510 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processors 504 through one of the communication interface devices 516 or using a communication link. Furthermore, any of the user input devices or user output devices can be operatively connected to the one or more processors 504 vione of the communication interface devices 516 or using a communication link.

In some embodiments, the interactive controller 400 can be distributed across a plurality of different devices. In many such embodiments, an interactive controller of a billiard combined proposition wagering system includes an interactive application server operatively connected to an interactive client using a communication link. The interactive application server and interactive application client cooperate to provide the features of an interactive controller as described herein.

In various embodiments, the interactive controller 400 may be used to construct other components of a billiard combined proposition wagering system as described herein.

In some embodiments, components of an interactive controller and a process controller of a billiard combined proposition wagering system may be constructed from or configured using a single device using processes that communicate using an interprocess communication protocol. In other such embodiments, the components of an interactive controller and a process controller of a billiard combined proposition wagering system may communicate by passing messages, parameters or the like.

Figure 5A:
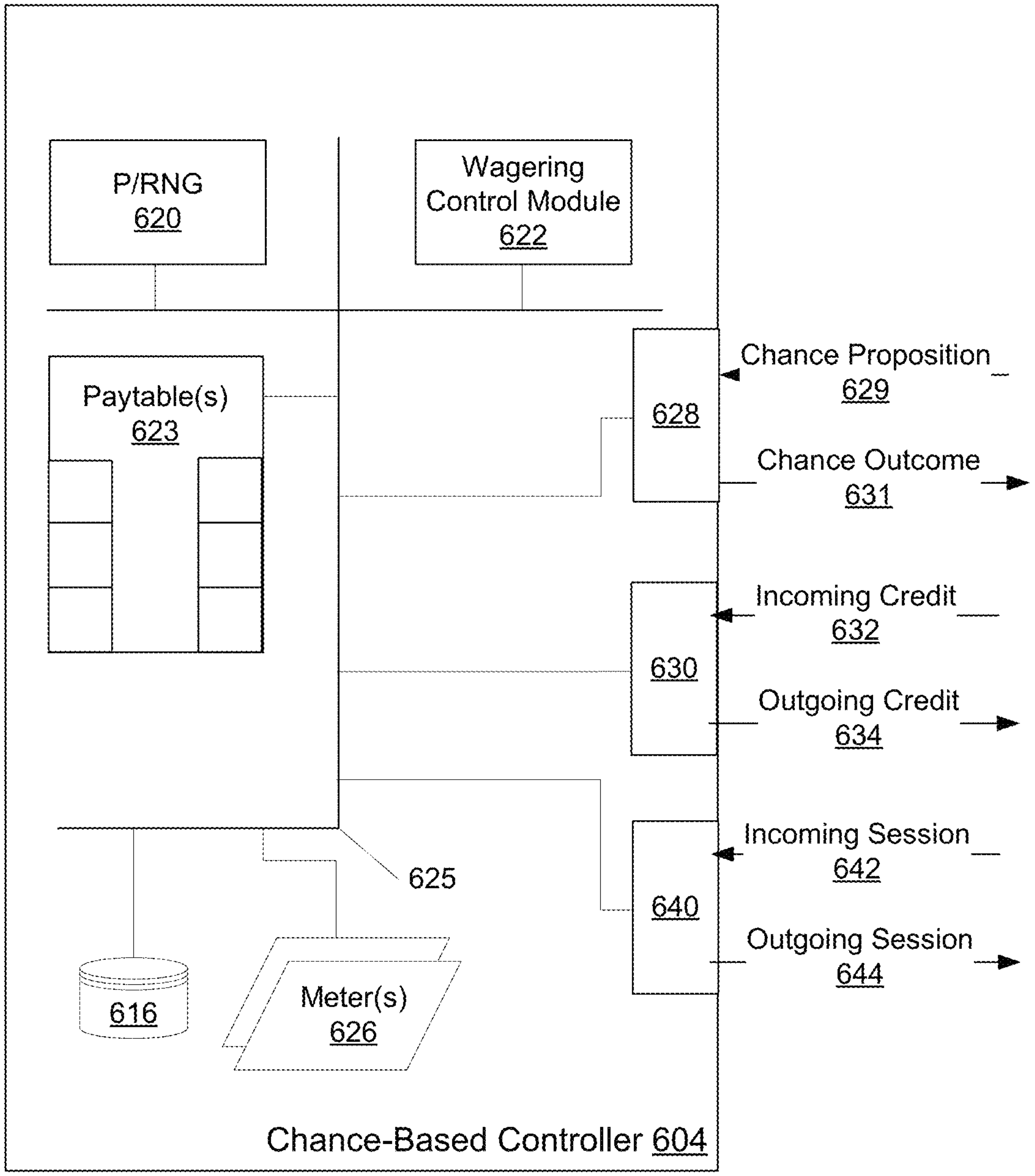
FIGS. 5A and 5B are diagrams of a structure of a chance-based controller of a billiard combined proposition wagering system in accordance with various embodiments of the invention.
Figure 5B:
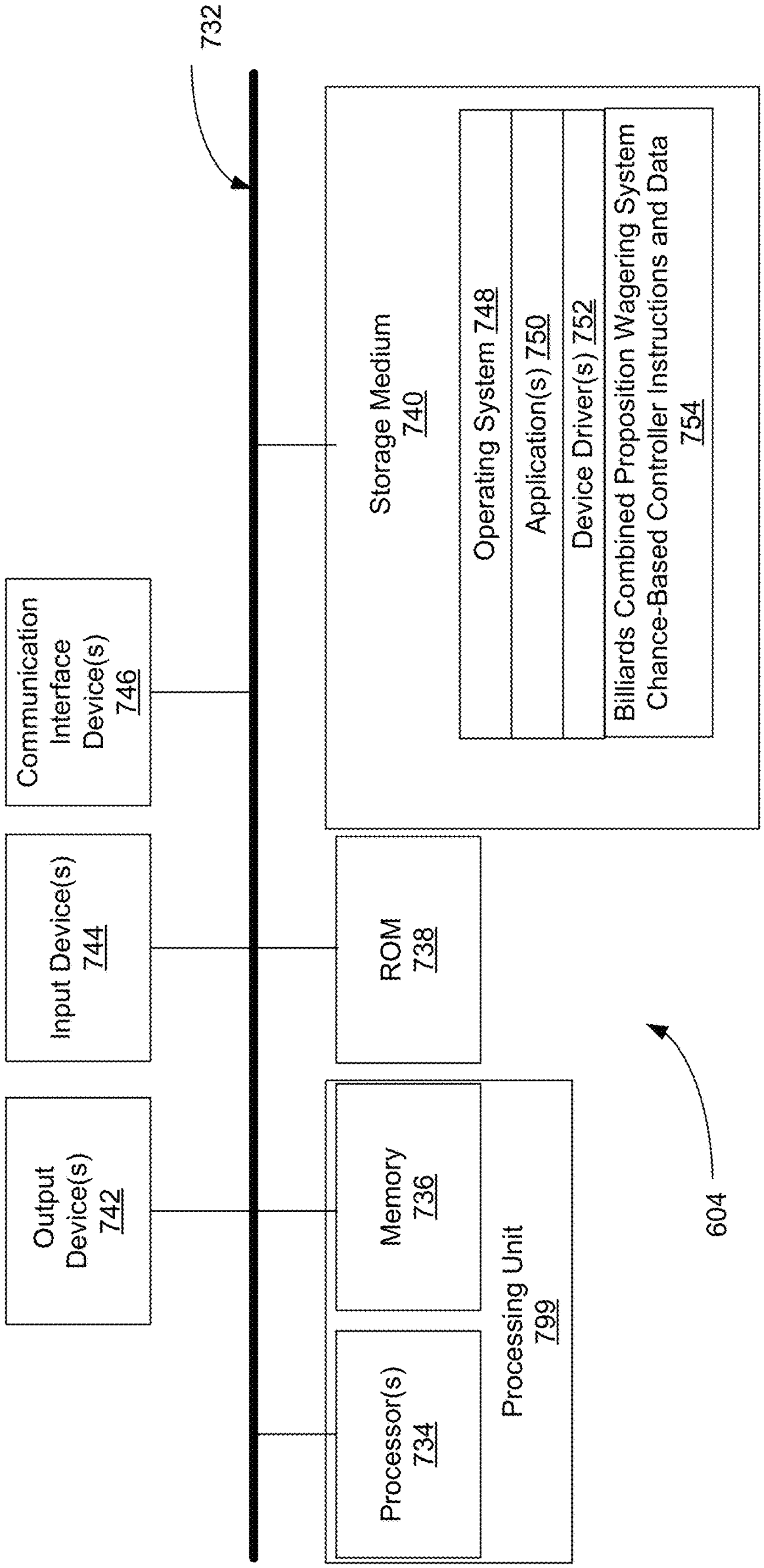

FIGS. 5A and 5B are diagrams of a structure of a chance-based controller of a billiard combined proposition wagering system in accordance with various embodiments of the invention. A chance-based controller may be constructed from or configured using one or more processing devices that perform the operations of the chance-based controller. In many embodiments, a chance-based controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 5A, in various embodiments, a chance-based controller 604, suitable for use as chance-based controller 102 of FIG. 1, includes a random number generator (RNG) 620 to produce random results; one or more paytables 623 which includes a plurality of factors indexed by the random result to be multiplied with an amount of credits, application credits, interactive elements, or objects committed in a wager; and a wagering control module 622 whose processes may include, but are not limited to, generating random results, looking up factors in the paytables, multiplying the factors by an amount of credits, application credits, interactive elements, or objects wagered, and administering one or more credit, application credit, interactive element, or object meters 626. The various chance-based controller components can interface with each other via an internal bus 625 and/or other appropriate communication mechanism.

In some embodiments, an interface 628 allows the chance-based controller 604 to operatively connect to, and communicate with, an external device, such as one or more process controllers as described herein. The interface 628 provides for communication of chance proposition determination commands 629 from the external device that is used to specify chance-based proposition parameters and/or initiate resolution of a chance-based proposition by the chance-based controller 604 as described herein. The interface 628 may also provide for communicating chance outcome data 631 to an external device as described herein. In numerous embodiments, the interface 628 between the chance-based controller 604 and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

In various embodiments, an interface 630 allows the chance-based controller 604 to operatively connect to an external system or device, such as one or more credit processing systems, as described herein. The interface 630 provides for communication of incoming credit data 632 from the external system or device that is used to add credits to the one or more meters 626 as described herein. The interface 630 may also provide for communicating outgoing credit data 634 to an external system or device, such as a credit processing system, as described herein. In numerous embodiments, the interface 630 between the chance-based controller 604 and other systems/devices may be a wide area network (WAN) such as the Internet. However, other methods of communication may be used including, but not limited to, a local area network (LAN), a universal serial bus (USB) interface, and/or some other method by which two electronic devices or systems could communicate with each other.

In various embodiments, an interface 640 allows the chance-based controller 604 to operatively connect to an external system or device, such as one or more session/management controllers, as described herein. The interface 640 provides for communication of incoming session data 642 from the external system or device as described herein. The interface 640 may also provide for communicating outgoing session data 644 to an external system or device, such as a session/management controller, as described herein. In numerous embodiments, the interface 640 between the chance-based controller 604 and other systems/devices may be a wide area network (WAN) such as the Internet. However, other methods of communication may be used including, but not limited to, a local area network (LAN), a universal serial bus (USB) interface, and/or some other method by which two electronic devices or systems could communicate with each other.

In various embodiments, a chance-based controller 604 may use a random number generator provided by an external system. The external system may be connected to the chance-based controller 604 by a suitable communication network such as a local area network (LAN) or a wide area network (WAN). In some embodiments, the external random number generator is a central deterministic system that provides random results to one or more connected chance-based controllers.

During operation of the chance-based controller, the external system communicates chance proposition determination commands 629 to the chance-based controller 604. The chance-based controller 604 receives the chance proposition determination commands and uses the chance proposition determination commands to initiate resolution of a chance-based proposition in accordance with a chance-based proposition. The chance-based controller 604 executes the chance-based proposition and determines a chance outcome for the chance-based proposition. The chance-based controller communicates chance outcome data 631 of the chance outcome to the external system.

In some embodiments, the chance-based controller uses the chance proposition determination commands to select a paytable 628 to use and/or an amount of credits, application credits, interactive elements, or objects for a chance-based proposition.

In some embodiments, the chance outcome data may include, but is not limited to, an amount of credits, application credits, interactive elements, or objects.

In various embodiments, the chance outcome data may include, but is not limited to, an amount of credits, application credits, interactive elements, or objects in the one or more meters 626.

In some embodiments, the chance outcome data includes state data for the chance-based proposition of the resolved chance-based proposition. The state data may correspond to one or more game states of a chance-based proposition that is associated with the chance-based proposition. Examples of state data include, but are not limited to, reel strips in an operation state or a final state for a reel-based chance-based proposition, one or more dice positions for a dice-based chance-based proposition, positions of a roulette wheel and roulette ball, position of a wheel of fortune, or the like.

In various embodiments, the chance-based proposition control module 622 determines an amount of a chance-based proposition and a paytable to use from the one or more paytables 623. In such embodiments, in response to the chance proposition determination commands initiating resolution of the chance-based proposition, the chance-based proposition control module 622 resolves the chance-based proposition by requesting a random number generator result from the RNG 620; retrieving a paytable from the one or more paytables 623; adjusting the one or more credit meters 626 for an amount of the wager; applying the random number generator result to the retrieved paytable; multiplying the resultant factor from the paytable by an amount wagered to determine a chance outcome; updating the one or more meters 626 based on the chance outcome; and communicating the chance outcome to the external device.

In various embodiments, an external system communicates a request for a random number generator result from the chance-based controller 604. In response, the chance-based controller 604 returns a random number generator result as a function of an internal random number generator or a random number generator external to the external system to which the chance-based controller 604 is operatively connected.

In some embodiments, a communication exchange between the chance-based controller 604 and an external system relate to the external system support for coupling a random number generator result to a particular paytable contained in the chance-based controller 604. In such an exchange, the external system communicates to the chance-based controller 604 as to which of the one or more paytables 623 to use, and requests a result whereby the random number generator result would be associated with the requested paytable 623. The result of the coupling is returned to the external system. In such an exchange, no actual credit, application credit, interactive element, or object chance outcome is determined, but might be useful in coupling certain non-value wagering interactive application behaviors and propositions to the same final resultant chance outcome which is understood for the billiard combined proposition wagering system.

In some embodiments, the chance-based controller 604 may also include storage for statuses, wagers, chance outcomes, meters and other historical events in a storage device 616.

In some embodiments, an authorization access module provides a process to permit access and command exchange with the chance-based controller 604 and access to the one or more credit meters 626 for the amount of credits, application credits, interactive elements, or objects being wagered by the user in the billiard combined proposition wagering system.

In numerous embodiments, communication occurs between various types of a chance-based controller and an external system 630, such as process controller. In some of these embodiments, the purpose of the chance-based controller is to allocate wagers to pools, detect occurrences of one or more events upon which the wagers were made, and determine the chance outcomes for each individual random number generator based on the number of winning chance outcomes and the amount paid into the pool.

In some embodiments, the chance-based controller manages accounts for individual users wherein the users make deposits into the accounts, amounts are deducted from the accounts, and amounts are credited to the users' accounts based on the chance outcomes.

In some embodiments a chance-based controller is a pari-mutuel wagering system such as used for wagering on an events such as horse races, greyhound races, sporting events and the like. In a pari-mutuel wagering system, user's wagers on the outcome of an event are allocated to a pool. When the event occurs, chance outcomes are calculated by sharing the pool among all winning wagers.

In various embodiments, a chance-based controller is a central determination system, such as but not limited to a central determination system for a Class II wagering system or a wagering system in support of a "scratch off" style lottery. In such a wagering system, a user plays against other users and competes for a common prize. In a given set of chance outcomes, there are a certain number of wins and losses. Once a certain chance outcome has been determined, the same chance outcome cannot occur again until a new set of chance outcomes is generated.

In numerous embodiments, communication occurs between various components of a chance-based controller 604 and an external system, such as a process controller.

Referring now to FIG. 5B, chance-based controller 604 includes a bus 732 that provides an interface for one or more processors 734, random access memory (RAM) 736, read only memory (ROM) 738, machine-readable storage medium 740, one or more user output devices 742, one or more user input devices 744, and one or more communication interface and/or network interface devices 746.

The one or more processors 734 may take many forms, such as, but not limited to, a central processing unit (CPU), a multi-processor unit (MPU), an ARM processor, a controller, a programmable logic device, or the like.

In the example embodiment, the one or more processors 734 and the random access memory (RAM) 736 form a chance-based controller processing unit 799. In some embodiments, the chance-based controller processing unit includes one or more processors operatively connected to one or more of a RAM, ROM, and machine-readable storage medium; the one or more processors of the chance-based controller processing unit receive instructions stored by the one or more of a RAM, ROM, and machine-readable storage medium via a bus; and the one or more processors execute the received instructions. In some embodiments, the chance-based controller processing unit is an ASIC (Application-Specific Integrated Circuit). In some embodiments, the chance-based controller processing unit is a SoC (System-on-Chip).

Examples of output devices 742 include, but are not limited to, display screens, light panels, and/or lighted displays. In accordance with particular embodiments, the one or more processors 734 are operatively connected to audio output devices such as, but not limited to speakers, and/or sound amplifiers. In accordance with many of these embodiments, the one or more processors 734 are operatively connected to tactile output devices like vibrators, and/or manipulators.

Examples of user input devices 734 include, but are not limited to, tactile devices including but not limited to, keyboards, keypads, touch screens, and/or trackballs; non-contact devices such as audio input devices; motion sensors and motion capture devices that the chance-based controller can use to receive inputs from a user when the user interacts with the chance-based controller 604.

The one or more communication interface and/or network interface devices 746 provide one or more wired or wireless interfaces for exchanging data and commands between the chance-based controller 604 and other devices that may be included in a billiard combined proposition wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 740 stores machine-executable instructions for various components of a chance-based controller, such as but not limited to: an operating system 748; one or more application programs 750; one or more device drivers 752; and billiard combined proposition wagering system chance-based controller instructions and data 754 for use by the one or more processors 734 to provide the features of a billiard combined proposition wagering system chance-based controller as described herein.

In various embodiments, the machine-readable storage medium 740 is one of a (or a combination of two or more of) a hard drive, a flash drive, a DVD, a CD, a flash storage, a solid state drive, a ROM, an EIEPROM, and the like.

In operation, the machine-executable instructions are loaded into memory 736 from the machine-readable storage medium 740, the ROM 738 or any other storage location. The respective machine-executable instructions are accessed by the one or more processors 734 via the bus 732, and then executed by the one or more processors 734. Data used by the one or more processors 734 are also stored in memory 736, and the one or more processors 734 access such data during execution of the machine-executable instructions. Execution of the machine-executable instructions causes the one or more processors 734 to control the chance-based controller 604 to provide the features of a billiard combined proposition wagering system chance-based controller as described herein Although the chance-based controller 604 is described herein as being constructed from or configured using one or more processors and machine-executable instructions stored and executed by hardware components, the chance-based controller can be composed of only hardware components in accordance with other embodiments. In addition, although the storage medium 740 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 740 can be accessed by the one or more processors 734 through one of the interfaces or using a communication link. Furthermore, any of the user input devices or user output devices can be operatively connected to the one or more processors 734 vione of the interfaces or using a communication link.

In various embodiments, the chance-based controller 604 may be used to construct other components of a billiard combined proposition wagering system as described herein.

In some embodiments, components of a chance-based controller and a process controller of a billiard combined proposition wagering system may be constructed from or configured using a single device using processes that communicate using an interprocess communication protocol. In other such embodiments, the components of a chance-based controller and a process controller of a billiard combined proposition wagering system may communicate by passing messages, parameters or the like.

It should be understood that there may be many embodiments of a chance-based controller 604 which could be possible, including forms where many modules and components of the chance-based controller are located in various servers and locations, so the foregoing is not meant to be exhaustive or all inclusive, but rather provide data on various embodiments of a chance-based controller 604.

Figure 6A:
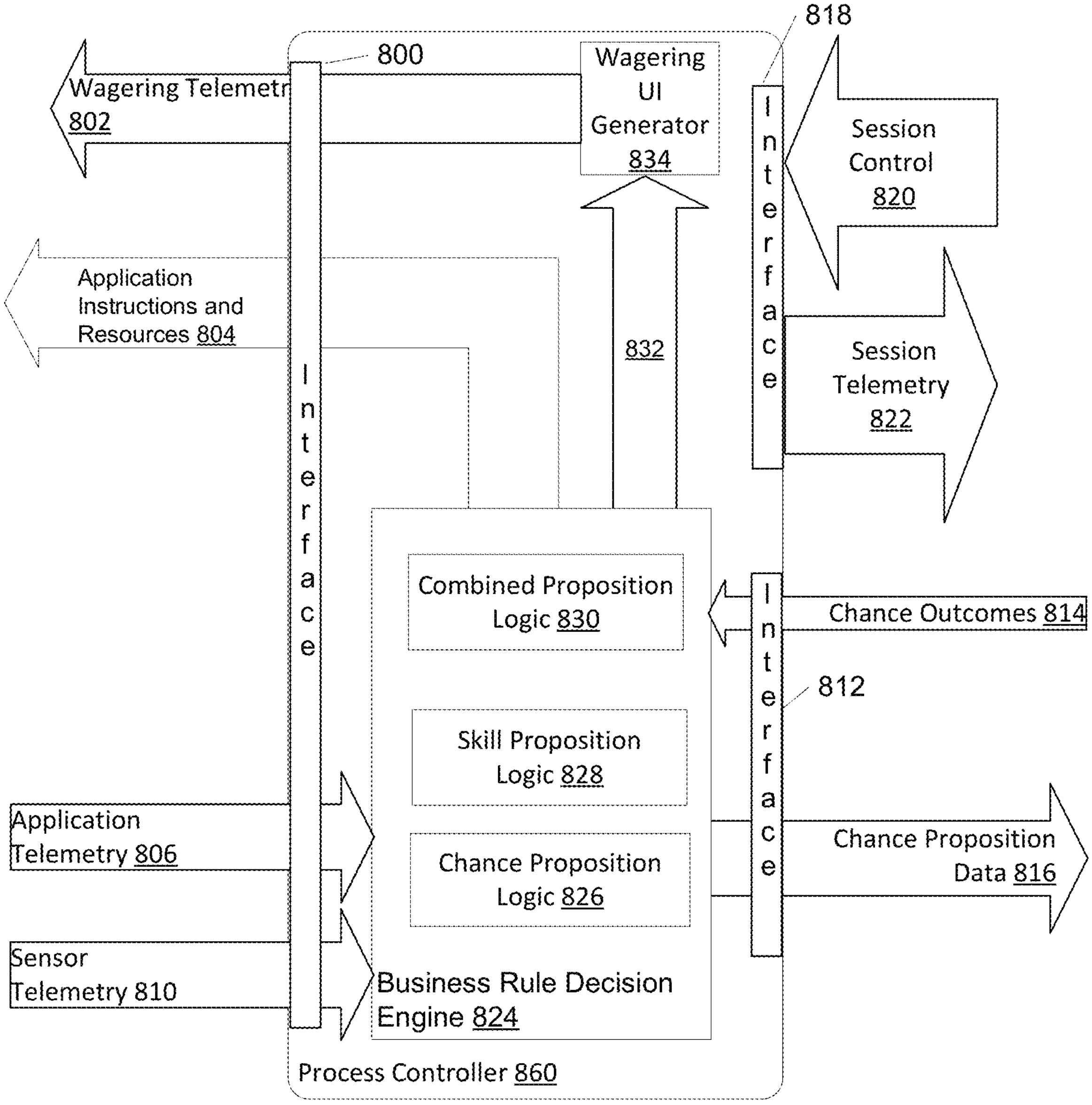
FIGS. 6A and 6B are diagrams of a structure of a process controller of a billiard combined proposition wagering system in accordance with various embodiments of the invention.
Figure 6B:
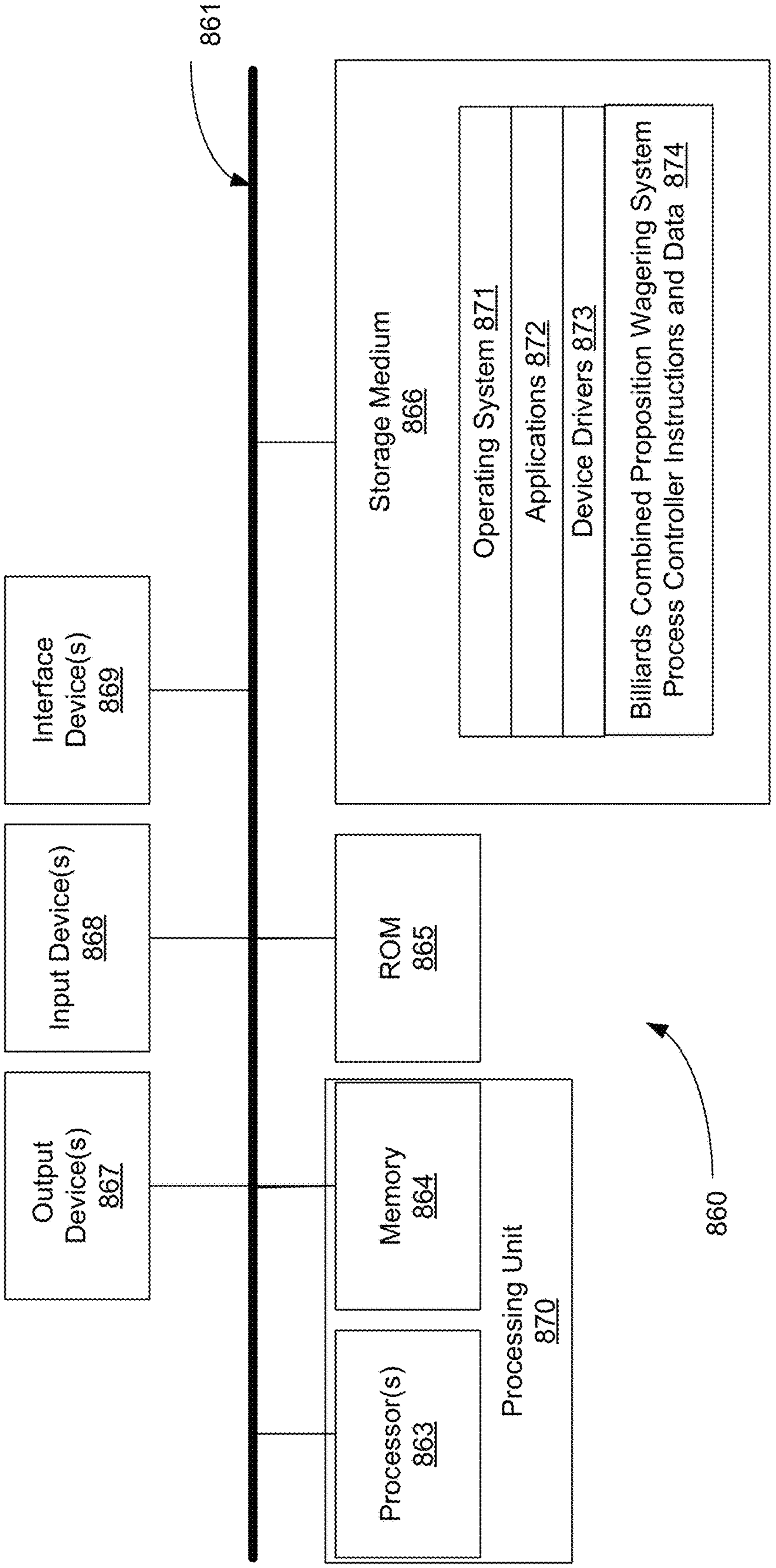

FIGS. 6A and 6B are diagrams of a structure of a process controller of a billiard combined proposition wagering system in accordance with various embodiments of the invention. A process controller may be constructed from or configured using one or more processing devices that perform the operations of the process controller. In many embodiments, a process controller can be constructed from or configured using various types of processing devices including, but not limited to, a mobile device such as a smartphone, a personal digital assistant, a wireless device such as a tablet computer or the like, an electronic gaming machine, a personal computer, a gaming console, a set-top box, a computing device, a controller, or the like.

Referring now to FIG. 6A, in many embodiments, a process controller 860, suitable for use as process controller 112 of FIG. 1, manages operation of a billiard combined proposition wagering system, with a chance-based controller and an interactive controller being support units to the process controller 860. The process controller 860 provides an interface between the interactive application, provided by an interactive controller, and a chance-based proposition, provided by a chance-based controller.

In some embodiments, the process controller 860 includes an interactive controller interface 800 to an interactive controller. The interactive controller interface 800 provides for communication of data between an interactive controller and the process controller 860, including but not limited to wagering telemetry data 802, application instructions and resources 804, application telemetry data 806, and sensor telemetry data 810 as described herein.

In various embodiments, the process controller 860 includes a chance-based controller interface 812 to a chance-based controller. The chance-based controller interface 812 provides for communication of data between the process controller 860 and a chance-based controller, including but not limited to chance outcomes 814 and chance proposition determination commands 816 as described in.

In some embodiments, the process controller 860 includes a session/management controller interface 818 to a session/management controller. The session/management controller interface 818 provides for communication of data between the process controller 860 and a session/management controller, including but not limited to session control data 820 and session telemetry data 822 as described herein.

The process controller 860 includes a rule-based decision engine 824 that receives telemetry data, such as application telemetry data and sensor telemetry data, from an interactive controller. The rule-based decision engine 824 uses the telemetry data, along with chance proposition logic 826 to generate chance proposition data 816 used to command a chance-based controller to initiate resolution of a chance-based outcome. The chance proposition data may include, but are not limited to, an amount and type of the chance-based outcome, a request for resolution of the chance-based outcome, and a selection of a paytable to be used when resolving the chance-based proposition.

In some embodiments, the application telemetry data includes, but is not limited to, application environment variables that indicate the state of an interactive application being used by a user, interactive controller data indicating a state of an interactive controller, and user actions and interactions between a user and an interactive application provided by an interactive controller.

In some embodiments, the rule-based decision engine 824 also receives chance outcome data 814 from a chance-based controller. The decision engine 824 uses the chance outcome data, in conjunction with telemetry data and skill proposition logic 828 to generate application instructions and resources 804 for a skill proposition that is to be presented to a user by an interactive application of an interactive controller. The application instructions and resources 804 are communicated to the interactive application of the interactive controller.

In some embodiments, the application telemetry data 806 may further include a skill outcome determined by the interactive application in response to a user's skillful interactions with the skill proposition that was presented to the user.

In various embodiments, the rule-based decision engine 824 also determines an amount of application credit to award to a user based at least in part on the user's use of an interactive application of the billiard combined proposition wagering system as determined from application telemetry data. In some embodiments, chance outcome data may also be used to determine the amount of application credit that should be awarded to the user.

In numerous embodiments, an interactive application is a skill-based interactive application and the application credit is awarded to the user for the user's skillful play of the skill-based interactive application.

In some embodiments, the business rule decision engine 824 uses combined proposition logic 830 to generate a combined outcome using the skill outcome data included in the application telemetry 806 and the chance outcome data 814. Data of the combined outcome 832 are communicated to a wagering user interface generator 834. The wagering user interface generator 834 receives the combined outcome data 832 and generates wagering telemetry data 802 describing the state of wagering and credit accumulation and loss for the billiard combined proposition wagering system. In some embodiments, the wagering telemetry data 146 may include, but is not limited to, amounts of application credits and interactive elements earned, lost or accumulated by the user through use of the interactive application as determined from the application decisions, and credit amounts won, lost or accumulated as determined from the combined outcome data 832 and one or more credit meters.

The process controller 860 can further operatively connect to a chance-based controller to determine an amount of credit or interactive elements available and other wagering metrics of a chance-based proposition. Thus, the process controller 860 may potentially affect an amount of credits in play for participation in the wagering events of a chance-based proposition provided by the chance-based controller. The process controller 860 may additionally include various audit logs and activity meters. In some embodiments, the process controller 860 can also couple to a centralized server for exchanging various data related to the user and the activities of the user during game play of a billiard combined proposition wagering system.

In some embodiments, the operation of the process controller 860 does not affect the provision of a chance-based proposition by a chance-based controller except for user choice parameters that are allowable in accordance with the chance-based proposition.

In a number of embodiments, communication of chance proposition determination commands between a chance-based controller and the process controller 860 can further be used to communicate various wagering control factors that the chance-based controller uses as input. Examples of wagering control factors include, but are not limited to, an amount of credits, application credits, interactive elements, or objects consumed per wagering event, and/or the user's election to enter a jackpot round.

In some embodiments, the process controller 860 utilizes a wagering user interface to communicate certain interactive application data to the user, including but not limited to, club points, user status, control of the selection of user choices, and messages which a user can find useful in order to adjust the interactive application experience or understand the wagering status of the user in accordance with the chance-based proposition in the chance-based controller.

In some embodiments, the process controller 860 utilizes a wagering user interface to communicate aspects of a chance-based proposition to the user including, but not limited to, odds of certain chance outcomes, amount of credits, application credits, interactive elements, or objects in play, and amounts of credits, application credits, interactive elements, or objects available.

In a number of embodiments, a chance-based controller can accept chance-based proposition factors including, but not limited to, modifications in the amount of credits, application credits, interactive elements, or objects wagered on each individual wagering event, a number of wagering events per minute the chance-based controller can resolve, entrance into a bonus round, and other factors. In several embodiments, the process controller 860 can communicate a number of factors back and forth to the chance-based controller, such that an increase/decrease in a wagered amount can be related to the change in user profile of the user in the interactive application. In this manner, a user can control a chance-based proposition credit amount per wagering event in accordance with the chance-based proposition with the change mapping to a parameter or component that is applicable to the interactive application experience.

Referring now to FIG. 6B, process controller 860 includes a bus 861 providing an interface for one or more processors 863, random access memory (RAM) 864, read only memory (ROM) 865, machine-readable storage medium 866, one or more user output devices 867, one or more user input devices 868, and one or more communication interface and/or network interface devices 869.

The one or more processors 863 may take many forms, such as, but not limited to: a central processing unit (CPU); a multi-processor unit (MPU); an ARM processor; a programmable logic device; or the like.

Examples of output devices 867 include, include, but are not limited to: display screens; light panels; and/or lighted displays. In accordance with particular embodiments, the one or more processors 863 are operatively connected to audio output devices such as, but not limited to: speakers; and/or sound amplifiers. In accordance with many of these embodiments, the one or more processors 863 are operatively connected to tactile output devices like vibrators, and/or manipulators.

In the example embodiment, the one or more processors 863 and the random access memory (RAM) 864 form a process controller processing unit 870. In some embodiments, the process controller processing unit includes one or more processors operatively connected to one or more of a RAM, ROM, and machine-readable storage medium; the one or more processors of the process controller processing unit receive instructions stored by the one or more of a RAM, ROM, and machine-readable storage medium via a bus; and the one or more processors execute the received instructions. In some embodiments, the process controller processing unit is an ASIC (Application-Specific Integrated Circuit). In some embodiments, the process controller processing unit is a SoC (System-on-Chip).

Examples of user input devices 868 include, but are not limited to: tactile devices including but not limited to, keyboards, keypads, foot pads, touch screens, and/or trackballs; non-contact devices such as audio input devices; motion sensors and motion capture devices that the process controller can use to receive inputs from a user when the user interacts with the process controller 860.

The one or more communication interface and/or network interface devices 869 provide one or more wired or wireless interfaces for exchanging data and commands between the process controller 860 and other devices that may be included in a billiard combined proposition wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 866 stores machine-executable instructions for various components of the process controller 860 such as, but not limited to: an operating system 871; one or more applications 872; one or more device drivers 873; and billiard combined proposition wagering system process controller instructions and data 874 for use by the one or more processors 863 to provide the features of a process controller as described herein.

In various embodiments, the machine-readable storage medium 870 is one of a (or a combination of two or more of) a hard drive, a flash drive, a DVD, a CD, a flash storage, a solid state drive, a ROM, an EIEPROM, and the like.

In operation, the machine-executable instructions are loaded into memory 864 from the machine-readable storage medium 866, the ROM 865 or any other storage location. The respective machine-executable instructions are accessed by the one or more processors 863 via the bus 861, and then executed by the one or more processors 863. Data used by the one or more processors 863 are also stored in memory 864, and the one or more processors 863 access such data during execution of the machine-executable instructions. Execution of the machine-executable instructions causes the one or more processors 863 to control the process controller 860 to provide the features of a billiard combined proposition wagering system process controller as described herein.

Although the process controller 860 is described herein as being constructed from or configured using one or more processors and instructions stored and executed by hardware components, the process controller can be composed of only hardware components in accordance with other embodiments. In addition, although the storage medium 866 is described as being operatively connected to the one or more processors through a bus, those skilled in the art of process controllers will understand that the storage medium can include removable media such as, but not limited to, a USB memory device, an optical CD ROM, magnetic media such as tape and disks. Also, in some embodiments, the storage medium 866 may be accessed by processor 863 through one of the interfaces or using a communication link. Furthermore, any of the user input devices or user output devices may be operatively connected to the one or more processors 863 vione of the interfaces or using a communication link.

In various embodiments, the process controller 860 may be used to construct other components of a billiard combined proposition wagering system as described herein.

In some embodiments, components of an interactive controller and a process controller of a billiard combined proposition wagering system may be constructed from or configured using a single device using processes that communicate using an interprocess communication protocol. In other such embodiments, the components of an interactive controller and a process controller of a billiard combined proposition wagering system may communicate by passing messages, parameters or the like.

Figure 7A:
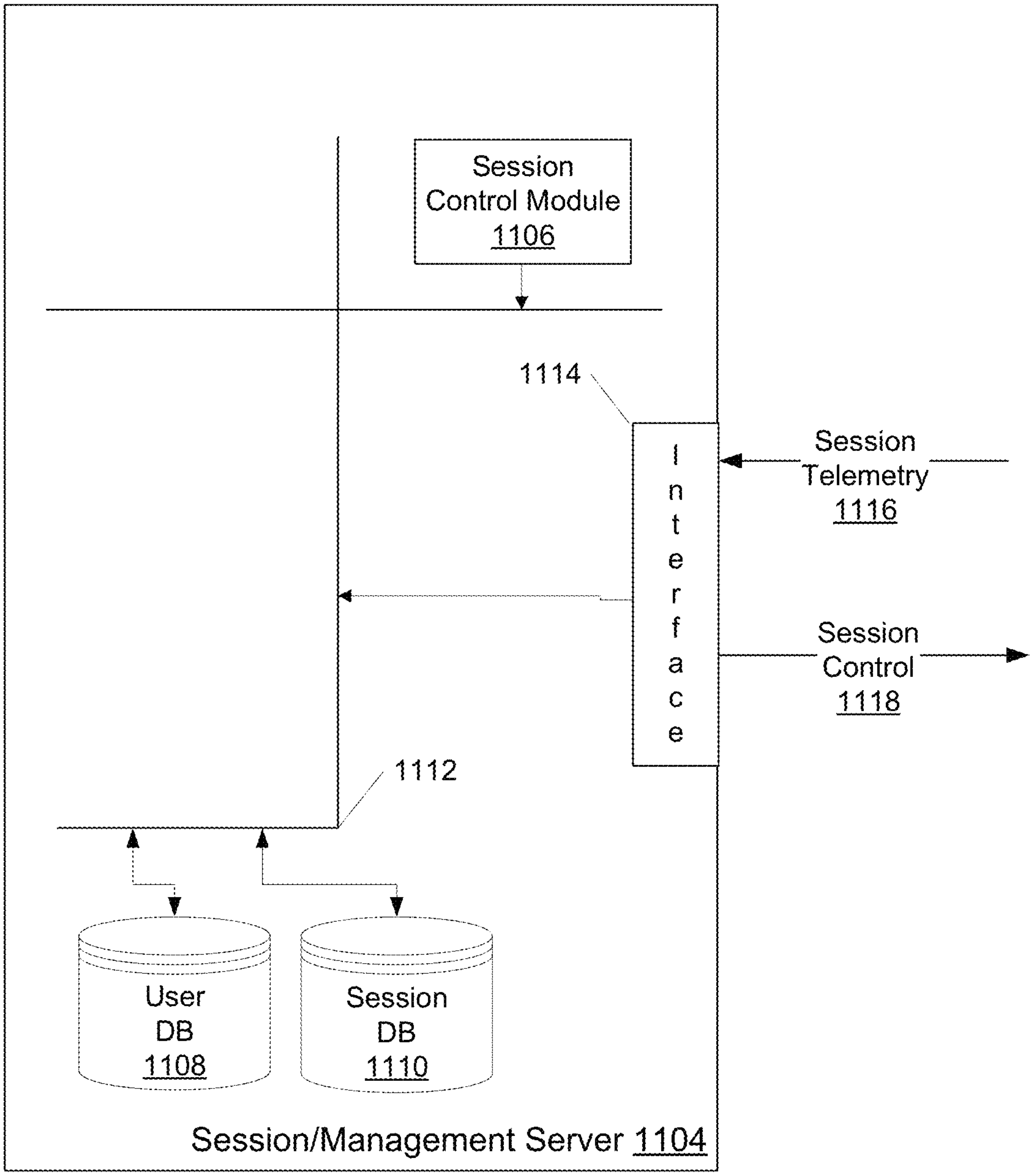
FIGS. 7A and 7B are diagrams of a structure of a session/management controller of a billiard combined proposition wagering system in accordance with various embodiments of the invention.
Figure 7B:
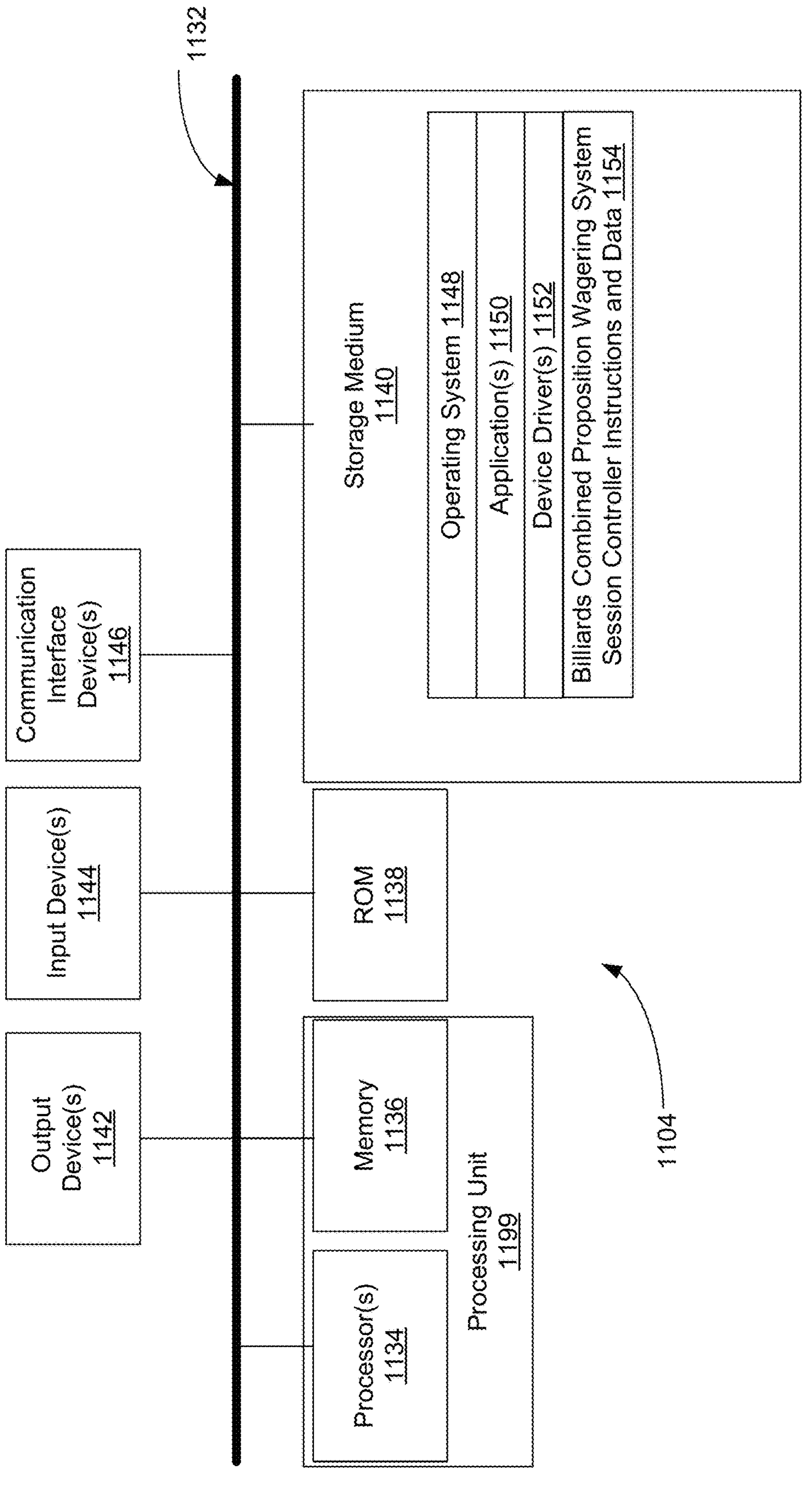

FIGS. 7A and 7B are diagrams of a structure of a session/management controller of a billiard combined proposition wagering system in accordance with various embodiments of the invention. A session/management controller may be constructed from or configured using one or more processing devices that perform the operations of the session/management controller. In many embodiments, a session/management controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, a server, or the like.

Referring now to FIG. 7A, in various embodiments, a session/management controller 1104, suitable for use as session/management controller 150 of FIG. 1, includes a user management and session control module 1106 whose processes may include, but are not limited to, registering users of a billiard combined proposition wagering system, validating users of a billiard combined proposition wagering system using user registration data, managing various types of sessions for users of the billiard combined proposition wagering system, and the like.

The session/management controller 1104 may further include a datastore 1108 storing user data used to manage user registration and validation. The session/management controller 1104 may further include a datastore 1110 storing session data used to manage one or more sessions.

The various session/management controller components can interface with each other via an internal bus 1112 and/or other appropriate communication mechanism.

An interface 1114 allows the session/management controller 1104 to operatively connect to one or more external devices, such as one or more process controllers, chance-based controllers and/or interactive controllers as described herein. The interface provides for receiving session telemetry data 1116 from the one more external devices as described herein. The session telemetry data includes, but is not limited to, amounts of application credit earned by one or more users, requests for entering into a session as described herein, and telemetry data regarding the progress of one or more users during a session. The interface 1114 may also provide for communicating secession control data 1118 used to manage a session as described herein.

In numerous embodiments, the interface between the session/management controller and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

During operation of the session/management controller, the external system communicates session telemetry data to the session/management controller. The session/management controller receives the session telemetry data and uses the session telemetry data to generate session control data as described herein. The session/management controller communicates the session control data to the external system.

Referring now to FIG. 7B, session/management controller 1104 includes a bus 1132 that provides an interface for one or more processors 1134, random access memory (RAM) 1136, read only memory (ROM) 1138, machine-readable storage medium 1140, one or more user output devices 1142, one or more user input devices 1144, and one or more communication interface and/or network interface devices 1146.

The one or more processors 1134 may take many forms, such as, but not limited to, a central processing unit (CPU), a multi-processor unit (MPU), an ARM processor, a controller, a programmable logic device, or the like.

In the example embodiment, the one or more processors 1134 and the random access memory (RAM) 1136 form a session/management controller processing unit 1199. In some embodiments, the session/management controller processing unit includes one or more processors operatively connected to one or more of a RAM, ROM, and machine-readable storage medium; the one or more processors of the session/management controller processing unit receive instructions stored by the one or more of a RAM, ROM, and machine-readable storage medium via a bus; and the one or more processors execute the received instructions. In some embodiments, the session/management controller processing unit is an ASIC (Application-Specific Integrated Circuit). In some embodiments, the session/management controller processing unit is a SoC (System-on-Chip).

Examples of output devices 1142 include, but are not limited to, display screens, light panels, and/or lighted displays. In accordance with particular embodiments, the one or more processors 1134 are operatively connected to audio output devices such as, but not limited to speakers, and/or sound amplifiers. In accordance with many of these embodiments, the one or more processors 1134 are operatively connected to tactile output devices like vibrators, and/or manipulators.

Examples of user input devices 1144 include, but are not limited to, tactile devices including but not limited to, keyboards, keypads, touch screens, and/or trackballs; non-contact devices such as audio input devices; motion sensors and motion capture devices that the session/management controller can use to receive inputs from a user when the user interacts with the session/management controller 1104.

The one or more communication interface and/or network interface devices 1146 provide one or more wired or wireless interfaces for exchanging data and commands between the session/management controller 1104 and other devices that may be included in a billiard combined proposition wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 1140 stores machine-executable instructions for various components of a session/management controller, such as but not limited to: an operating system 1148; one or more application programs 1150; one or more device drivers 1152; and billiard combined proposition wagering system session/management controller instructions and data 1154 for use by the one or more processors 1134 to provide the features of a billiard combined proposition wagering system session/management controller as described herein.

In various embodiments, the machine-readable storage medium 1140 is one of a (or a combination of two or more of) a hard drive, a flash drive, a DVD, a CD, a flash storage, a solid state drive, a ROM, an EIEPROM, and the like.

In operation, the machine-executable instructions are loaded into memory 736 from the machine-readable storage medium 1140, the ROM 1138 or any other storage location. The respective machine-executable instructions are accessed by the one or more processors 1134 via the bus 1132, and then executed by the one or more processors 1134. Data used by the one or more processors 1134 are also stored in memory 1136, and the one or more processors 1134 access such data during execution of the machine-executable instructions. Execution of the machine-executable instructions causes the one or more processors 1134 to control the session/management controller 1104 to provide the features of a billiard combined proposition wagering system session/management controller as described herein Although the session/management controller 1104 is described herein as being constructed from or configured using one or more processors and machine-executable instructions stored and executed by hardware components, the session/management controller can be composed of only hardware components in accordance with other embodiments. In addition, although the storage medium 1140 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 1140 can be accessed by the one or more processors 1134 through one of the interfaces or using a communication link. Furthermore, any of the user input devices or user output devices can be operatively connected to the one or more processors 1134 vione of the interfaces or using a communication link.

In various embodiments, the session/management controller 1104 may be used to construct other components of a billiard combined proposition wagering system as described herein.

In some embodiments, components of a session/management controller and a process controller of a billiard combined proposition wagering system may be constructed from or configured using a single device using processes that communicate using an interprocess communication protocol. In other such embodiments, the components of a session/management controller and a process controller of a billiard combined proposition wagering system may communicate by passing messages, parameters or the like.

In some embodiments, components of a session/management controller and a chance-based controller of a billiard combined proposition wagering system may be constructed from or configured using a single device using processes that communicate using an interprocess communication protocol. In other such embodiments, the components of a session/management controller and a process controller of a billiard combined proposition wagering system may communicate by passing messages, parameters or the like.

It should be understood that there may be many embodiments of a session/management controller 1104 which could be possible, including forms where many modules and components of the session/management controller are located in various servers and locations, so the foregoing is not meant to be exhaustive or all inclusive, but rather provide data on various embodiments of a session/management controller 1104.

In numerous embodiments, any of a chance-based controller, a process controller, an interactive controller, or a session/management controller as described herein can be constructed from or configured using multiple processing devices, whether dedicated, shared, or distributed in any combination thereof, or can be constructed from or configured using a single processing device. In addition, while certain aspects and features of billiard combined proposition wagering system processes described herein have been attributed to a chance-based controller, a process controller, an interactive controller, or a session/management controller, these aspects and features can be provided in a distributed form where any of the features or aspects can be provided by any of a session/management controller, a chance-based controller, a process controller, and/or an interactive controller within a billiard combined proposition wagering system without deviating from the spirit of the invention.

Although various components of billiard combined proposition wagering systems are discussed herein, billiard combined proposition wagering systems can be configured with any component as appropriate to the specification of a specific application in accordance with embodiments of the invention. In certain embodiments, components of a billiard combined proposition wagering system, such as a session/management controller, a process controller, a chance-based controller, and/or an interactive controller, can be configured in different ways for a specific billiard combined proposition wagering system.

In some embodiments, components of a session/management controller, an interactive controller, a process controller, and/or a chance-based controller of a billiard combined proposition wagering system may be constructed from or configured using a single device using processes that communicate using an interprocess communication protocol. In many embodiments, the components of a session/management controller, an interactive controller, a process controller and a chance-based controller of a billiard combined proposition wagering system may communicate by passing messages, parameters or the like.

In addition, while certain aspects and features of billiard combined proposition wagering system processes described herein have been attributed to a session/management controller, a chance-based controller, a process controller, or an interactive controller, these aspects and features can be provided in a distributed form where any of the features or aspects can be provided by any of a session/management controller, a chance-based controller, a process controller, and/or an interactive controller within a billiard combined proposition wagering system.

Operation of Billiard Combined Proposition Wagering Systems

Figure 8:
FIG. 8 is a sequence diagram of interactions between components of a billiard combined proposition wagering system in accordance with various embodiments of the invention.

FIG. 8 is a sequence diagram of interactions between components of a billiard combined proposition wagering system during a wagering session in accordance with various embodiments of the invention. The components of the billiard combined proposition wagering system include a chance-based controller 902, such as chance-based controller 102 of FIG. 1, a process controller 904, such as process controller 112 of FIG. 1, an interactive controller, such as interactive controller 120 of FIG. 1, and a credit processing system 903, such as credit processing system 198 of FIG. 1.

In some embodiments, at a beginning of the wagering session, the process includes a credit input 909 to the billiard combined proposition wagering system with chance-based controller 902 communicating with the credit processing system 903 to receive incoming credit data 905. The chance-based controller 902 uses the incoming credit data to transfer credits onto one or more credit meters associated with one or more users of the billiard combined proposition wagering system, thus transferring credits into the billiard combined proposition wagering system and on to the one or more credit meters.

In many embodiments, the interactive controller 906 detects 907 a user performing a user interaction in an application interface of an interactive application provided by the interactive controller 906. The interactive controller 906 communicates application telemetry data 908 to the process controller 904. The application telemetry data 908 includes, but is not limited to, the user interaction detected by the interactive controller 906.

The process controller 904 receives the application telemetry data 908. Upon determination by the process controller 904 that the user interaction indicates a wagering event in the interactive application, the process controller 904 generates chance outcome request data 912 that the process controller 904 uses to command the chance-based controller 902 to resolve a chance-based proposition. The chance outcome request data 912 may include chance-based proposition terms associated with a chance-based proposition. The process controller 904 communicates the chance outcome request data 912 to the chance-based controller 902.

The chance-based controller 902 receives the chance outcome request data 912 and uses the chance outcome request data to determine 913 a chance outcome for a chance-based proposition. The chance-based controller 902 updates 919 the one or more credit meters associated with the one or more users based on an amount of credits used for the chance-based proposition and stores amounts of credits awarded from the resolved chance-based proposition in one or more intermediate data stores. The chance-based controller 902 communicates data of the chance outcome 914 of the resolved chance-based outcome to the process controller 904.

The process controller 904 receives the chance outcome data 914 and determines 915 a skill proposition based in part on the chance outcome data 914. The skill proposition includes interactive application instruction and resource data that the process controller 904 uses to command the interactive controller 906 to present a skill proposition to a user. The process controller 904 communicates data of the skill proposition 916 to the interactive controller 906.

The interactive controller 906 receives the skill proposition data 916. The interactive application executing on the interactive controller 906 uses the skill proposition data to generate and present 918 a skill proposition to the user. The interactive controller 906 detects 920 skillful user interactions with the skill proposition presentation of the interactive application and determines 922 a skill outcome based on the user's skillful interactions. The interactive controller 906 communicates data of the skill outcome 924 to the process controller 904. The process controller 904 receives the skill outcome data 924 and determines 926 a combined outcome based on the skill outcome data 924 and the chance outcome data 914.

The process controller 904 communicates data of the combined outcome 928 to the chance-based controller 902. The chance-based controller 902 receives the combined outcome data 928 and updates 930 the one or more credit meters based in part on the combined outcome data 928. In some embodiments, if the combined outcome indicates that a user has been awarded credits, the chance-based controller 902 decrements credits stored on the intermediate credit meter and adds credits to the credit meter associated with the user. The chance-based controller communicates data of the updated credit meters 932 to the process controller 904. The process controller 904 receives the updated credit meter data 932 and generates 934 wagering telemetry data 936 using the combined outcome data 928 and the updated credit meter data 932. The process controller 904 communicates the wagering telemetry data 936 to the interactive controller 906. The interactive controller 906 receives the wagering telemetry data 936. The interactive controller 906 updates 936 a wagering user interface on a partial basis of the wagering telemetry data 936.

In many embodiments, upon determining that the wagering session is completed, such as by receiving a cashout communication from one or more users of the billiard combined proposition wagering system, the chance-based controller 902 transfers credits off of the one or more credit meters, generates outgoing credit data 940 on the basis of the credits transferred off of the one or more credit meters, and communicates the outgoing credit data 940 to the credit processing system 903. The credit processing system receives the outgoing credit data 940 and generates 942 a credit output as described herein, thus transferring credits off of the one or more credit meters and out of the billiard combined proposition wagering system.

In some embodiments, at a beginning of the wagering session, the process includes an application credit input to the billiard combined proposition wagering system with the process controller 904 communicating with the credit processing system 903 to receive incoming application credit data. The process controller 902 uses the incoming application credit data to transfer application credits onto one or more application credit meters associated with one or more users of the billiard combined proposition wagering system, thus transferring application credits into the billiard combined proposition wagering system and on to the one or more application credit meters. The process controller 904 uses the skill outcome data 924 to determine an amount of application credit to award to a user based on the user's skillful interactions with an interactive application executed by the interactive controller 905. Upon determining that the wagering session is completed, such as by receiving a cashout communication from one or more users of the billiard combined proposition wagering system, the process controller 904 transfers application credits off of the one or more application credit meters, generates outgoing application credit data on the basis of the application credits transferred off of the one or more application credit meters, and communicates the outgoing application credit data to the credit processing system 903. The credit processing system receives the outgoing application credit data and generates an application credit output as described herein, thus transferring application credits off of the one or more application credit meters and out of the billiard combined proposition wagering system.

Figure 9A:
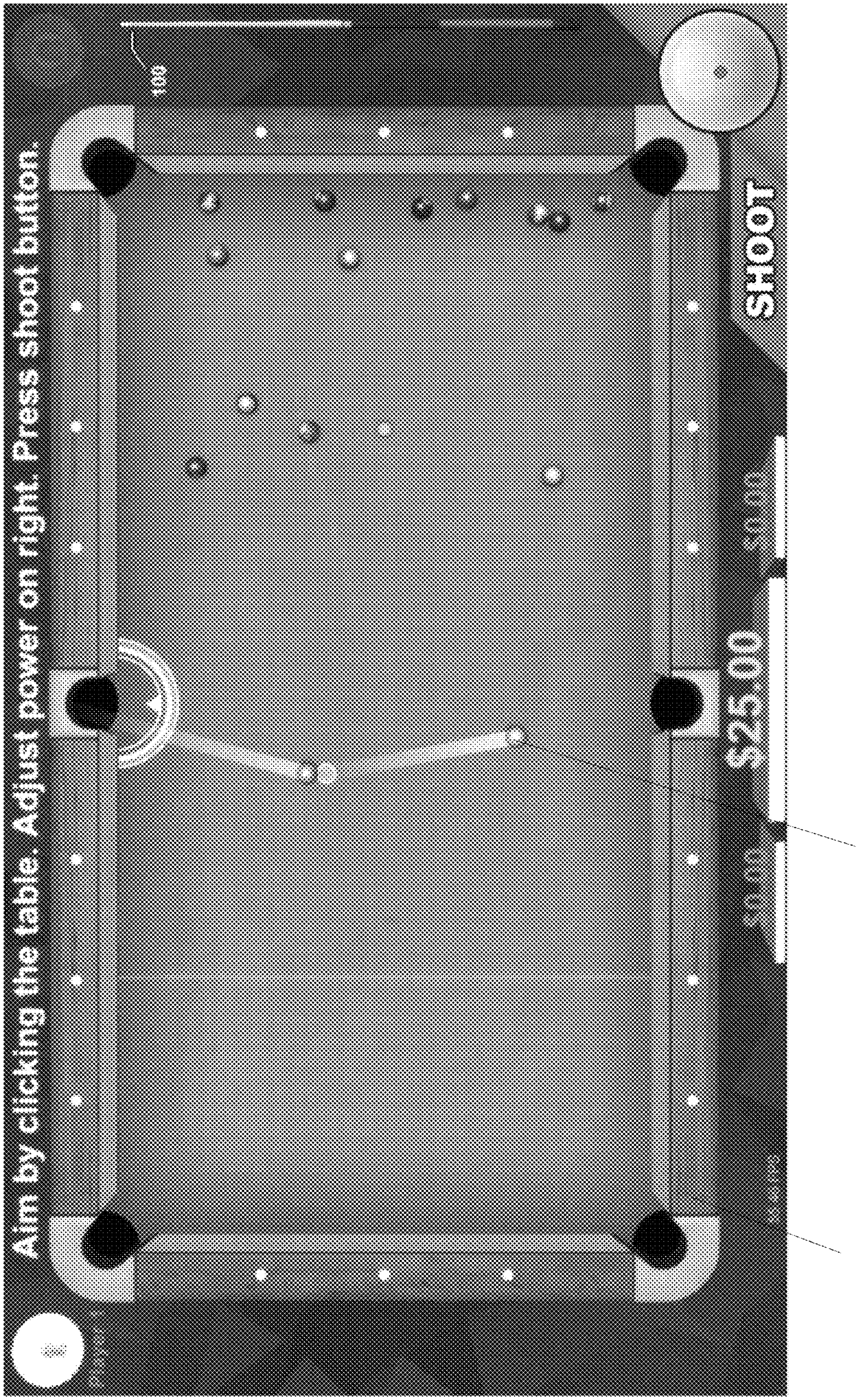
FIGS. 9A and 9B illustrate a user interface of an interactive application in accordance with some embodiments of the invention.
Figure 9B:
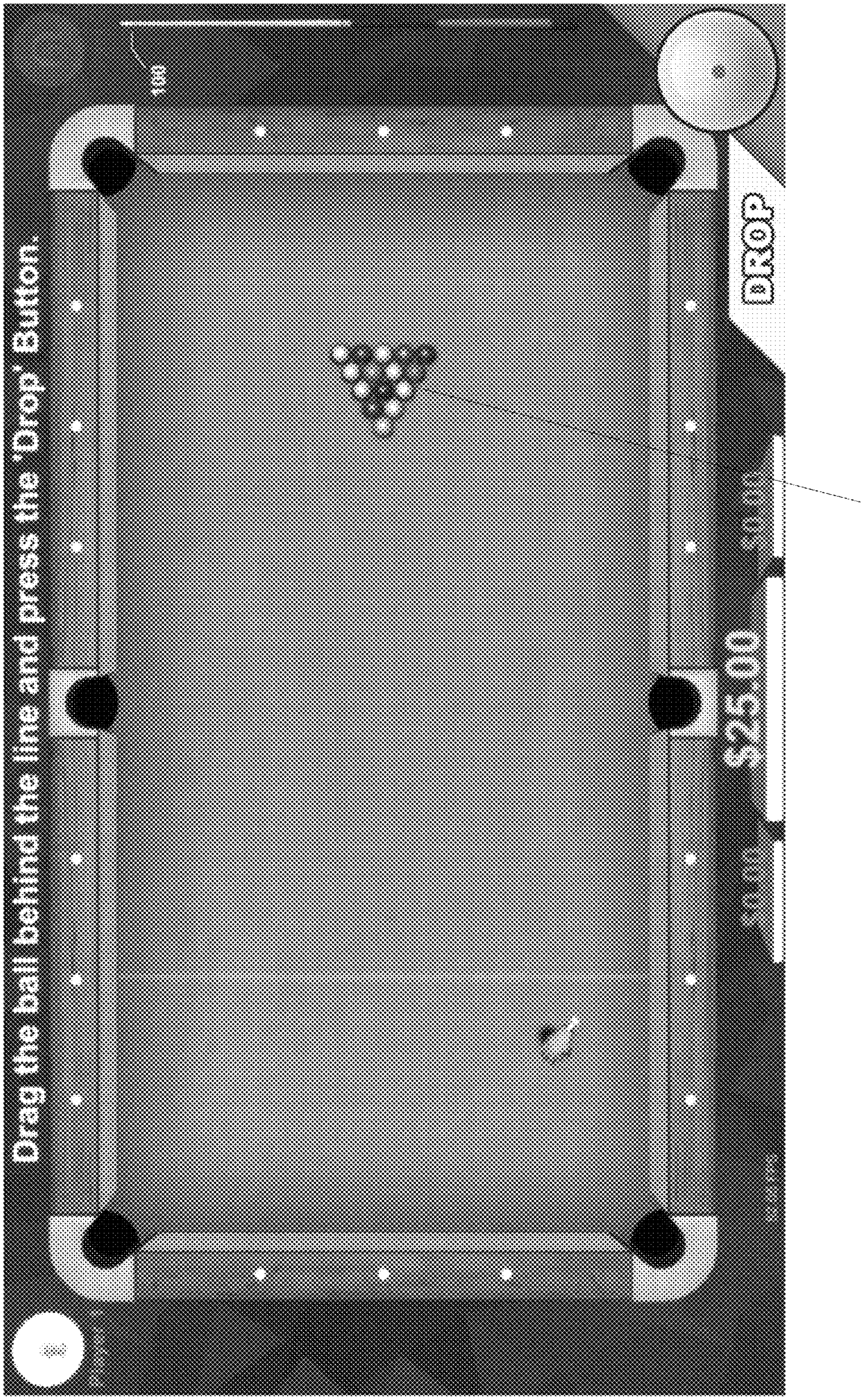

FIGS. 9A and 9B illustrate a user interface of an interactive application in accordance with some embodiments of the invention. In many embodiments, the interactive application is a billiards interactive game. The user interface includes a plurality of interactive application components associated with various application events. In some embodiments, users compete against each other. In order to start an application session, the users must commit currency to a wager. The chance-based controller receives the information about the wager, and instructs the process controller to enable the use of the application. The interactive application provided by an interactive controller then becomes available to the user. The interactive controller determines if the user has interacted with an interactive application object. In many embodiments, the interactive application object is a billiards ball. When the user takes actions within the interactive application system, this information is communicated from the interactive controller to the process controller. At the end of the interactive application, the results of that wager are displayed to the users.

As shown in FIG. 9A, each user may interact with a cue stick within the application's user interface. The user interface displays a pool table 1202 with six pockets, a cue ball 1204, and 15 object balls consisting of seven striped balls, seven solid-colored balls and the black 8 ball. As in traditional eight-ball billiards, the user controls the cue stick which is used to strike the cue ball 1204 which is then propelled on a vector depending on the angle and strength of the strike.

After the balls are scattered with a break shot, the users are assigned either the group of solid balls or the stripes once a ball from a particular group is legally pocketed. The ultimate object of the game is to legally pocket the eight ball in a called pocket, which can only be done after all of the balls from a user's assigned group have been cleared from the table.

As shown in FIG. 9B, to start the game, the object balls are placed in a triangular pattern 1206 by the process controller. The base of the pyramid is parallel to the end rail (the short end of the pool table). The graphical display of the balls show that they are all in contact with one another for the physics within the system. The order of the balls is random, with the exceptions of the 8 ball, which must be placed in the center of the rack (i.e., the middle of the third row), and the two back corner balls one of which must be a stripe and the other a solid.

One person is chosen to shoot first, using a cue stick to break the object-ball rack apart. In some embodiments, the process controller makes the determination of which user shoots first. In some embodiments, the interactive controller makes the determination.

A user will continue to shoot until committing a scratch, or failing to legally pocket an object ball. Thereupon it is the turn of the opposing user(s). Play alternates in this manner for the remainder of the application. Following a scratch, the incoming user has ball-in-hand anywhere on the table.

In some embodiments, a legal pocket occurs when a specific ball is sunk into a called pocket. In an example embodiment, a user may be assigned solids after the break. In order for a legal pocket to occur, they must select a specific ball, such as solid red, and a target pocket, such as the lower middle pocket, before using the cue stick. If the solid red ball is then sunk into the lower middle pocket, the user has succeeded in a legal pocket.

If the red ball is sunk into a pocket that is not called by the user, then the user has scratched, and it is the opponent's turn. If multiple balls are sunk during a turn, so long as the called ball is sunk in the called pocket, then the user has had a successful interaction. However, only balls into the called pocket count for distribution of the wagers. If only an opponent's object ball is sunk, then it is removed from the table, but the user also scratches and the turn passes to the opponent.

Once all of a user's group of object balls are pocketed, the user may attempt to sink the 8 ball. To win, the user must first designate which pocket they plan to sink the 8 ball into and then successfully pot the 8 ball in that called pocket. If the 8 ball falls into any pocket other than the one designated or is knocked off the table, or a scratch occurs and the 8 ball is pocketed, this results in loss of game.

In order for the process controller to start, the users must allocate sufficient funds to the chance-based controller. The sum of the entire wager from both users is divided by 14 rounded down to the closest whole number. That wager amount is assigned to each object ball in the interactive application. The remainder of the wager is assigned to the 8 ball.

If a user achieves a legal pocketing of a ball, then the user wins the wager assigned to that ball; if multiple balls are sunk in a single turn, then only balls that are sunk into the called pocket result in the distribution of the wager. If a ball is sunk illegally, then the wager associated with the ball is redistributed to the balls still on the table. If a user sinks a ball assigned to their opponent, then the ball has been sunk illegally, and the wager associated with the ball is redistributed to the balls still on the table.

In some embodiments, wagers associated with balls that are illegally sunk are redistributed to the 8 ball rather than to all the balls still in play.

Specifically, in some embodiments, each interaction with an interactive component by the user may trigger a wager event—either a win or a loss depending on how the balls move through the system. Whether a user has successfully interacted with the interactive component is determined by the process controller and then communicated to the chance-based controller which then determines what wager is associated with the interactive component and communicates the result to the process controller. Additionally, the process controller determines whether interactive application resources are to be provided to the user on the basis of the successful interactions. In some embodiments, these may include cosmetic or vanity items, such as visual effects (balls that leave trails of fire) or specialty cues. Alternatively, there may be special bonuses such as vector extensions, which makes targeting easier.

In some embodiments, such as a mobile environment where the operator has less control over the system, an RNG element may be introduced to combat cheating. In some embodiments, this would limit the extent to which outside cheats could be employed by a user.

In some embodiments, while objects are in motion, the interactive controller is inaccessible to users. The user may not interact with any portion of the system that is in motion, and may only observe the effects of the previous action(s).

Figure 10:
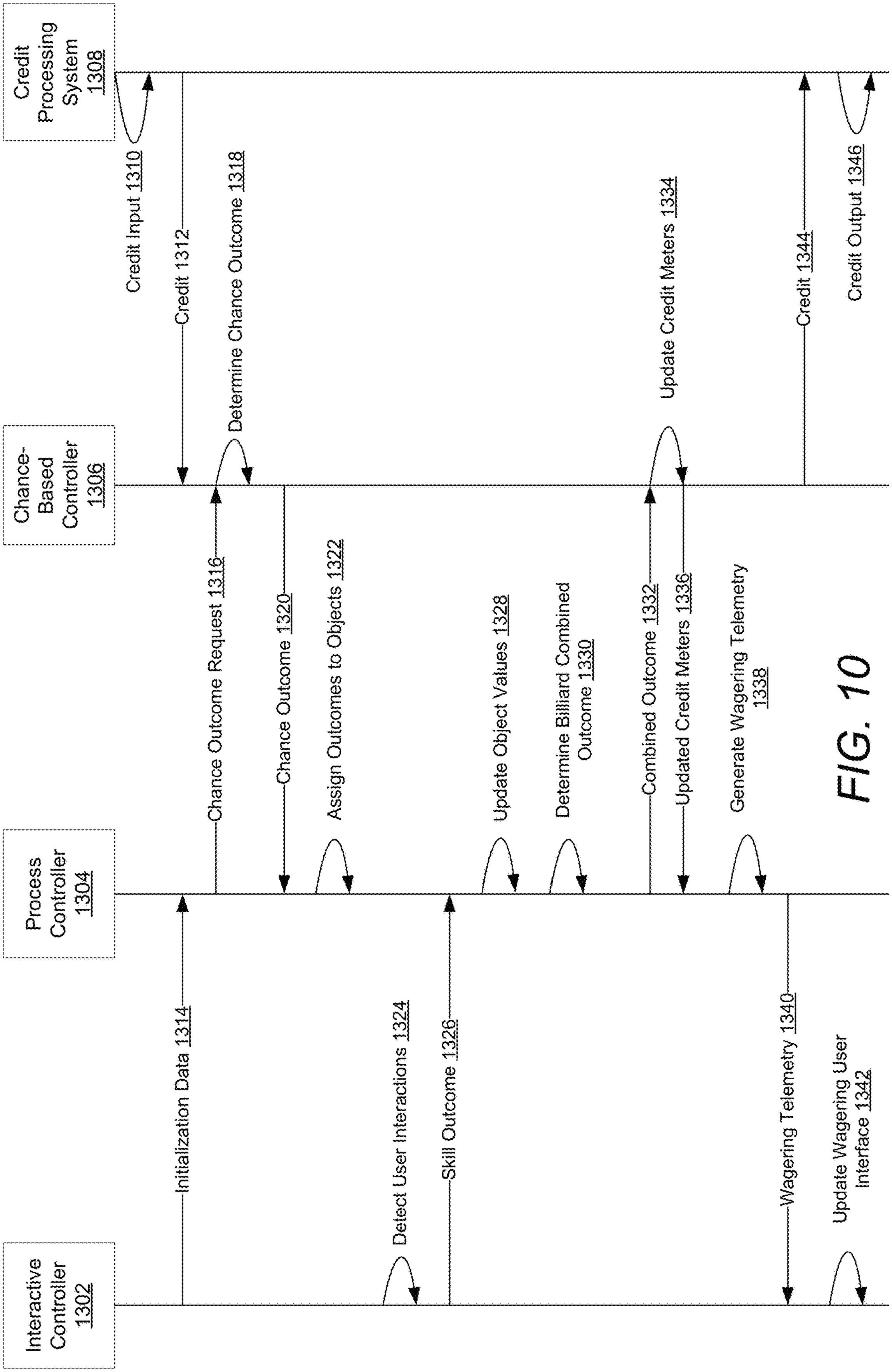
FIG. 10 is a sequence diagram of interactions between components of a billiards combined proposition wagering system in accordance with various embodiments of the invention.

FIG. 10 is a sequence diagram of interactions between components of a billiards combined proposition wagering system in accordance with various embodiments of the invention.

The components of the billiards combined proposition wagering system include a chance-based controller 1306, such as chance-based controller 102 of FIG. 1, a process controller 1304, such as process controller 112 of FIG. 1, an interactive controller, such as interactive controller 120 of FIG. 1, and a credit processing system 1308, such as credit processing system 198 of FIG. 1. In some embodiments, the interactive controller 1302 provides an interactive application. In some embodiments, the interactive application is a billiards based interactive game, as described herein.

In various embodiments, communication of outgoing data between a controller and another controller is achieved by the controller encoding data to be communicated into a signal and transmitting the signal to the another controller. Communication of incoming data is achieved by the controller receiving from the another controller signals encoding the incoming data. The controller decodes the signals to obtain the incoming data.

In some such embodiments, two or more controllers implement a controller-to-controller communication protocol as an interdevice communication protocol so that the two or more controllers may be implemented on different processing devices. The interdevice communication protocol may utilize a wired communication bus or wireless connection as a physical layer. In yet other such embodiments, the controller-to-controller communication protocol is implemented as a networking protocol so that the two or more controllers may be implemented on different devices operatively connected by a network. The networking protocol may utilize a wired communication bus or wireless connection as a physical layer. In many such embodiments, the network includes a cellular telephone network or the like and one or more of the controllers is a mobile device such as a smartphone or other device capable of using the cellular telephone network.

In some embodiments, communication is achieved by two or more of the controllers implementing a controller-to-controller communication protocol as an interprocess communication protocol so that the two or more controllers may be implemented on the same device.

In some embodiments, the interactive controller 1302, the process controller 1304, and the chance-based controller 1306 are separated into different components in order to distribute computing responsibilities to provide improved latency results. In some embodiments, the interactive controller 1302 dedicates its resources toward providing the interactive application, and may be unable to perform the additional processing performed by the process controller 1304 without sacrificing latency.

During operation, in various embodiments, the interactive controller 1302 is constructed to provide an interactive application display associated with an interactive application provided by the interactive controller 1302.

In some embodiments, at a beginning of the wagering session, the process includes a credit input to the billiards combined proposition wagering system (1310). In some embodiments the credit input is an input of a ticket or cash to a credit input device, as described herein. The credit processing system 1308 communicates, to the chance-based controller 1306, credit data (1312). The chance-based controller 1306 communicates with the credit processing system 1308 to receive incoming credit data (1312). The chance-based controller 1306 uses the incoming credit data to transfer credits onto one or more credit meters associated with one or more users of the billiards combined proposition wagering system, thus transferring credits into the billiards combined proposition wagering system and on to the one or more credit meters.

In many embodiments, the interactive controller 1302 detects a user performing an initialization indication in an application interface of an interactive application provided by the interactive controller 1302. In some embodiments, the initialization indication is providing an input to a user interface. In some embodiments, the initialization indication is interacting with a button coupled with the interactive controller 1302. The interactive controller 1302 communicates initialization data to the process controller 1304 (1314). The initialization data includes, but is not limited to, the user interaction detected by the interactive controller 1302 and a user identification associated with the user.

The process controller 1304 receives, from the interactive controller 1302, the initialization data (1314). Upon determination by the process controller 1304 that the user interaction indicates initiating a session, the process controller 1304 generates chance outcome request data that the process controller 1304 uses to command the chance-based controller 1306 to resolve a chance-based proposition. The chance outcome request data may include chance-based proposition terms associated with a chance-based proposition. The process controller 1304 communicates the chance outcome request data to the chance-based controller 1306 (1316).

The chance-based controller 1306 receives the chance outcome request data (1316) and uses the chance outcome request data to determine a chance outcome for a chance-based proposition (1318). The chance-based controller 1306 communicates data of the chance outcome of the resolved chance-based outcome to the process controller 1304 (1320). In some embodiments, the resolved chance-based outcome is a single chance outcome divided by 14 and rounded down to the closest whole number, with each whole number associated with a billiard ball 1-7 and 9-15 and the remainder of the chance-based outcome associated with billiard ball 8, as described herein. In some embodiments, the wager amount is divided into 15 equal values, and 15 individual chance-based outcomes are determined and assigned to a billiard ball 1-15.

The process controller 1304 receives the chance outcome data (1320) and assigns each outcome to a corresponding object (1322). In some embodiments, the chance outcome data identifies the corresponding billiard ball associated with the value. In some embodiments, the chance outcome data is a series of values representing chance-based outcomes and the process controller 1304 is responsible for assigning the chance-based outcome to a billiard ball.

The interactive controller 1302 presents a skill proposition to a user. In some embodiments, the skill proposition is playing a game of eight-ball or pocket billiards against an opponent. In some embodiments, the process controller 1304 communicates data of the skill proposition to the interactive controller 1302.

The interactive controller 1302 detects skillful user interactions with the skill proposition presentation of the interactive application and determines a skill outcome based on the user's skillful interactions. The interactive controller 1302 communicates data of the skill outcome to the process controller 1304 (1326). In some embodiments, the skill outcome data reflects a user putting a billiard ball in a pocket. In an example embodiment, the skill outcome data indicates that the user has put the 2 ball in a corner pocket. The process controller 1304 receives the skill outcome data (1326).

In some embodiments, the skill outcome data follows a skill outcome data protocol. In some embodiments, the skill outcome data protocol comprises an account identification. In some embodiments, the skill outcome protocol includes an identification of the interactive application. In some embodiments, the skill outcome data protocol includes an action or event occurring in the interactive application. In some embodiments, the skill outcome data protocol includes skill outcome data encoded as a string. In some embodiments, the skill outcome data protocol includes skill outcome data encoded as an array of the elements making up the skill outcome data. In some embodiments, the skill outcome protocol includes skill outcome data formatted as a concatenation of data of elements making up the skill outcome data.

The process controller 1304 updates object values based on the skill outcome data (1328). In some embodiments, when a skill outcome of a scratch is achieved, the value associated with the scratched ball is reassigned to another billiard ball. In some embodiments, the value is reassigned to the 8 ball. In some embodiments, the value is assigned to the opponent of the user who committed the scratch. In some embodiments, when a ball is improperly pocketed, the value associated with the ball is distributed to the remaining balls.

The process controller 1304 determines a billiard combined outcome (1330). In some embodiments, the combined outcome is a combined outcome of the skill outcome and the chance-based outcome. In an example embodiment, the combined outcome includes an identification of a billiard ball successfully placed in a pocket and the chance-based outcome value associated with the billiard ball.

The process controller 1304 communicates data of the combined outcome to the chance-based controller 1306 (1332). The chance-based controller 1306 receives the combined outcome data (1332) and updates the one or more credit meters based in part on the combined outcome data (1334). In some embodiments, if the combined outcome indicates that a user has been awarded credits, the chance-based controller 1306 decrements credits stored on the intermediate credit meter and adds credits to the credit meter associated with the user.

The chance-based controller communicates data of the updated credit meters to the process controller 1304 (1336). The process controller 1304 receives the updated credit meter data (1336) and generates wagering telemetry data using the combined outcome data and the updated credit meter data (1338). The process controller 1304 communicates the wagering telemetry data to the interactive controller 1302 (1340). The interactive controller 1302 receives the wagering telemetry data (1340). The interactive controller 1302 updates a wagering user interface on a partial basis of the wagering telemetry data (1342).

In many embodiments, upon determining that the wagering session is completed, such as by receiving a cashout communication from one or more users of the billiards combined proposition wagering system, the chance-based controller 1306 transfers credits off of the one or more credit meters, generates outgoing credit data on the basis of the credits transferred off of the one or more credit meters, and communicates the outgoing credit data to the credit processing system 1308 (1344). The credit processing system receives the outgoing credit data (1344) and generates a credit output (1346) as described herein, thus transferring credits off of the one or more credit meters and out of the billiards combined proposition wagering system.

In some embodiments, at a beginning of the wagering session, the process includes an application credit input to the billiards combined proposition wagering system with the process controller 1304 communicating with the credit processing system 1308 to receive incoming application credit data. The process controller 1306 uses the incoming application credit data to transfer application credits onto one or more application credit meters associated with one or more users of the billiards combined proposition wagering system, thus transferring application credits into the billiards combined proposition wagering system and on to the one or more application credit meters. The process controller 1304 uses the skill outcome data to determine an amount of application credit to award to a user based on the user's skillful interactions with an interactive application executed by the interactive controller 1302. Upon determining that the wagering session is completed, such as by receiving a cashout communication from one or more users of the billiards combined proposition wagering system, the process controller 1304 transfers application credits off of the one or more application credit meters, generates outgoing application credit data on the basis of the application credits transferred off of the one or more application credit meters, and communicates the outgoing application credit data to the credit processing system 1308. The credit processing system receives the outgoing application credit data and generates an application credit output as described herein, thus transferring application credits off of the one or more application credit meters and out of the billiards combined proposition wagering system.

While the above description may include many specific embodiments of the invention, these should not be construed as limitations on the scope of the invention, but rather as examples of embodiments thereof. It is therefore to be understood that the present invention can be practiced otherwise than specifically described, without departing from the scope and spirit of the present invention. Thus, embodiments of the present invention described herein should be considered in all respects as illustrative and not restrictive.

What is claimed:

1. A combined proposition wagering system, comprising:
an enclosure constructed to mount:
a credit input device operatively connected to a chance-based controller; and
a credit output device operatively connected to the chance-based controller;
a wireless device comprising:
a user input device;
a user output device;
an interactive application display; and
wherein the wireless device is constructed to:
provide an billiards interactive application that receives input from a player via the user input device;
communicate, to a process controller, initialization data based on the input from the player;
communicate, to the process controller, a skill outcome, wherein the skill outcome reflects the player pocketing a billiard ball;
receive, from the process controller, a wager result; and
update a wagering user interface based on the wager result;
the chance-based controller constructed to:
communicate with the credit input device to receive a credit input;
credit a credit meter with credits based on incoming credit data;
receive, from the process controller, a wager request;
generate the wager outcome by resolving a chance-based proposition in response to the wager request using object billiard ball values;
communicate, to the process controller, the wager outcome;
receive, from the process controller, a combined outcome;
update the credit meter based on the combined outcome;
communicate with the credit output device to generate a credit output based on credits transferred off of the credit meter; and
communicate, to the process controller, updated credit meter data; and
the process controller operatively connecting the wireless device and the chance-based controller, the process controller constructed to:
receive, from the wireless device, the initialization data;
determine the object billiard ball values by assigning a portion of wager funding to one or more object billiard balls associated with the billiards interactive application;
receive, from the wireless device, the skill outcome wherein the skill outcome reflects the player pocketing the billiard ball;
credit the object billiard ball value assigned to the pocketed billiard ball to the player;
responsive to receiving the skill outcome, communicate, to the chance-based controller, the wager request;
receive, from the chance-based controller, the wager outcome;
determine a combined outcome based on the skill outcome and the wager outcome;
communicate, to the chance-based controller, the combined outcome;
receive, from the chance-based controller, the updated credit meter data;
and
communicate, to the wireless device, the wager result.

2. The combined proposition wagering system of claim 1, wherein the wireless device and the process controller are constructed from a single device, and
wherein the process controller is operatively connected to the chance-based controller using a communication link.

3. The combined proposition wagering system of claim 1, wherein the chance-based controller and the process controller are constructed from a single device, and
wherein the process controller is operatively connected to the wireless device using a communication link.

4. The combined proposition wagering system of claim 1, wherein the wireless device is a laptop computer.

5. The combined proposition wagering system of claim 1, wherein the wireless device is a notebook computer.

6. The combined proposition wagering system of claim 1, wherein the wireless device is a smartphone.

7. The combined proposition wagering system of claim 1, wherein the object billiard ball value assigned to the pocketed billiard ball is credited to the player only if the pocketed billiard ball is sunk into a called pocket.

8. The combined proposition wagering system of claim 1, wherein the object billiard ball value assigned to the pocketed billiard ball is credited to the player only if the pocketed billiard ball is assigned to the player.

9. A combined proposition wagering system, comprising:
an enclosure constructed to mount:
a credit input device operatively connected to a chance-based controller; and
a credit output device operatively connected to the chance-based controller;
a wireless device comprising:
a user input device;
a user output device;
an interactive application display; and
wherein the wireless device is constructed to:
provide a billiards interactive application that receives input from a player via the user input device;
communicate, to a process controller, initialization data based on the input from the player;
communicate, to the process controller, a skill outcome, wherein the skill outcome reflects the player pocketing a billiard ball;
receive, from the process controller, a wager result; and
update a wagering user interface based on the wager result; and
the process controller operatively connecting the wireless device the chance-based controller, the process controller constructed to:

receive, from the wireless device, the initialization data;

determine object billiard ball values by assigning a portion of wager funding to one or more object billiard balls associated with the billiards interactive application;

receive, from the wireless device, the skill outcome wherein the skill outcome reflects the player pocketing the billiard ball;

credit the object billiard ball value assigned to the pocketed billiard ball to the player;

responsive to receiving the skill outcome, communicate, to the chance-based controller, the wager request;

receive, from the chance-based controller, the wager outcome;

determine a combined outcome based on the skill outcome and the wager outcome;

communicate, to the chance-based controller, the combined outcome;

receive, from the chance-based controller, the updated credit meter data;

and communicate, to the wireless device, the wager result; and the chance-based controller constructed to:

communicate with the credit input device to receive a credit input;

credit a credit meter with credits based on incoming credit data;

resolve a wager based on a communication received from the process controller using the object billiard ball value;

update the credit meter based on the wager outcome; and communicate with the credit output device to generate a credit output based on credits transferred off of the credit meter.

10. The combined proposition wagering system of claim 9, wherein the wireless device is a laptop computer.

11. The combined proposition wagering system of claim 9, wherein the wireless device is a notebook computer.

12. The combined proposition wagering system of claim 9, wherein the wireless device is a smartphone.

13. The combined proposition wagering system of claim 9, wherein the object billiard ball value assigned to the pocketed billiard ball is credited to the player only if the pocketed billiard ball is sunk into a called pocket.

14. The combined proposition wagering system of claim 9, wherein the object billiard ball value assigned to the pocketed billiard ball is credited to the player only if the pocketed billiard ball is assigned to the player.

15. A combined proposition wagering system, comprising:

an enclosure constructed to mount:

a credit input device operatively connected to a chance-based controller; and a credit output device operatively connected to the chance-based controller;

the chance-based controller constructed to:

communicate with the credit input device to receive a credit input;

credit a credit meter with credits based on incoming credit data;

receive, from a process controller, chance outcome request data;

generate a wager outcome by resolving a chance-based proposition in response to a wager request received from the process controller using object billiard ball values;

communicate, to the process controller, the wager outcome;

receive, from the process controller, a combined outcome;

update the credit meter based on a chance outcome of a chance proposition; and communicate with the credit output device to generate a credit output based on credits transferred off of the credit meter;

and communicate, to the process controller, updated credit meter data; and the process controller operatively connecting a wireless device and the chance-based controller, the process controller constructed to:

receive, from the wireless device, initialization data based on input from a player via a user input device;

determine object billiard ball values by assigning a portion of wager funding to one or more object billiard balls associated with the billiards interactive application;

receive, from the wireless device, the skill outcome wherein the skill outcome reflects the player pocketing the billiard ball;

credit the object billiard ball value assigned to the pocketed billiard ball to the player;

responsive to receiving the skill outcome, communicate, to the chance-based controller, the wager request;

receive, from the chance-based controller, the wager outcome;

determine a combined outcome based on the skill outcome and the wager outcome;

communicate, to the chance-based controller, the combined outcome;

receive, from the chance-based controller, the updated credit meter data;

and communicate, to the wireless device, the wager result.

16. The combined proposition wagering system of claim 15, wherein the wireless device is a laptop computer.

17. The combined proposition wagering system of claim 15, wherein the wireless device is a notebook computer.

18. The combined proposition wagering system of claim 15, wherein the wireless device is a smartphone.

19. The combined proposition wagering system of claim 15, wherein the object billiard ball value assigned to the pocketed billiard ball is credited to the player only if the pocketed billiard ball is sunk into a called pocket.

20. The combined proposition wagering system of claim 15, wherein the object billiard ball value assigned to the pocketed billiard ball is credited to the player only if the pocketed billiard ball is assigned to the player.

* * * * *